US012773997B2

United States Patent

Katz

(12) United States Patent
(10) Patent No.: US 12,773,997 B2
(45) Date of Patent: Oct. 27, 2026

(54) SENSOR-BASED IN-VEHICLE DYNAMIC DRIVER GAZE TRACKING

(71) Applicant: Red Bend Ltd., Hod Ha'Sharon (IL)

(72) Inventor: Itay Katz, Tel Aviv (IL)

(73) Assignee: RED BEND LTD., Hod Hasharon (IL)

( * ) Notice: Subject to any disclaimer, the term of this patent is extended or adjusted under 35 U.S.C. 154(b) by 127 days.

(21) Appl. No.: 18/128,217

(22) Filed: Mar. 29, 2023

(65) Prior Publication Data

US 2023/0347903 A1 Nov. 2, 2023

Related U.S. Application Data

(63) Continuation-in-part of application No. PCT/IB2022/053712, filed on Apr. 20, 2022, and a continuation-in-part of application No. 17/566,505, filed on Dec. 30, 2021, now abandoned, and a continuation-in-part of application No. PCT/IB2021/062499, filed on Dec. 30, 2021.

(60) Provisional application No. 63/324,657, filed on Mar. 29, 2022, provisional application No. 63/177,945, filed on Apr. 21, 2021, provisional application No. 63/133,222, filed on Dec. 31, 2020.

(51) Int. Cl.

| | |
|---|---|
| ***B60W 40/08*** | (2012.01) |
| ***G06V 10/82*** | (2022.01) |
| ***G06V 20/56*** | (2022.01) |
| ***G06V 20/59*** | (2022.01) |

(52) U.S. Cl.

CPC ............. *B60W 40/08* (2013.01); *G06V 10/82* (2022.01); *G06V 20/588* (2022.01); *G06V 20/597* (2022.01); *B60W 2420/403* (2013.01); *B60W 2530/201* (2020.02); *B60W 2540/225* (2020.02); *B60W 2540/229* (2020.02)

(58) Field of Classification Search

CPC ........... B60W 40/08; B60W 2540/225; B60W 2540/229; B60W 2530/201; G06V 10/82; G06V 20/588; G06V 20/597

See application file for complete search history.

(56) References Cited

U.S. PATENT DOCUMENTS

2004/0150514 A1* 8/2004 Newman ................ B60Q 9/008 345/7

2021/0209922 A1* 7/2021 Yang ................. B60W 60/0055

* cited by examiner

*Primary Examiner* — Benyam Haile

(74) *Attorney, Agent, or Firm* — McCoy Russell LLP

(57) ABSTRACT

Systems and methods are disclosed for sensor-based in-vehicle dynamic driver gaze tracking. In one implementation, one or more first inputs can be received. The first input(s) can be processed to compute one or more directional adjustments. Second input(s) originating from an image sensor positioned within a vehicle can be received. The second input(s) can be processed to determine a gaze direction of at least one eye of a driver of the vehicle. Based on the determined gaze direction of the at least one eye of the driver and the computed first directional adjustment, aspect(s) of distractedness of the driver can be determined. Operation(s) can be initiated based on the determined aspect(s) of distractedness.

20 Claims, 22 Drawing Sheets

SENSOR-BASED IN-VEHICLE DYNAMIC DRIVER GAZE TRACKING

CROSS-REFERENCE TO RELATED APPLICATIONS

This application is a continuation-in-part of Patent Cooperation Treaty Application No. PCT/M2021/062499, filed Dec. 30, 2021, which is related to and claims the benefit of priority to U.S. Patent Application No. 63/133,222, filed Dec. 31, 2020, each of which is incorporated herein by reference in its entirety.

This application is also a continuation-in-part of U.S. patent application Ser. No. 17/566,505, filed Dec. 30, 2021, which claims the benefit of U.S. Patent Application No. 63/133,222, filed on Dec. 31, 2020, each of which is incorporated herein by reference in its entirety.

This application is also a continuation-in-part of Patent Cooperation Treaty Application No. PCT/M2022/053712, filed Apr. 20, 2022, which claims the benefit of U.S. Provisional Patent Application No. 63/177,945, filed Apr. 21, 2021, each of which is incorporated herein by reference in its entirety.

This application is also related to and claims the benefit of priority to U.S. Patent Application No. 63/324,657, filed Mar. 29, 2022, which is incorporated herein by reference in its entirety.

TECHNICAL FIELD

Aspects and implementations of the present disclosure relate to data processing and, more specifically, but without limitation, to sensor-based in-vehicle dynamic driver gaze tracking.

BACKGROUND

In order to operate a motor vehicle safely, the driver of such vehicle must focus his/her attention on the road or path being traveled. Periodically, the attention of the driver may change (e.g., when looking at the mirrors of the vehicle).

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
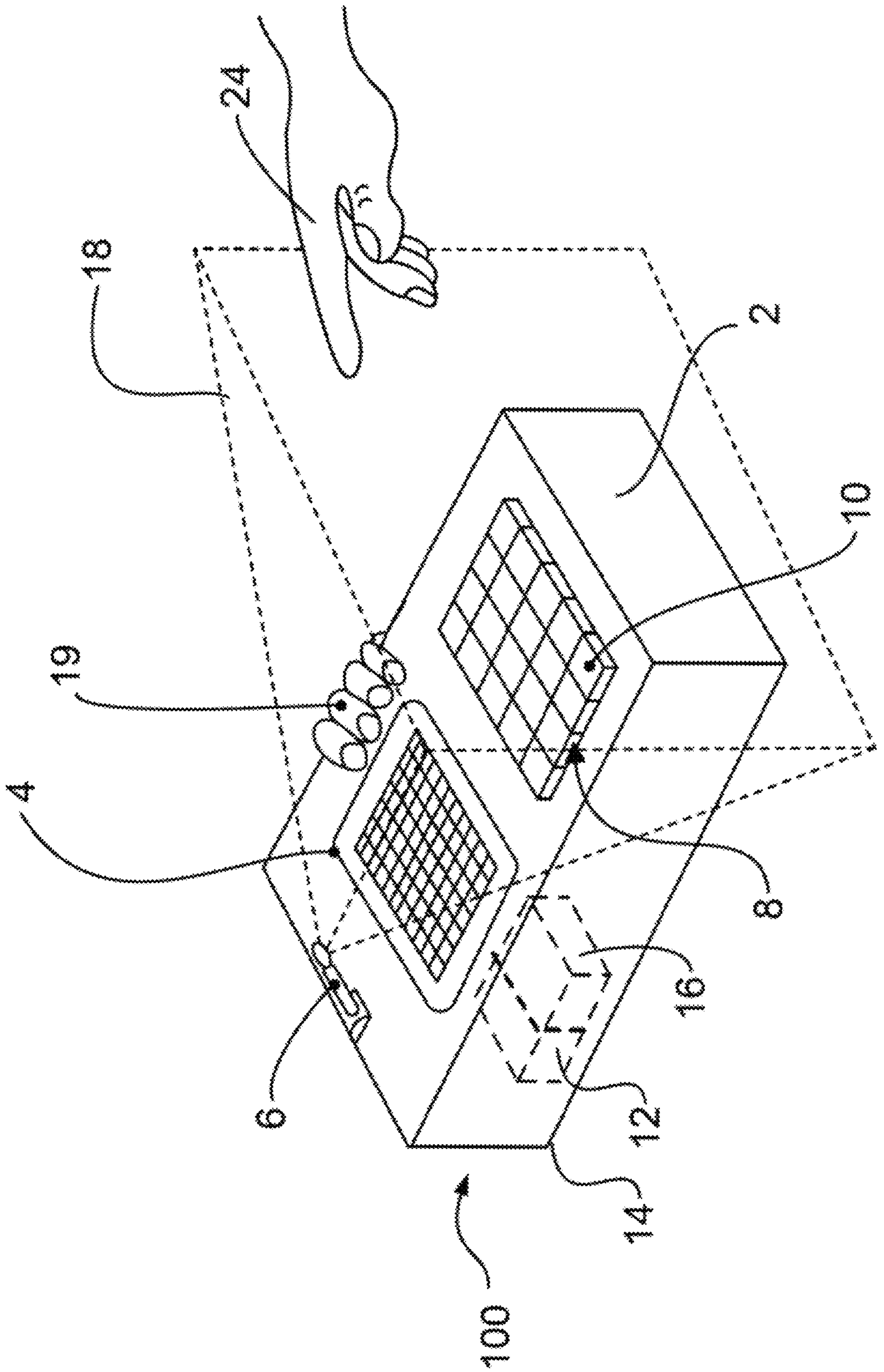
FIG. 1 illustrates an example touch-free gesture recognition system that may be used for implementing the disclosed embodiments.

Aspects and implementations of the present disclosure are directed to sensor-based in-vehicle dynamic driver gaze tracking.

In some embodiments of the present disclosure, a touch-free gesture recognition system is disclosed. A touch-free gesture recognition system may be any system in which, at least at some point during user interaction, the user is able to interact without physically contacting an interface such as, for example, a steering wheel, vehicle controls, keyboard, mouse, or joystick. In some embodiments, the system includes at least one processor configured to receive image information from an image sensor. The processor may be configured to detect in the image information of a gesture performed by the user (e.g., a hand gesture) and to detect a location of the gesture in the image information. Moreover, in some embodiments, the processor is configured to access information associated with at least one control boundary, the control boundary relating to a physical dimension of a device in a field of view of the user, or a physical dimension of a body of the user as perceived by the image sensor. For example, and as described later in greater detail, a control boundary may be representative of an orthogonal projection of the physical edges of a device (e.g., a display) into 3D space or a projection of the physical edges of the device as is expected to be perceived by the user.

Alternatively, or additionally, a control boundary may be representative of, for example, a boundary associated with the user's body (e.g., a contour of at least a portion of a user's body or a bounding shape such as a rectangular-shape surrounding a contour of a portion of the user's body). As described later in greater detail, a body of the user as perceived by the image sensor includes, for example, any portion of the image information captured by the image sensor that is associated with the visual appearance of the user's body.

In some embodiments, the processor is configured to cause an action associated with the detected gesture, the detected gesture location, and a relationship between the detected gesture location and the control boundary. The action performed by the processor may be, for example, generation of a message or execution of a command associated with the gesture. For example, the generated message or command may be addressed to any type of destination including, but not limited to, an operating system, one or more services, one or more applications, one or more devices, one or more remote applications, one or more remote services, or one or more remote devices.

For example, the action performed by the processor may comprise communicating with an external device or website responsive to selection of a graphical element. For example, the communication may include sending a message to an application running on the external device, a service running on the external device, an operating system running on the external device, a process running on the external device, one or more applications running on a processor of the external device, a software program running in the background of the external device, or to one or more services running on the external device. Moreover, for example, the action may include sending a message to an application running on a device, a service running on the device, an operating system running on the device, a process running on the device, one or more applications running on a processor of the device, a software program running in the background of the device, or to one or more services running on the device.

The action may also include, for example, responsive to a selection of a graphical element, sending a message requesting data relating to a graphical element identified in an image from an application running on the external device, a service running on the external device, an operating system running on the external device, a process running on the external device, one or more applications running on a processor of the external device, a software program running in the background of the external device, or to one or more services running on the external device, receiving from the external device or website data relating to a graphical element identified in an image and presenting the received data to a user. The communication with the external device or website may be over a communication network. The action may also include, for example, responsive to a selection of a graphical element, sending a message requesting a data relating to a graphical element identified in an image from an application running on a device, a service running on the device, an operating system running on the device, a process running on the device, one or more applications running on a processor of the device, a software program running in the background of the device, or to one or more services running on the device.

The action may also include a message to a device or a command. A command may be selected, for example, from a command to run an application on the external device or website, a command to stop an application running on the external device or website, a command to activate a service running on the external device or website, a command to stop a service running on the external device or website, or a command to send data relating to a graphical element identified in an image.

In some embodiments, a message may comprise a command to the remote device selected from depressing a virtual key displayed on a display device of the remote device; rotating a selection carousel; switching between desktops, running on the remote device a predefined software application; turning off an application on the remote device; turning speakers on or off; turning volume up or down; locking the remote device, unlocking the remote device, skipping to another track in a media player or between IPTV channels; controlling a navigation application; initiating a call, ending a call, presenting a notification, displaying a notification; navigating in a photo or music album gallery, scrolling web-pages, presenting an email, presenting one or more documents or maps, controlling actions in a game, pointing at a map, zooming-in or out on a map or images, painting on an image, grasping an activatable icon and pulling the activatable icon out form the display device, rotating an activatable icon, emulating touch commands on the remote device, performing one or more multi-touch commands, a touch gesture command, typing, clicking on a displayed video to pause or play, tagging a frame or capturing a frame from the video, presenting an incoming message; answering an incoming call, silencing or rejecting an incoming call, opening an incoming reminder; presenting a notification received from a network community service; presenting a notification generated by the remote device, opening a predefined application, changing the remote device from a locked mode and opening a recent call application, changing the remote device from a locked mode and opening an online service application or browser, changing the remote device from a locked mode and opening an email application, changing the remote device from locked mode and opening an online service application or browser, changing the device from a locked mode and opening a calendar application, changing the device from a locked mode and opening a reminder application, changing the device from a locked mode and opening a predefined application set by a user, set by a manufacturer of the remote device, or set by a service operator, activating an activatable icon, selecting a menu item, moving a pointer on a display, manipulating a touch free mouse, an activatable icon on a display, altering information on a display.

For example, a first message may comprise a command to the first device selected from depressing a virtual key displayed on a display screen of the first device; rotating a selection carousel; switching between desktops, running on the first device a predefined software application; turning off an application on the first device; turning speakers on or off; turning volume up or down; locking the first device, unlocking the first device, skipping to another track in a media player or between IPTV channels; controlling a navigation application; initiating a call, ending a call, presenting a notification, displaying a notification; navigating in a photo or music album gallery, scrolling web-pages, presenting an email, presenting one or more documents or maps, controlling actions in a game, controlling interactive video or animated content, editing video or images, pointing at a map, zooming-in or out on a map or images, painting on an image, pushing an icon towards a display on the first device, grasping an icon and pulling the icon out form the display device, rotating an icon, emulating touch commands on the first device, performing one or more multi-touch commands, a touch gesture command, typing, clicking on a displayed video to pause or play, editing video or music commands, tagging a frame or capturing a frame from the video, cutting a subset of a video from a video, presenting an incoming message; answering an incoming call, silencing or rejecting an incoming call, opening an incoming reminder; presenting a notification received from a network community service; presenting a notification generated by the first device, opening a predefined application, changing the first device from a locked mode and opening a recent call application, changing the first device from a locked mode and opening an online service application or browser, changing the first device from a locked mode and opening an email application, changing the first device from locked mode and opening an online service application or browser, changing the device from a locked mode and opening a calendar application, changing the device from a locked mode and opening a reminder application, changing the device from a locked mode and opening a predefined application set by a user, set by a manufacturer of the first device, or set by a service operator, activating an icon, selecting a menu item, moving a pointer on a display, manipulating a touch free mouse, an icon on a display, altering information on a display.

In some embodiments, the processor may be configured to collect information associated with the detected gesture, the detected gesture location, and/or a relationship between the detected gesture location and a control boundary over a period of time. The processor may store the collected information in memory. The collected information associated with the detected gesture, gesture location, and/or relationship between the detected gesture location and the control boundary may be used to predict user behavior. As used herein, the term "user" or "individual" may refer to a driver of a vehicle or one or more passengers of a vehicle.

Accordingly, the term "user behavior" may refer to driver behavior. Additionally, the term "pedestrian" may refer to one or more persons outside of a vehicle.

In some embodiments, a driver monitoring system (DMS) may be configured to monitor driver behavior. DMS may comprise a system that tracks the driver and acts accordingly to the driver's detected state, physical condition, emotional condition, cognitive load, actions, behaviors, driving performance, attentiveness, alertness, drowsiness. In some embodiments, DMS may comprise a system that tracks the driver and reports the driver's identity, demographics (gender and age), state, health, physical condition, emotional condition, cognitive load, actions, behaviors, driving performance, distraction, drowsiness. DMS may include modules that detect or predict gestures, motion, body posture, features associated with user alertness, driver alertness, fatigue, attentiveness to the road, distraction, features associated with expressions or emotions of a user, features associated with gaze direction of a user, driver or passenger, showing signs of sudden sickness, or the like.

One or more modules of the DMS may detect or predict actions including talking, shouting, singing, driving, sleeping, resting, smoking, reading, texting, holding a mobile device, holding a mobile device against the cheek, or held by hand for texting or speaker calling, watching content, playing digital game, using a head mount device such as smart glasses, virtual reality (VR), augmented reality (AR), device learning, interacting with devices within a vehicle, fixing the safety belt, wearing a seat belt, wearing seatbelt incorrectly, opening a window, getting in or out of the vehicle, picking an object, looking for an object, interacting with other passengers, fixing the glasses, fixing/putting eyes contacts, fixing the hair/dress, putting lipstick, dressing or undressing, involved in sexual activities, involved in violence activity, looking at a mirror, communicating with another one or more persons/systems/AIs using digital device, features associated with user behavior, interaction with the environment, interaction with another person, activity, emotional state, emotional responses to: content, event, trigger another person, one or more object, or learning the vehicle interior.

In other embodiments, DMS may detect facial attributes including head pose, gaze, face and facial attributes 3D location, facial expression, facial landmarks including: mouth, eyes, neck, nose, eyelids, iris, pupil, accessories including: glasses/sunglasses, earrings, makeup; facial actions including: talking, yawning, blinking, pupil dilation, being surprised; occluding the face with other body parts (such as hand, fingers), with other object held by the user (a cap, food, phone), by other person (other person hand) or object (part of the vehicle), user unique expressions (such as Tourette Syndrome related expressions), or the like.

In yet another embodiment, an occupant monitoring system (OMS) may be provided to monitor one or more occupants of a vehicle (other than the driver). For example, OMS may comprise a system that monitors the occupancy of a vehicle's cabin, detecting and tracking people and objects, and acts according to their presence, position, pose, identity, age, gender, physical dimensions, state, emotion, health, head pose, gaze, gestures, facial features and expressions. In some embodiments, OMS may include one or more modules that detect one or more person, person recognition/age/gender, person ethnicity, person height, person weight, pregnancy state, posture, out-of-position (e.g. leg's up, lying down, etc.), seat validity (availability of seatbelt), person skeleton posture, seat belt fitting, an object, animal presence in the vehicle, one or more objects in the vehicle, learning the vehicle interior, an anomaly, spillage, discoloration of interior parts, tears in upholstery, child/baby seat in the vehicle, number of persons in the vehicle, too many persons in a vehicle (e.g. 4 children in rear seat, while only 3 allowed), person sitting on other person's lap, or the like.

In other embodiments, OMS may include one or more modules that detect or predict features associated with user behavior, action, interaction with the environment, interaction with another person, activity, emotional state, emotional responses to: content, event, trigger another person, one or more object, detecting child presence in the car after all adults left the car, monitoring back-seat of a vehicle, identifying aggressive behavior, vandalism, vomiting, physical or mental distress, detecting actions such as smoking, eating and drinking, understanding the intention of the user through their gaze, or other body features.

In some embodiments, one or more systems disclosed herein, such as the DMS or the OMS, may store situational awareness information and response accordingly. Situational awareness information, for example, may comprise one or more of information related to a state of the device, information received by a sensor associated with the device, information related to one or more processes running on the device, information related to applications running on the device, information related to a power condition of the device, information related to a notification of the device, information related to movement of the device, information related to a spatial orientation of the device, information relating to an interaction with one or more users information relating to user behavior and information relating to one or more triggers. Triggers may be selected from a change in user interface of an application, a change in a visual appearance of an application, a change in mode of an application, a change in state of an application, an event occurring in software running on the first device, a change in behavior of an application, a notification received via a network, an online service notification, a notification generated by the device or an application or by a service, from a touch on a touch screen, a pressing of a virtual or real button, a sound received by a microphone connected to the device, detection of a user holding the first device, a signal from a proximity sensor, an incoming voice or video call via a cellular network, a wireless network, TCPIP, or a wired network, an incoming 3D video call, a text message notification, a notification of a meeting, a community network based communication, a Skype notification, a Facebook notification, a twitter notification, an on-line service notification, a missed call notification, an email notification, a voice mail notification, a device notification, a beginning or an end of a song on a player, a beginning or an end of a video, or the like.

In some embodiments, driver behavior may include one or more driving behaviors or actions, such as crossing over another vehicle, accelerating, decelerating, suddenly stopping, crossing a separation line, driving in a center, a right side, or a left side of a particular lane, changing locations within a lane, being in a constant location relative to a lane, changing lanes, vehicle's speed in relation to speeds of other vehicles in proximity, distance of the vehicle in relation to other vehicles, looking or not at: signs along the road, traffic signs, a vehicle on the same lane of the driver's vehicle, vehicles on other lanes, looking for parking, looking, looking at pedestrians, humans on the road (workers, policeman, drivers ort passengers getting out of the car, etc.), looking at an open door of a parking car. Driver behavior may further relate to driving behavior, driving patterns, driving habits, or driving activities that are not similar (correlated) to previous driver's driving patterns, behaviors, or habits, including: controlling the steering wheel, changing gears, looking at different mirrors, patterns of looking at mirrors, signaling of changing lanes, gestures performed by the driver, eyes movement, gaze direction, gaze movement patterns, patterns of driving related to the driver physiological state (such as the driver is alert or tired), psychological state of the driver (focus on driving, driver's mind is wandering, emotional state including being: angry, upset, frustrated, sad, happy, optimistic, inspired, etc.), patterns of driving in relation to what passengers are in the driver's vehicle (the same driver may drive differently in the event he is alone in the vehicle or his kids, wife, friend(s), parents, colleague or any combination of these are also in the vehicle. Driving patterns may relate to patterns of driving at different hours of the day, different type of roads, different locations (including a familiar location such as the way to work, home, known location; driving in non-familiar location, driving abroad), different days of the week (weekdays, weekend days), the purpose of driving (leisure such as toward restaurant, beach, as part of a tour, visiting friends etc.; or work-related such as driving toward a meeting). As used herein, a state of the driver may refer to one or more behaviors of the driver, motion(s) of the head of the driver, feature(s) of the eye(s) of the driver, a psychological or emotional state of the driver, a physical or physiological state of the driver, one or more activities the driver is or was engaged with, or the like.

In some embodiments, for example, the state of the driver may relate to the context in which the driver is present. The context in which the driver is present may include the presence of other humans/passengers, one or more activities or behavior of one or more passengers, one or more psychological or emotional state of one or more passengers, one or more physiological or physical state of one or more passengers, the communication with one or more passengers or communication between one or more passengers, animal presence in the vehicle, one or more objects in the vehicle (wherein on or more objects present in the vehicle are defined as sensitive objects (breakable objects such as display, objects from delicate material such as glass, art related objects), the phase of the driving mode (manual driving, autonomous mode of driving), the phase of driving, parking, getting in/out of parking, driving, stopping (with brakes), the number of passengers in the vehicle, a motion/driving pattern of one or more vehicles on the road, and/or the environmental conditions. Furthermore, the state of the driver may relate to the appearance of the driver including, haircut, a change in haircut, dress, wearing accessories (such as glasses/sunglasses, earrings, piercing, hat), and/or makeup.

Additionally, or alternatively, the state of the driver may relate to facial features and expressions, out-of-position (e.g. leg's up, lying down, etc.), person sitting on other person's lap, physical or mental distress, interaction with another person, and/or emotional responses to content or event taking place in the vehicle or outside the vehicle. In some embodiments, the state of the driver may relate to age, gender, physical dimensions, health, head pose, gaze, gestures, facial features and expressions, height, weight, pregnancy state, posture, seat validity (availability of seatbelt), and/or interaction with the environment.

A psychological or emotional state of the driver may be any psychological or emotional state of the driver including but not limited to emotions of joy, fear, happiness, anger, frustration, hopeless, being amused, bored, depressed, stressed, or self-pity, being disturbed, in a state of hunger, or pain. Psychological or emotional state may be associated with events in which the driver was engaged with prior to or events in which the driver is engaged in during the current driving session, including but not limited to: activities (such as social activities, sports activities, work-related activities, entertainment-related activities, physical-related activities such as sexual, body treatment, or medical activities), communications relating to the driver (whether passive or active) occurring prior to or during the current driving session. By way of further example, the communications (which are accounted for in determining a degree of stress associated with the driver) can include communications that reflect dramatic, traumatic, or disappointing occurrences (e.g., the driver was fired from his/her job, learned of the death of a close friend/relative, learning of disappointing news associated with a family member or a friend, learning of disappointing financial news, etc.). Events in which the driver was engaged with prior to or events in which the driver during the current driving session may further include emotional response(s) to emotions of other humans in the vehicle or outside the vehicle, content being presented to the driver whether it is during a communication with one or more persons or broadcasted in its nature (such as radio). Psychological state may be associated with one or more emotional responses to events related to driving including other drivers on the road, or weather conditions. Psychological or emotional state may further be associated with indulging in self-observation, being overly sensitive to a personal/self-emotional state (e.g. being disappointed, depressed) and personal/self-physical state (being hungry, in pain).

Psychological or emotional state information may be extracted from an image sensor and/or external source(s) including those capable of measuring or determining various psychological, emotional or physiological occurrences, phenomena, etc. (e.g., the heart rate of the driver, blood pressure), and/or external online service, application or system (including data from connected or remote device(s), such as 'the cloud').

Physiological or physical state of the driver may include: the quality and/or quantity (e.g., number of hours) of sleep the driver engaged in during a defined chronological interval (e.g., the last night, last 24 hours, etc.), body posture, skeleton posture, emotional state, driver alertness, fatigue or attentiveness to the road, a level of eye redness associated with the driver, a heart rate associated with the driver, a temperature associated with the driver, one or more sounds produced by the driver. Physiological or physical state of the driver may further include: information associated with: a level of driver's hunger, the time since the driver's last meal, the size of the meal (amount of food that was eaten), the nature of the meal (a light meal, a heavy meal, a meal that contains meat/fat/sugar), whether the driver is suffering from pain or physical stress, driver is crying, a physical activity the driver was engaged with prior to driving (such as gym, running, swimming, playing a sports game with other people (such a soccer or basketball), the nature of the activity (the intensity level of the activity (such as a light activity, medium or highly intensity activity), malfunction of an implant, stress of muscles around the eye(s), head motion, head pose, gaze direction patterns, body posture.

Physiological or physical state information may be extracted from an image sensor and/or external source(s) including those capable of measuring or determining various physiological occurrences, phenomena, etc. (e.g., the heart rate of the driver, blood pressure), and/or external online service, application or system (including data from 'the cloud').

Furthermore, driving patterns may relate to: pattern of driving in relation to driving patterns of other vehicles/drivers on the road, happening taking place in the vehicle including communication with or between passengers, the behavior of one or more passengers, expressions of one or more passengers. Driving patterns may further relate to an internal driver response (such as an emotional response) or an external driver response (such as an expression or an action) to: a human (including passenger, pedestrian, other drivers, human on the other side of the communication device), content (such as visual or/and audio content including: communication, conference meeting, news, a content presented to the driver further to a request from the driver, blog, audiobook, movie, TV-show, interviews, podcast, a content presented via a social platform, communication channel, advertisement, sports-related content, or the like.

In other embodiments, the state of the driver can reflect, correspond to, and/or otherwise account for various identifications, determinations, etc. with respect to event(s) occurring within the vehicle, an attention of the driver in relation to a passenger within the vehicle, occurrence(s) initiated by passenger(s) within the vehicle, event(s) occurring with respect to a device present within the vehicle, notification(s) received at a device present within the vehicle, event(s) that reflect a change of attention of the driver toward a device present within the vehicle, etc. In certain implementations, these identifications, determinations, etc. can be performed via a neural network and/or utilizing one or more machine learning techniques.

The state of the driver may also reflect, correspond to, and/or otherwise account for events or occurrences such as: a communications between a passenger and the driver, communication between one or more passengers, a passenger unbuckling a seat-belt, a passenger interacting with a device associated with the vehicle, behavior of one or more passengers within the vehicle, non-verbal interaction initiated by a passenger, or physical interaction(s) directed towards the driver.

Additionally, in some embodiments, the state of the driver can reflect, correspond to, and/or otherwise account for the state of a driver prior to and/or after entry into the vehicle. For example, previously determined state(s) associated with the driver of the vehicle can be identified, and such previously determined state(s) can be utilized in determining (e.g., via a neural network and/or utilizing one or more machine learning techniques) the current state of the driver. Such previously determined state(s) can include, for example, previously determined states associated during a current driving interval (e.g., during the current trip the driver is engaged in) and/or other intervals (e.g., whether the driver got a good night's sleep or was otherwise sufficiently rested before initiating the current drive). Additionally, in certain implementations a state of alertness or tiredness determined or detected in relation to a previous time during a current driving session can also be accounted for. The state of the driver may also reflect, correspond to, and/or otherwise account for various navigation conditions or environmental conditions present inside and/or outside the vehicle. As used herein, navigation conditions may reflect, correspond to, and/or otherwise account for road condition(s) (e.g., temporal road conditions) associated with the area or region within which the vehicle is traveling, environmental conditions proximate to the vehicle, presence of other vehicle(s) proximate to the vehicle, a temporal road condition received from an external source, a change in road condition due to weather event, a presence of ice on the road ahead of the vehicle, an accident on the road ahead of the vehicle, vehicle(s) stopped ahead of the vehicle, a vehicle stopped on the side of the road, a presence of construction on the road, a road path on which the vehicle is traveling, a presence of curve(s) on a road on which the vehicle is traveling, a presence of a mountain in relation to a road on which the vehicle is traveling, a presence of a building in relation to a road on which the vehicle is traveling, or a change in lighting conditions. In other embodiments, navigation condition(s) can reflect, correspond to, and/or otherwise account for various behavior(s) of the driver. In yet another embodiment, navigation condition(s) can also reflect, correspond to, and/or otherwise account for incident(s) that previously occurred in relation to a current location of the vehicle in relation to one or more incidents that previously occurred in relation to a projected subsequent location of the vehicle.

Additionally, environmental conditions may include, but are not limited to: road conditions (e.g. sharp turns, limited or obstructed views of the road on which a driver is traveling, which may limit the ability of the driver to see vehicles or other objects approaching from the same side and/or the other side of the road due to turns or other phenomena, a narrow road, poor road conditions, sections of a road that on which accidents or other incidents occurred, etc.), weather conditions (e.g., rain, fog, winds, etc.). Environmental or road conditions can also include, but are not limited to: a road path (e.g., curves, etc.), environment (e.g., the presence of mountains, buildings, etc. that obstruct the sight of the driver), and/or changes in light conditions (e.g., sunlight or vehicle light directed towards the eyes of the driver, sudden darkness when entering a tunnel, etc.).

In some embodiments, driver behavior may further relate to driver interacting with objects in the vehicle, including devices of the vehicle such as: navigation system, infotainment system, air conditioner, mirrors; objects located in the car, digital information present to the driver visual, audio, or haptic. Driver behavior may further relate to one or more activity the driver is partaking while driving such as eating, communicating, operating a mobile device, playing a game, reading, working, operating a digital device such as mobile phone, tablet, computer, augmented reality (AR) and/or virtual reality (VR) device, sleeping, and meditating. Driver behavior may further relate to driver posture and seat position/orientation while driving or not driving (such as an autonomous driving mode). Driver behavior may further relate to an event taking place before the current driving session.

Additionally, or alternatively, driver behavior may comprise characteristics of one or more of these driver behaviors, wherein the intensity of the behavior (activity, emotional response) is also determined. There is a difference between an event where a driver is taking a sip from a coke can once in a while (e.g., every few minutes) and an event where a driver is holding a can from the moment it was opened until the end of drinking, while taking long sips (e.g., few seconds each), with very little gap in time between sips. The same activity with different intensities may have very different meanings and implications on the driving activity.

Driver behavior may be identified in relation to driving attentiveness, alertness, driving capabilities, temporary or constant physiological and/or psychological states (such as tiredness, frustration, eyesight deficiencies, motor responding time, age-related physiological parameters such as response time, etc.) In some embodiments, driver behavior may be identified, at least in portion, based on a detected gesture performed by the driver and/or the driver's gaze movement, body posture, change in body posture, or interaction with the surrounding including other humans (such as passengers), device, digital content. Driver's interactions may be passive interaction (such as listening) or active interaction (such as participating including all forms of expressing). Driver behavior may be further identified by detecting and/or determining driver actions.

In some embodiments, driver behavior may relate to one or more actions, one or more body gestures, one or more posture, one or more activities. Driver behavior may relate to one or more events that takes place in the car, attention toward one or more passenger, one or more kids at the back asking for attention. Furthermore, driver behavior may relate to aggressive behavior, vandalism, or vomiting. One or more activities may comprise an activity that the driver is engaged with during the current driving interval or prior to the driving interval. Alternatively, one or more activities may comprise an activity that the driver was engaged with, including the amount of time the driver is driving during the current driving session and/or over a defined chronological interval (e.g., the past 24 hours), or a frequency at which the driver engages in driving for an amount of time comparable to the duration of the driving session the driver is currently engaged in. Posture may comprise any body posture of the driver during the driving, including body postures which are defined by the law as not suitable for driving (such as placing the legs on the dashboard), or body posture that may increase the risk for an accident to take place. In addition, one or more body gestures may relate to any gesture performed by the driver by one or more body parts, including gestures performed by hands, head, or eyes of the driver. In other embodiments, a driver behavior may comprise a combination of one or more actions, one or more body gestures, one or more driver postures, and/or one or more activities. For example, driver behavior may comprise the driver operating the phone while smoking, talking to passengers at the back while looking for an item in a bag, talking to one or more persons while turning on the light in the vehicle while searching for an item that fell on the floor of the vehicle, or the like.

Additionally, in some embodiments, actions or activities may include intervention-action(s) (e.g., action(s) of the system that is an intervention to the driver). Intervention-action(s) may comprise, for example, providing one or more stimuli such as visual stimuli (e.g. turning on/off or increase light in the vehicle or outside the vehicle), auditory stimuli, haptic (tactile) stimuli, olfactory stimuli, temperature stimuli, air flow stimuli (e.g., a gentle breeze), oxygen level stimuli, interaction with an information system based upon the requirements, demands or needs of the driver, or the like. Intervention-action(s) may further be a different action of stimulating the driver, including changing the seat position, changing the lights in the car, turning off, for a short period, the outside light of the car (to create a stress pulse in the driver), creating a sound inside the car (or simulating a sound coming from outside), emulating the sound of the direction of a strong wind hitting the car, reducing/increasing the music in the car, recording sounds outside the car and playing them inside the car, changing the driver seat position, providing an indication on a smart windshield to draw the attention of the driver toward a certain location, providing an indication on the smart windshield of a dangerous road section/turn. In some embodiments, intervention-action(s) may be correlated to a level of attentiveness of the driver, a determined required attentiveness level, a level of predicted risk (to the driver, other driver(s), passenger(s), vehicle(s), etc.), information related to prior actions during the current driving session, information related to prior actions during previous driving sessions, etc.

In some embodiments, an indication may comprise, for example, a visual indication, an audio indication, a tactile indication, an ultrasonic indication, and/or a haptic indication. A visual indication may be, for example, in a form such as an icon displayed on a display screen, a change in an icon on a display screen, a change in color of an icon on a display screen, an indication light, an indicator moving on a display screen, a directional vibration indication, and/or an air tactile indication. The indication may be provided by an indicator moving on a display screen. The indicator may appear on top of all other images or video appearing on the display screen.

In some embodiments, driver behavior may comprise at least one of: an event occurring within the vehicle, an attention of the driver in relation to a passenger within the vehicle, one or more occurrences initiated by one or more passengers within the vehicle, one or more events occurring with respect to a device present within the vehicle, one or more notifications received at a device present within the vehicle, and/or one or more events that reflect a change of attention of the driver toward a device present within the vehicle. In some embodiments, driver behavior may be associated with behavior of one or more passengers other than the driver in the vehicle. Behavior of one or more passengers within the vehicle may refer to any type of behavior of one or more passengers in the vehicle, including communication of a passenger with the driver, communication between one or more passengers, a passenger unbuckling a seatbelt, a passenger interacting with a device associated with the vehicle, behavior of passengers in the back seat of the vehicle, non-verbal interactions between a passenger and the driver, physical interactions associated with the driver, and/or any other behavior described and/or referenced herein.

In another embodiment of the present disclosure, systems and methods for detecting a driver's proper control over a vehicle, and particularly a steering wheel of the vehicle, and the driver's response time in an event of an emergency is disclosed. Such system may be any system in which, at least at some point during a driver's operation of a vehicle, the system is able to detect a location, orientation, or posture of the driver's hand(s) or other body parts on the steering wheel and determine the driver's level of control over the vehicle and the driver's response time to act in an event of an emergency.

Figure 12:
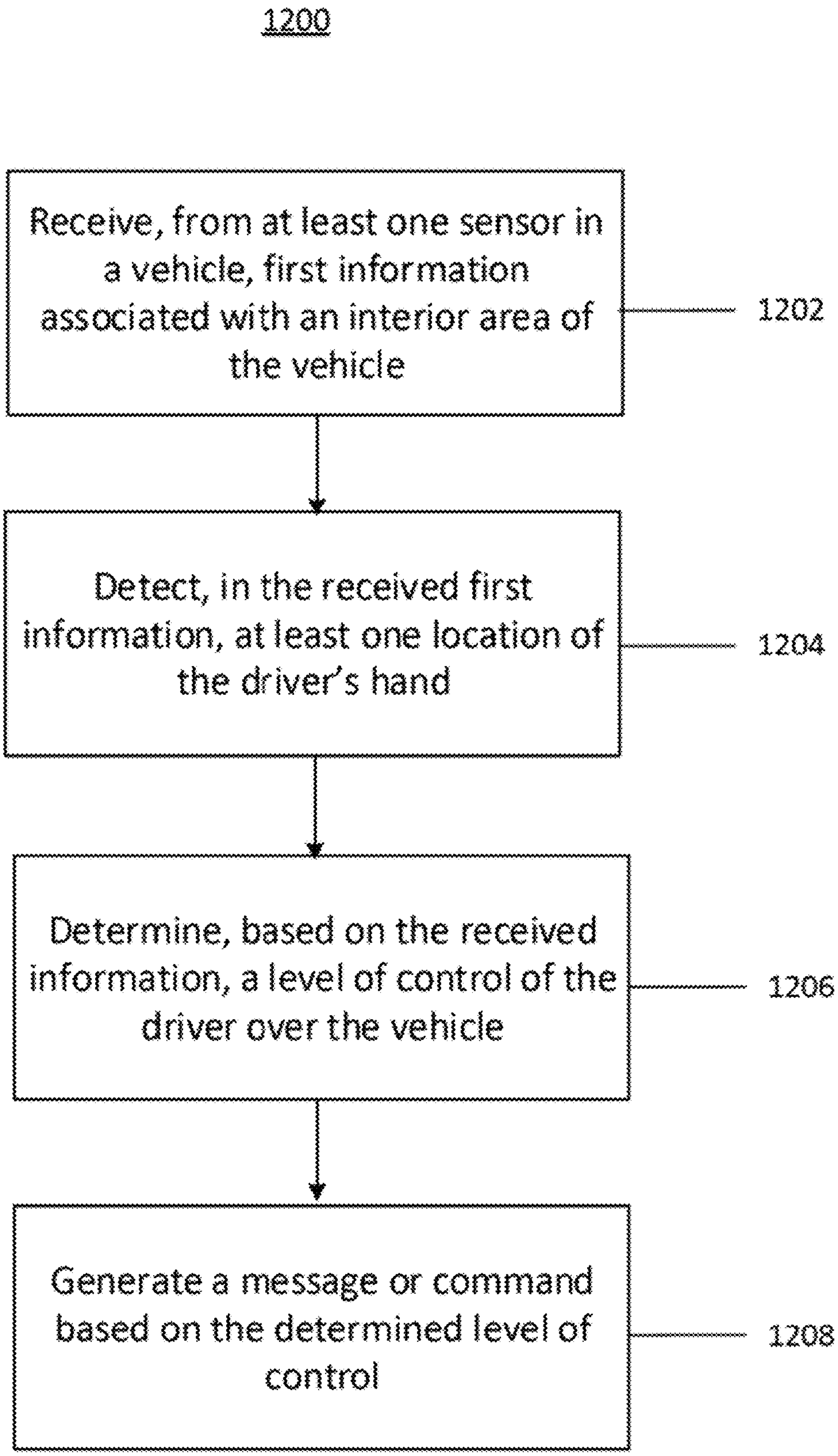
FIG. 12 illustrates a flowchart of an exemplary method for determining a driver's level of control over a vehicle, consistent with the embodiments of the present disclosure.

By way of example, FIG. 12 illustrates an exemplary method 1200 for determining a driver's level of control over a vehicle, consistent with the embodiments of the present disclosure. Method 1200 may be implemented using the system for detecting the driver's proper control over the vehicle. Method 1200 may begin at step 1202, at which at least one processor of the system receives, from at least one sensor in a vehicle, first information associated with an interior area of the vehicle. For example, the at least one sensor may be at least one image sensor such as at least one camera in the vehicle. In some embodiments, the at least one sensor may comprise a touch-free sensor. In some embodiments, the first information may include image information as disclosed herein. The processor may compare received information from the touch-free sensor to a control boundary in a field of view of the touch-free sensor to determine the driver's level of control over the vehicle. The control boundary may be associated with, for example, the steering wheel of the vehicle. In other embodiments, the processor may combine information from an image sensor, such as a camera, in the vehicle with information from one or more other sensors in the vehicle, such as touch sensors, proximity sensors, microphones, and other sensors disclosed herein, to determine the driver's level of control over the vehicle. The information received from the at least one sensor may be associated with an interior area of the vehicle. For example, the information may be image information associated with a position of the driver's hand(s) on a steering wheel of the vehicle or a relative position of the driver's hand(s) to the steering wheel.

At step 1204, the processor may be configured to detect, using the received first information, at least one location of the driver's hand. After detecting at least one location of the driver's hand, method 1200 may proceed to step 1206. At step 1206, based on the received first information, the processor may be configured to determine a level of control of the driver over the vehicle. As described later in greater detail, the processor may be able to determine the driver's level of control over the vehicle based on which body parts of the driver, if any, are in contact with the steering wheel of the vehicle, based on location(s) of one or more body parts of the driver in the vehicle, based on location(s) of one or more body parts of passengers other than the driver in the vehicle, based on location(s) of one or more objects in the vehicle, based on the driver's interaction with one or more objects in the vehicle, or any combination thereof. Based on the determined level of control of the driver over the vehicle, method 1200 may proceed to step 1208. At step 1208, the processor may be configured to generate a message or command based on the determined level of control.

As discussed above, in some embodiments, the processor may detect a position of the driver's hand(s) on a steering wheel of the vehicle. In order to determine a position of the driver's hand(s) on the steering wheel, the processor may detect one or more features associated with the driver's hand(s) in relation to the steering wheel. For example, the processor may detect a posture or an orientation of the driver's hand(s) while the driver is in contact with the steering wheel. A posture of the driver's hand(s) may comprise different orientations of the hand(s). By way of example, a posture of the driver's hand may include the driver's hand grasping the steering wheel, touching the steering wheel with one or more fingers, touching the steering wheel with an open hand, lightly holding the steering wheel, or firmly holding the steering wheel. In some embodiments, the processor may detect a location and orientation of the driver's hand(s) over the steering wheel and compare them to predefined locations and orientations that represent different levels of control over the steering wheel. Based on the comparison, the processor may determine the driver's level of control over the steering wheel and also predict the driver's response time to act in an event of an emergency.

In some embodiments, machine learning-based determination of the driver's level of control and response time to act in an event of an emergency may be performed offline by training or "teaching" a CNN (convolution neural network) a driver's different levels of control using a database of images and videos of different historical data associated with the driver. Historical data associated with the driver may comprise, for example, the driver's behaviors (such as images/video of the driver's behaviors taking place in a vehicle, such as the driver eating, talking, fixing their glasses/hair/makeup, searching for an item in a bag, holding a sandwich, holding a mobile phone, operating a device, operating one or more touch-free user interaction devices in the vehicle, touching, etc.). Additionally, or alternatively, historical data associated with the driver may comprise previous locations, positions, postures, and/or orientations of one or more of the driver's body parts (such as previous locations or positions of the driver's hand(s) on the steering wheel, previous locations or positions of the driver's body part(s) other than the driver's hand(s) on the steering wheel, previous postures or previous orientations of the driver's hand(s) on the steering wheel, etc.). In some embodiments, historical data may further comprise previous driving events (such as all aspects of previous events that have taken place when the driver was operating the vehicle), the driver's ability to respond to previous driving events, previous environmental conditions (such as the amount of traffic on the road, the weather, the time of day or year, the bumpiness of the road, etc.), or any combination thereof. As disclosed herein, driving events may be associated with driving actions taken by the driver of the vehicle, driving conditions associated with the surroundings of the vehicle, or other circumstances or characteristics associated with the operation of the vehicle. Historical data may also comprise previous behaviors of passengers other than the driver, or previous locations, positions, postures, and/or orientations of body parts of one or more passengers other than the driver. In some embodiments, the ability of the driver to respond to a driving event or to react may be associated with actions the driver takes to avoid or minimize harm to the driver, the vehicle, and other persons, vehicles, or objects. For example, an inability or low ability to respond may be associated with damage to the vehicle due to the driver's slow response time or insufficient control of the steering wheel. Conversely, a high ability to respond may be associated with no damage to the vehicle or other harm. The adequacy of the driver's ability to respond may vary depending on the particular driving event or conditions.

In some embodiments, the detection of driver's level of control, response time, and/or behavior by machine learning take place by offline "teaching" of a neural network of different events/actions performed by a driver (such as a driver reaching toward an item, a driver selecting an item, a driver picking up an item, a driver bring the item closer to his face, a driver chewing, a driver turn his or her head, a driver looking aside, a driver reaching toward an item behind them or in the back of a room or vehicle, a driver talking, a driver looking toward a main mirror such as a center rear-view mirror, a driver shutting an item such as a door or compartment, a driver coughing, or a driver sneezing). Then, the system's processor may detect, determine, and/or predict driver's level of control, response time, and/or behavior using a combination of one or more action(s)/event(s) that were detected. Those of skill in the art will understand that the term "machine learning" is non-limiting, and may include techniques such as, but not limited to, computer vision learning, deep machine learning, deep learning and deep neural networks, neural networks, artificial intelligence, and online learning, i.e., learning during operation of the system. Machine learning may include one or more algorithms and mathematical models implemented and running on a processing device. The mathematical models that are implemented in a machine learning system may enable a system to learn and improve from data based on its statistical characteristics rather on predefined rules of human experts. Machine learning may also involve computer programs that can automatically access data and use the accessed data to "learn" how to perform a certain task without the input of detailed instructions for that task by a programmer.

In some embodiments, machine learning-based determination of the driver's level of control and response time to act in an event of an emergency may be performed offline by training or "teaching" a neural network of a driver's different levels of control using a database of images and videos of different historical data associated with the driver. Historical data associated with the driver may comprise, for example, the driver's behaviors (such as images/video of the driver's behaviors taking place in a vehicle, such as the driver eating, talking, fixing their glasses/hair/makeup, searching for an item in a bag, holding a sandwich, holding a mobile phone, operating a device, operating one or more touch-free user interaction devices in the vehicle, touching, etc.). Additionally, or alternatively, historical data associated with the driver may comprise previous locations, positions, postures, and/or orientations of one or more of the driver's body parts (such as previous locations or positions of the driver's hand(s) on the steering wheel, previous locations or positions of the driver's body part(s) other than the driver's hand(s) on the steering wheel, previous postures or previous orientations of the driver's hand(s) on the steering wheel, etc.). In some embodiments, historical data may further comprise previous driving events (such as all aspects of previous events that have taken place when the driver was operating the vehicle), the driver's ability to respond to previous driving events, previous environmental conditions (such as the amount of traffic on the road, the weather, the time of day or year, the bumpiness of the road, etc.), or any combination thereof. Historical data may also comprise previous behaviors of passengers other than the driver, or previous locations, positions, postures, and/or orientations of body parts of one or more passengers other than the driver.

Then, the processor may be configured to detect, determine, and/or predict the driver's level of control over the steering wheel of the vehicle using a combination of one or more characteristics of the driver that were detected, one or more driving events detected, and/or one or more environmental conditions detected. For example, the processor may be configured to use the machine learning algorithm to compare the characteristics of the driver that were detected, one or more driving events detected, and/or one or more environmental conditions detected to corresponding historical data and, based on the comparison, determine or predict the driver's level of control over the vehicle or response time to an emergency. In some embodiments, the processor may compare, using the machine learning algorithm, at least one of a detected location or orientation of the driver's hand to at least one of a previous location or orientation in the historical data to determine the driver's level of control over the vehicle and response time. By way of example, the driver's level of control determined or predicted may relate or correspond to a response time of the driver in an event of an emergency. Accordingly, the processor may be configured to determine the response time of the driver using the machine learning algorithm based on data associated with the driver, including but not limited to a posture or orientation of the driver's hand(s), one or more locations of the driver's hand(s), one or more driving events, or other historical data associated with the driver. As used herein, the response time of the driver may refer to a time period before the driver acts in an emergency situation. In some embodiment, the response time of the driver may be determined using information associated with one or more physiological or psychological characteristics of the driver. By way of example, the vehicle may comprise one or more sensors or systems configured to monitor physiological characteristics or psychological characters of the driver. One or more physical characteristics of the driver detected may comprise, for example, a location, position, posture, or orientation of one or more body parts of the driver, a location, position, posture, or orientation of one or more body parts of a passenger other than the driver, a driver's behavior, a passenger's behavior, or the like. One or more psychological characteristics of the driver may comprise attentiveness of the driver, sleepiness of the driver, how distracted the driver is, or the like. Based on a combination of one or more physiological or psychological characteristics of the driver, the processor may determine the driver's level of control and/or response time.

In some embodiments, the processor may be configured to use a machine learning algorithm to determine the driver's level of control based on a combination of one or more characteristics of the driver that were detected, one or more driving events detected, one or more environmental conditions detected, and/or information associated with the driver's driving behavior. Information associated with the driver's driving behavior may comprise, for example, a driving pattern of the driver, such as the driver's actions or movement in the vehicle, the driver reaching for one or more objects or persons in the vehicle, the driver's driving habits while operating the vehicle, or how the driver drives the vehicle. In some embodiments, the processor may also use a machine learning algorithm to correlate characteristics of the driver detected to specific driving behaviors that may be indicative of the driver's level of control over the vehicle.

By way of example, the processor may use the machine learning algorithm to correlate an orientation, posture, or location of the driver's body parts such as the driver's hand(s) to a particular driving behavior of the driver. Based on the correlation, the processor may be configured to determine the driver's level of control over the vehicle.

As different drivers have different driving behaviors, habits, and patterns, as well as different behaviors of placing the hands over the wheel, in some embodiments, the processor may compare the detected location and orientation of the driver's hand(s) over the steering wheel to previous locations and orientations of the same driver's hand(s) in previous driving sessions or at an earlier point in time in the same driving session. Accordingly, the processor may determine the level of control the driver has over the steering wheel and the response time to act in an event of an emergency. In some embodiments, the processor may allow one or more machine learning algorithms to learn online the driver's driving behaviors, habits, and patterns such that it can associate the driver's location and orientation of the hand(s) over the steering wheel to the driver's level of control over the vehicle. The driver's level of control over the vehicle may also reflect on the driver's response time in an event of an emergency.

In some embodiments, in an event of an emergency, the driver may need to control the vehicle while, for example, the vehicle slides (such as slides over an oil), is hit by a strong wind, makes a sharp turn, suddenly brakes, slides out of the road, is hit by another vehicle, or needs to swerve away from another vehicle or human. The system may comprise one or more sensors (e.g., accelerometers, gyroscope, etc.) that detects an event of an emergency or determine a state of emergency. In other embodiments, the system may be notified by one or more other systems about an event of an emergency or a state of emergency. In an event or state of emergency, the processor may be configured to determine, using a machine learning algorithm, a required level of control of the driver over the vehicle. For example, the machine learning algorithm may use information related to current or future driving circumstances to determine a required level of control over the vehicle. Current or future driving circumstances, for example, may include one or more road-related parameters or environmental conditions (such as a number of holes in the road and the level of risk the holes introduce), information associated with surrounding vehicles (such as vehicles that are within the driver's sensing capabilities, vehicles that are networked or in other types of communication with one another, vehicles that transmit location information and other data), proximate events taking place on the road (such as a vehicle crossing over a car on the opposite lane), weather conditions, and/or visual hazards. Future driving circumstances may be associated with a predetermined time period ahead of current driving circumstances. For example, future driving circumstances may take place 3 seconds, 10 second, or 30 seconds ahead of current driving circumstances.

Those of skill in the art will understand that the term "machine learning" is non-limiting, and may include techniques such as, but not limited to, computer vision learning, deep machine learning, deep learning and deep neural networks, neural networks, artificial intelligence, and online learning, i.e. learning during operation of the system. Machine learning may include one or more algorithms and mathematical models implemented and running on a processing device. The mathematical models that are implemented in a machine learning system may enable a system to learn and improve from data based on its statistical characteristics rather on predefined rules of human experts. Machine learning may also involve computer programs that can automatically access data and use the accessed data to "learn" how to perform a certain task without the input of detailed instructions for that task by a programmer.

Machine learning mathematical models may be shaped according to the structure of the machine learning system, supervised or unsupervised, the flow of data within the system, the input data and external triggers. In some aspects, machine learning can be related as an application of artificial intelligence (AI) that provides systems the ability to automatically learn and improve from data input without being explicitly programmed.

Machine learning may apply to various tasks, such as feature learning algorithms, sparse dictionary learning, anomaly detection, association rule learning, and collaborative filtering for recommendation systems. Machine learning may be used for feature extraction, dimensionality reduction, clustering, classifications, regression, or metric learning. Machine learning system may be supervised and semi-supervised, unsupervised, reinforced.

Machine learning system may be implemented in various ways including linear and logistic regression, linear discriminant analysis, support vector machines (SVM), decision trees, random forests, ferns, Bayesian networks, boosting, genetic algorithms, simulated annealing, or convolutional neural networks (CNN).

Deep learning is a special implementation of a machine learning system. In one example, deep learning algorithms may discover multiple levels of representation, or a hierarchy of features, with higher-level, more abstract features extracted using lower-level features. Deep learning may be implemented in various feedforward or recurrent architectures including multi-layered perceptrons, convolutional neural networks, deep neural networks, deep belief networks, autoencoders, long short term memory (LSTM) networks, generative adversarial networks, and deep reinforcement networks.

Figure 13:
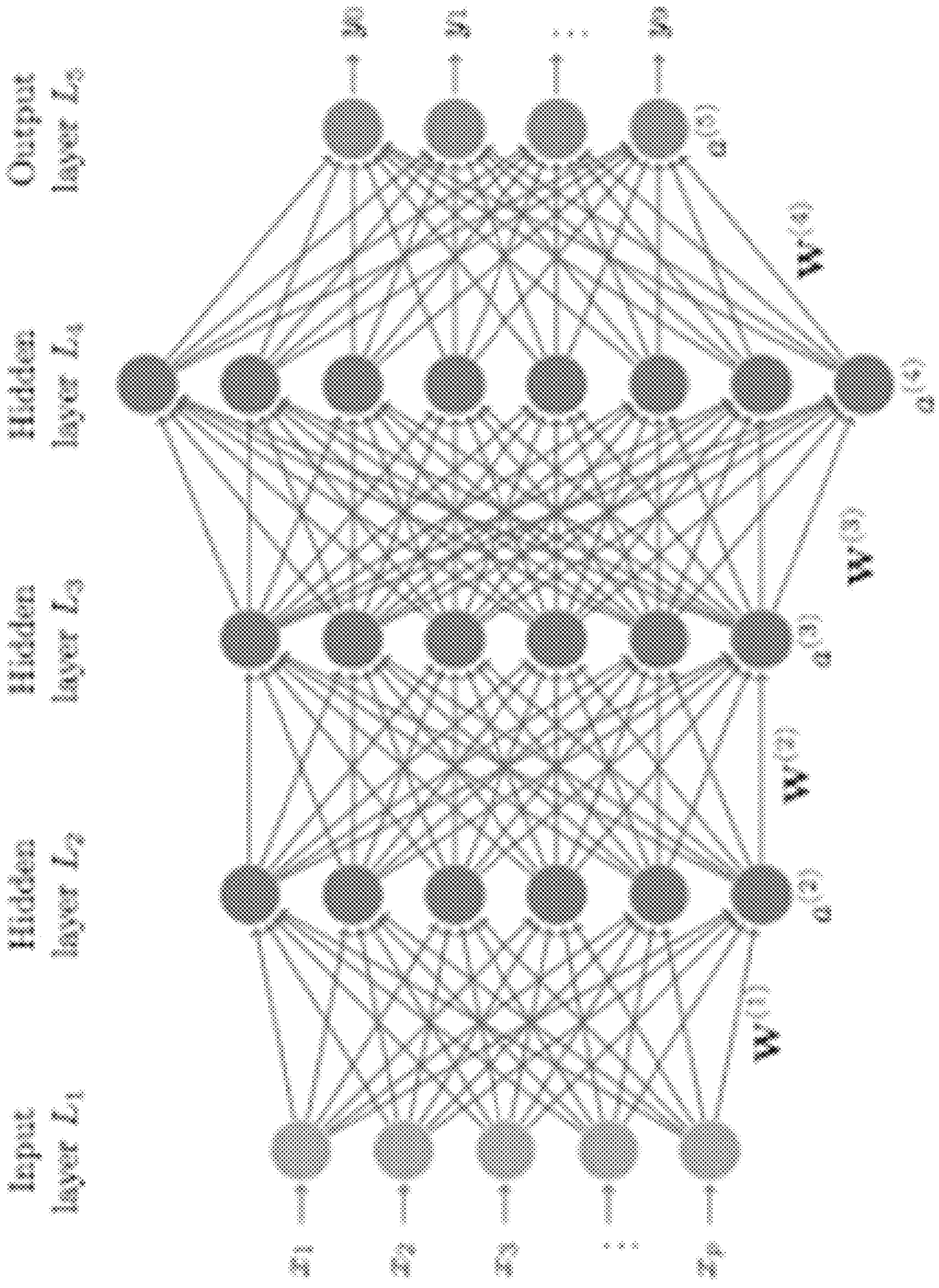
FIG. 13 illustrates an example of a multi-layered machine learning algorithm, consistent with embodiments of the present disclosure.

Machine learning algorithms employed with the disclosed embodiments may include one or more input layers, one or more hidden layers, and one or more output layers. In some embodiments, an input layer may comprise a plurality of input nodes representing different types or pieces of input information. The machine learning algorithm may process the input nodes using one or more classifiers or other associative algorithms, and generate one or more hidden layers. Each hidden layer may comprise a plurality of nodes representing potential outcome nodes determined based on the classifications or associations between various combinations of the input nodes. Each hidden layer may comprise an iteration of the machine learning algorithm. The output layer may comprise a final layer of the machine learning algorithm, at which point the final determination(s) of the machine learning algorithm are provided in the form of a data point that one or more systems may use to generate a command or message consistent with the disclosed embodiments. The output layer may be identified based on one or more parameters of the machine learning algorithm, such as a required confidence level of the layer nodes, as predefined number of iterations, or other parameters or hyperparameters of the machine learning algorithm. An example of a machine learning algorithm structure is provided in FIG. 13, but the disclosed embodiments are not limited to any particular type of machine learning algorithm or classification system.

The architectures mentioned above are not mutually exclusive and can be combined or used as building blocks for implementing other types of deep networks. For example, deep belief networks may be implemented using autoencoders. In turn, autoencoders may be implemented using multi-layered perceptrons or convolutional neural networks.

Training of a deep neural network may be cast as an optimization problem that involves minimizing a predefined objective (loss) function, which is a function of predetermined network parameters, actual measured or detected values, and desired predictions of those values. The goal is to minimize the differences between the actual value and the desired prediction by adjusting the network's parameters. In some embodiments, the optimization process is based on a stochastic gradient descent method which is typically implemented using a back-propagation algorithm. However, for some operating regimes, such as in online learning scenarios, stochastic gradient descent has various shortcomings, and other optimization methods may be employed to address these shortcomings. In some embodiments, deep neural networks may be used for predicting various human traits, behavior and actions from input sensor data such as still images, videos, sound and speech.

In some embodiments, machine learning system may go through multiple periods, such as, for example, an offline learning period and a real-time execution period. In the offline learning period, data may be entered into a "black box" for processing. The "black box" may be a different structure for each neural network, and the values in the "black box" may define the behavior of the neural network. In the offline learning period, the values in the "black box" may be changed automatically. Some neural networks or structures may require supervision, while others may not. In some embodiments, the machine learning system may not tag the data and extract only the outcomes. In a real-time execution period, the data may have entered through the neural network after the machine learning system finished the offline learning period. The values in the neural network may be fixed at this point. Unlike traditional algorithms, data entering the neural network may flow through the network instead of being stored or collected. After the data flows through the network, the network may provide different outputs, such as model outputs.

In some embodiments, a deep recurrent long short-term memory (LSTM) network may be used to anticipate a vehicle driver's/operator's behavior, or predict their actions before it happens, based on a collection of sensor data from one or more sensors configured to collect images such as video data, tactile feedback, and location data such as from a global positioning system (GPS). In some embodiments, prediction may occur a few seconds before the action happens. A "vehicle" may include a moving vessel or object that transports one or more persons or objects across land, air, sea, or space. Examples of vehicles may include a car, a motorcycle, a scooter, a truck, a bus, a sport utility vehicle, a boat, a personal watercraft, a ship, a recreational land/air/sea craft, a plane, a train, public/private transportation, a helicopter, a Vertical Take Off and Landing (VTOL) aircraft, a spacecraft, a military aircraft or boat or wheeled transport, a drone that is controlled/piloted by a remote driver, an autonomous flying vehicle, and any other machine that may be driven, piloted, or controlled by a human user. In some embodiments, vehicles may also include semi-autonomous or autonomous vehicles such as self-driving cars, autonomous driving or flying taxis, and other similar vehicles. It is to be understood that "vehicles" may also encompass future types of vehicles that transport persons from one location to another.

In some embodiments, the processor may be configured to implement one or more machine learning techniques and algorithms to facilitate determination of a driver's level of control over the vehicle. The term "machine learning" is non-limiting, and may include techniques such as, but not limited to, computer vision learning, deep machine learning, deep learning, and deep neural networks, neural networks, artificial intelligence, and online learning, i.e. learning during operation of the system. Machine learning algorithms may detect one or more patterns in collected sensor data, such as image data, proximity sensor data, and data from other types of sensors disclosed herein. A machine learning component implemented by the processor may be trained using one or more training data sets based on correlations between collected sensor data or saved data and user behavior related variables of interest. Saved data may include data generated by another machine learning system, preprocessing analysis on received sensor data, and other data associated with the object or subject being observed by the system. Machine learning components may be continuously or periodically updated based on new training data sets and feedback loops. In some embodiments, training data may include one or more data sets associated with types of sensed data disclosed herein. For example, training data may comprise image data associated with driver exhibiting behaviors such as interacting with a mobile device, reaching for a mobile device to answer a call, reaching for an object on the passenger seat, reaching for an object in the back seat, reading a message on a mobile device, interacting with the mobile device to send a message or open an application on the mobile device, or other behavior associated with shifting attention away from controlling the vehicle while driving.

Machine learning components can be used to detected or predicted gestures, motion, body posture, features associated with user alertness, driver alertness, fatigue, attentiveness to the road, distraction, features associated with expressions or emotions of a user, features associated with gaze direction of a user, driver or passenger. In some embodiments, machine learning components may determine a correlation or connection between a detected gaze direction (or change of gaze direction) of a user and a gesture that has occurred or is predicted to occur. Machine learning components can be used to detect or predict actions including: talking, shouting, singing, driving, sleeping, resting, smoking, reading, texting, operating a device (such as a mobile device or vehicle instrument) holding a mobile device, holding a mobile device against the cheek or to the face, holding a mobile device by hand for texting or speakerphone calling, watching content, playing digital game, using a head mount device such as smart glasses for virtual reality (VR) or augmented reality (AR), device learning, interacting with devices within a vehicle, buckling unbuckling or fixing a seat belt, wearing a seat belt, wearing a seat belt in a proper form, wearing a seatbelt in an improper form, opening a window, closing a window, getting in or out of the vehicle, attempting to open/close or unlock/lock a door, picking an object, looking/searching for an object, receiving an object through the window or door such as a ticket or food, reaching through the window or door while remaining seated, opening a compartment in the vehicle, raising a hand or object to shield against bright light while driving, interacting with other passengers, fixing or repositioning of eyeglasses, placing or removing or fixing eye contact lenses, fixing of hair or clothes, applying or removing makeup or lipstick, dressing or undressing, engaging in sexual activities, committing violent acts, looking at a mirror, communicating with another one or more persons/systems/AI entities using a digital device, learning the vehicle interior, features and characteristics associated with user behavior, interaction between the user and the environment, interaction with another person, activity of the user, an emotional state of the user, or an emotional responses in relation to: displayed/presented content, an event, a trigger, another person, one or more objects, or user activity in the vehicle. In some embodiments, actions can be detected or predicted by analyzing visual input from one or more image sensor, including analyzing movement patterns of different part of the user body (such as different part of the user face including: mouse, eyes and head pose, movement of the user's arms/hands, movement or change of the user posture), detecting in the visual input interaction of the user with his/her surrounding (such as interaction with item in the interior of a vehicle, items in the vehicle, digital devices, personal items (such as a bag), other person. In some embodiments, actions can be detected or predicted by analyzing visual input from one or more image sensor and input from other sensors such as one or more microphone, one or more pressure sensor, one or more health status detection device or sensor. In some embodiments, the actions can be detected or predicted by analyzing input from one or more sensor and data from an application or online service.

Machine learning components can be used to detect: facial attributes including: head pose, gaze, face and facial attributes 3D location, facial expression; facial landmarks including: mouth, eyes, neck, nose, eyelids, iris, pupil; facial accessories including: glasses/sunglasses, piercings/earrings, or makeup; facial actions including: talking, yawning, blinking, pupil dilation, being surprised; occluding the face with other body parts (such as hand, fingers), with other object held by the user (a cap, food, phone), by other person (other person hand) or object (part of the vehicle), user unique expressions (such as Tourette Syndrome related expressions).

Machine learning system may use input from one or more systems in the car, including Advanced Driver Assistance System (ADAS), car speed measurement, left/right turn signals, steering wheel movements and location, wheel directions, car motion path, input indicating the surrounding around the car such as cameras or proximity sensors or distance sensors, Structure From Motion (SFM) and 3D reconstruction of the environment around the vehicle.

Machine learning components can be used to detect the occupancy of a vehicle's cabin, detecting and tracking people and objects, and acts according to their presence, position, pose, identity, age, gender, physical dimensions, state, emotion, health, head pose, gaze, gestures, facial features and expressions. Machine learning components can be used to detect one or more persons, a person's age or gender, a person's ethnicity, a person's height, a person's weight, a pregnancy state, a posture, an abnormal seating position (e.g. leg's up, lying down, turned around to face the back of the vehicle, etc.), seat validity (availability of a seatbelt), a posture of the person, seat belt fitting and tightness, an object, presence of an animal in the vehicle, presence and identification of one or more objects in the vehicle, learning the vehicle interior, an anomaly, a damaged item or portion of the vehicle interior, a child/baby seat in the vehicle, a number of persons in the vehicle, a detection of too many persons in a vehicle (e.g. 4 children in rear seat when only 3 are allowed), or a person sitting on another person's lap.

Machine learning components can be used to detect or predict features associated with user's body parts such as hands, user behavior, action, interaction with the environment, interaction with another person, activity, emotional state, emotional responses to: content, event, trigger another person, one or more object, detecting child presence in the car after all adults left the car, monitoring back-seat of a vehicle, identifying aggressive behavior, vandalism, vomiting, physical or mental distress, detecting actions such as smoking, eating and drinking, understanding the intention of the user through their gaze or other body features. In some embodiments, the user's behaviors, actions or attention may be correlated to the user's gaze direction or detected change in gaze direction. In some embodiments, one or more sensors may detect the user's behaviors, activities, actions, or level of attentiveness and correlate the detected behaviors, activities, actions, or level of attentiveness to the user's gaze direction or change in gaze direction. By way of example, the one or more sensors may detect the user's gesture of picking up a bottle in the car and correlate the user's detected gesture to the user's change in gaze direction to the bottle. By correlating the user's behaviors, activities, actions, or level of attentiveness to the user's gaze direction or change in gaze direction, the machine learning system may be able to detect a particular gesture performed by the user and predict, based on the detected gesture, a gaze direction, a change in gaze direction, or a state or level of attentiveness of the user. In some embodiments, a normal level of attentiveness of the driver may be determined using information from one or more sensors including information indicative of at least one of driver behavior, physiological or physical state of the driver, psychological or emotional state of the driver, or the like during a driving session. In some embodiments, a state of attentiveness of the user may be determined, indicative of a condition of the user as being attentive, non-attentive, or in an intermediary state at a particular moment in time. In some embodiments, a level of attentiveness may be determined, indicative of a measure of the user's attentiveness relative to a reference point, such as a predetermined threshold or scale of attentive versus non-attentive behavior, or a dynamic threshold or scale determined for the individual user.

It should be understood that the 'gaze of a user,' 'eye gaze,' etc., as described and/or referenced herein, can refer to the manner in which the eye(s) of a human user are positioned/focused. For example, the 'gaze' or 'eye gaze' of the user can refer to the direction towards which eye(s) of the user are directed or focused e.g., at a particular instance and/or over a period of time. By way of further example, the 'gaze of a user' can be or refer to the location the user looks at a particular moment. By way of yet further example, the 'gaze of a user' can be or refer to the direction the user looks at a particular moment.

Moreover, in some embodiments the described technologies can determine/extract the referenced gaze of a user using various techniques such as those known to those of ordinary skill in the art. For example, in certain implementations a sensor (e.g., an image sensor, camera, IR camera, etc.) may capture image(s) of eye(s) (e.g., one or both human eyes). Such image(s) can then be processed, e.g., to extract various features such as the pupil contour of the eye, reflections of the IR sources (e.g., glints), etc. The gaze or gaze vector(s) can then be computed/output, indicating the eyes' gaze points (which can correspond to a particular direction, location, object, etc.). Additionally, in some embodiments the disclosed technologies can compute, determine, etc., that gaze of the user is directed towards (or is likely to be directed towards) a particular item, object, etc., e.g., under certain circumstances.

Machine learning algorithms may detect one or more patterns in collected sensor data, such as image data, proximity sensor data, and data from other types of sensors disclosed herein. A machine learning component implemented by the processor may be trained using one or more training data sets based on correlations between collected sensor data and the detection of current or future gestures, activities and behaviors. Machine learning components may be continuously or periodically updated based on new training data sets and feedback loops indicating the accuracy of previously detected/predicted gestures.

Machine learning techniques such as deep learning may also be used to convert movement patterns and other sensor inputs to predict anticipated movements, gestures, or anticipated locations of body parts, such as by predicting that a hand or finger will arrive at a certain location in space based on a detected movement pattern and the application of deep learning techniques.

Such techniques may also determine that a user is intending to perform a particular gesture based on detected movement patterns and deep learning algorithms correlating the detected patterns to an intended gesture. Consistent with these examples, some embodiments may also utilize machine learning models such as neural networks, that employ one or more network layers that generate outputs from a received input, in accordance with current values of a respective set of parameters. Neural networks may be used to predict an output of an expected outcome for a received input using the one or more layers of the networks. Thus, the disclosed embodiments may employ one or more machine learning techniques to provide enhanced detection and prediction of gestures, activities, and behaviors of a user using received sensor inputs in conjunction with training data or computer model layers.

Machine learning my also incorporate techniques that determine that a user is intending to perform a particular gesture or activity based on detected movement patterns and/or deep learning algorithms correlating data gathered from sensors to an intended gesture or activity. Sensors may include, for example, a CCD image sensor, a CMOS image sensor, a camera, a light sensor, an IR sensor, an ultrasonic sensor, a proximity sensor, a shortwave infrared (SWIR) image sensor, a reflectivity sensor, or any other device that is capable of sensing visual characteristics of an environment. Moreover, sensors may include, for example, a single photosensor or 1-D line sensor capable of scanning an area, a 2-D sensor, or a stereoscopic sensor that includes, for example, a plurality of 2-D image sensors. The sensor may also include, for example, an accelerometer, a gyroscope, a pressure sensor, or any other sensor that is capable of detecting information associated with a vehicle of the user. Data from sensors may be associated with users, driver, passengers, items, and detected activities or characteristics discussed above such as health condition of users, body posture, locations of users, location of users' body parts, user's gaze, communication with other users, devices, services, AI devices or applications, robots, implants.

In some embodiments, sensors may comprise one or more components. Components can include biometric components, motion components, environmental components, or position components, among a wide array of other components. For example, the biometric components can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components can include acceleration sensor components (e.g., accelerometer), gravitation sensor components, rotation sensor components (e.g., gyroscope), and other known types of sensors for measuring motion.

The environmental components can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components can include location sensor components (e.g., a Global Position System (GPS) receiver component), altitude sensor components (e.g., altimeters or barometers that detect air pressure from which altitude can be derived), orientation sensor components (e.g., magnetometers), and other known types of positional sensors. In some embodiments, sensors and sensor components may include physical sensors such as a pressure sensor located within a seat of a vehicle.

Data from sensors may be associated with an environment in which the user is located. Data associated with the environment may include the data related to internal or external parameters of the environment in which the user is located. Internal parameters may be associated with an in-car related parameter, such as parameters related to the people in the car (number of people, their location, age of the people, body size), parameters related to safety state of the people (such as seat-belt is on/off, position of mirrors), position of the seats, the temperature in the car, the amount of light in the car, state of windows, devices and applications that are active (such as car multimedia device, displays devices, sound level, phone call, video call, content/video that is displayed, digital games, VR/AR applications, interior/external video camera). External parameters may include parameters associated with the external environment in which the user is located, such as parameters associated with environment outside the car, parameters related to the environment (such as: the light outside, the direction and volume of the sun light, change in light condition, parameters related to weather, parameters related to the environmental conditions, the car location, signs, presented advertisements), parameters related to other cars, parameters related to users outside the vehicle including: the location of each user, age, direction of motion, activities such as: walking, running, riding a bike, looking on a display device, operating a device, texting, having a call, listen to music, intend to cross the road, crossing the road, falling, attentiveness to the surrounding.

Data may be associated with the car related data, such as car movement including: speed, accelerating, decelerating, rotation, tuning, stopping, emergent stop, sliding, devices and applications active in the car, operating status of driving including: manual driving (user driving the car), autonomous driving while driver attention is required, full autonomous driving, change between modes of driving. Data may be received from one or more sensors associated with the car. For example, sensors may include, a CCD image sensor, a CMOS image sensor, a camera, a light sensor, an IR sensor, an ultrasonic sensor, a proximity sensor, a shortwave infrared (SWIR) image sensor, a reflectivity sensor, or any other device that is capable of sensing visual characteristics of an environment. Moreover, sensors may include, for example, a single photosensor or 1-D line sensor capable of scanning an area, a 2-D sensor, or a stereoscopic sensor that includes, for example, a plurality of 2-D image sensors. The sensor may also include, for example, an accelerometer, a gyroscope, a pressure sensor, or any other sensor that is capable of detecting information associated with a vehicle of the user. Images captured by an image sensor may be digitized by the image sensor and input to one or more processors, or may be input to the one or more processors in analog form and digitized by the processor.

Example proximity sensors may include, among other things, one or more of a capacitive sensor, a capacitive displacement sensor, a laser rangefinder, a sensor that uses time-of-flight (TOF) technology, an IR sensor, a sensor that detects magnetic distortion, or any other sensor that is capable of generating information indicative of the presence of an object in proximity to the proximity sensor. In some embodiments, the information generated by a proximity sensor may include a distance of the object to the proximity sensor. A proximity sensor may be a single sensor or may be a set of sensors. Disclosed embodiments may include a single sensor or multiple types of sensors and/or multiple sensors of the same type. For example, multiple sensors may be disposed within a single device such as a data input device housing some or all components of the system, in a single device external to other components of the system, or in various other configurations having at least one external sensor and at least one sensor built into another component (e.g., a processor or a display of the system).

In some embodiments, a processor may be connected to or integrated within a sensor via one or more wired or wireless communication links, and may receive data from the sensor such as images, or any data capable of being collected by the sensor, such as is described herein. Such sensor data can include, for example, sensor data of a user's head, eyes, face, etc. Images may include one or more of an analog image captured by the sensor, a digital image captured or determined by the sensor, a subset of the digital or analog image captured by the sensor, digital information further processed by the processor, a mathematical representation or transformation of information associated with data sensed by the sensor, information presented as visual information such as frequency data representing the image, conceptual information such as presence of objects in the field of view of the sensor, etc. Images may also include information indicative the state of the sensor and or its parameters during capturing images e.g. exposure, frame rate, resolution of the image, color bit resolution, depth resolution, field of view of the sensor, including information from other sensor(s) during the capturing of an image, e.g. proximity sensor information, acceleration sensor (e.g., accelerometer) information, information describing further processing that took place further to capture the image, illumination condition during capturing images, features extracted from a digital image by the sensor, or any other information associated with sensor data sensed by the sensor. Moreover, the referenced images may include information associated with static images, motion images (i.e., video), or any other visual-based data. In certain implementations, sensor data received from one or more sensor(s) may include motion data, GPS location coordinates and/or direction vectors, eye gaze information, sound data, and any data types measurable by various sensor types. Additionally, in certain implementations, sensor data may include metrics obtained by analyzing combinations of data from two or more sensors.

In some embodiments, one or more sensors associated with the vehicle of the user may be able to detect information or data associated with the vehicle over a predetermined period of time. By way of example, a pressure sensor associated with the vehicle may be able to detect pressure value data associated with the vehicle over a predetermined period of time, and a processor may monitor a pattern of pressure values. The processor may also be able to detect a change in pattern of the pressure values. The change in pattern may include, but is not limited to, an abnormality in the pattern of values or a shift in the pattern of values to a new pattern of values. The processor may detect the change in pattern of the values and correlate the change a detected gesture, activity, or behavior of the user. Based on the correlation, the processor may be able to predict an intention of the user to perform a particular gesture based on a detected pattern. In another example, the processor may be able to detect or predict the driver's level of attentiveness to the road during a change in operation mode of the vehicle, based on the data from the one or more sensors associated with the vehicle. For example, the processor may be configured to determine the driver's level of attentiveness to the road during the transaction/change between an autonomous driving mode to a manual driving mode based on data associated with the behavior or activity the driver was engaged in before and during the change in the operation mode of the vehicle.

In some embodiments, the processor may be configured to receive data associated with events that were already detected or predicted by the system or other systems, including forecasted events. For example, data may include events that are predicted before the events actually occur. In some embodiments, the forecasted events may be predicted based on the events that were already detected by the system or other systems. Such events may include actions, gestures, behaviors performed by the user, driver or passenger. By way of example, the system may predict a change in the gaze direction of a user before the gaze direction actually changes. In addition, the system may detect a gesture of a user toward an object and predict that the user will shift his or her gaze toward the object once the user's hand reaches a predetermined distance from the object. In some embodiments, the system may predict forecasted events, via a machine learning algorithm, based on events that were already detected. In other embodiments, the system may predict at least one of the user behavior, an intention to perform a gesture, or an intention to perform an activity based on the data associated with events that were already detected or predicted, including forecasted events.

The processor may perform various actions using machine learning algorithms. For example, machine learning algorithms may be used to detect and classify gestures, activity or behavior performed in relation to at least one of the user's body or other objects proximate the user. In one implementation, the machine learning algorithms may be used to detect and classify gestures, activity or behavior performed in relation to a user's face, to predict activities such as yawning, smoking, scratching, fixing an a position of glasses, put on/off glasses or fixing their position on the face, occlusion of a hand with features of the face (features that may be critical for detection of driver attentiveness, such as driver's eyes); or a gesture of one hand in relation to the other hand, to predict activities involving two hands which are not related to driving (e.g. opening a drinking can or a bottle, handling food). In another implementation, other objects proximate the user may include controlling a multimedia system, a gesture toward a mobile device that is placed next to the user, a gesture toward an application running on a digital device, a gesture toward the mirror in the car, or fixing the side mirrors. In some embodiments, the processor is configured to predict an activity associated with a device, such as fixing the mirror, by detecting a gesture toward the device (e.g. toward a mirror); wherein detecting a gesture toward a device comprise detecting a motion vector of the gesture (can be linear or non-linear) and determine the associated device that the gesture is addressing. In one implementation, the "gesture toward a device" is determined when the user hand or finger crossed a defined boundary associated with the device, while in another implementation the motion vector of the user's hand or one or more finger, is along a vector that may end at the device and although the hand or one or more finger didn't reach the device, there is no other device located between the location of the hand or finger until the device. For example, the driver lifts his right hand toward the mirror. At the beginning of the lifting motion, there are several possible devices toward which the driver makes a gesture, such as the multimedia, air condition or the mirror. During the gesture, the hand is raised above the multimedia device, then above the air-condition controllers. At this point, the processor may detect a motion vector that can end at the mirror, and that the motion vector of the hand or finger already passed the multimedia and air-condition controllers, and there are no other devices but the mirror on which the gesture may address. The processor may be configured to determinate that at that point, the gesture is toward the mirror (even that the gesture was not yet ended, and the hand is yet to touch the mirror).

In other embodiments, machine learning algorithms may be used to detect features associated with the driver's body parts. For example, machine learning algorithms may be used to detect a location, position, posture, or orientation of the driver's hand(s). In other embodiments, machine learning algorithms may be used to detect various features associated with the gestures performed. For example, machine learning algorithms and/or traditional algorithms may be used to detect a speed, smoothness, direction, motion path, continuity, location and/or size of the gestures performed. One or more known techniques may be employed for such detection, and some examples are provided in U.S. Pat. Nos. 8,199,115 and 9,405,970, which are incorporated herein by reference. Traditional algorithms may include, for example, an object recognition algorithm, an object tracking algorithm, segmentation algorithm, and/or any known algorithms in the art to detect a speed, smoothness, direction, motion path, continuity, location, size of an object, and/or size of the gesture. As used herein, tracking may involve monitoring a change in location of a particular object in captured or received image information. The processor may also be configured to detect a speed, smoothness, direction, motion path, continuity, location and/or size of components associated with the gesture, such as hands, fingers, other body parts, or objects moved by the user.

In some embodiments, the processor may be configured to detect a change in the user's gaze before, during, and after the gesture is performed. In some embodiments, the processor may be configured to determine features associated with the gesture and a change in user's gaze detection before, during, and after the gesture is performed. The processor may also be configured to predict a change in gaze direction of the user based on the features associated with the gesture. In some embodiments, the processor may be configured to predict a change of gaze direction using criteria saved in a memory, historical information previously extracted and associated with a previous occurrence associated with the gesture performance and/or driver behavior and/or driver activity and an associated direction of gaze before, during and after the gesture and/or behavior and/or activity is performed. The processor may also be configured to predict a change of gaze direction using information associated with passenger activity or behavior, and/or interaction of the driver with other passenger, using criteria saved in a memory, information extracted in previous time associated with passenger activity or behavior, and/or interaction of the driver with other passenger, and direction of gaze before, during and after the gesture is performed.

In some embodiments, the processor may be configured to predict a change of gaze direction using information associated with level of driver attentiveness to the road, and gesture and/or behavior and/or activity and/or event that takes place in the vehicle, using criteria saved in a memory, information extracted in previous time associated with driver attentiveness to the road, and gesture performance and direction of gaze before, during and after the event occurs.

Further, the processor may be configured to predict a change of gaze direction using information associated with detected of repetitive gestures, gestures that are in relation to other body part, gestures that are in relation to devices in the vehicle.

In some embodiments, machine learning algorithms may enable the processor to determine a correlation between the detected locations, postures, orientations and positions of one or more of the driver's body parts, detected gestures, the location of the gestures, the nature of the gestures, the features of the gestures, and the driver's behaviors. The features of the gestures may include, for example, a frequency of the gestures detected during a predefined time period. In other embodiments, machine learning algorithms may train the processor to correlate the detected gesture to the user's level of attention. For example, the processor may be able to correlate the detected gesture of a user who is a driver of a vehicle to determine the level of attention of the driver to the road, or correlated to the user's driving behaviors determined, for example, using data associated with the vehicle movement patterns. Furthermore, the processor may be configured to correlate the detected gesture of a user, who may be a driver of a vehicle, to the response time of the user to an event taking place. The even taking place may be associated with the vehicle. For example, the processor may be configured to correlate a detected gesture performed by a driver of a vehicle, to the response time of applying brakes when a vehicle in front of the driver's vehicle is stopped, changes lanes, or changes its path, or an event of a pedestrian crossing the road in front of the driver's vehicle. In some embodiments, the response time of the user to the event taking place may be, for example, the time it takes for the user to control an operation of the vehicle during transitioning of an operation mode of the vehicle. The processor may be configured to correlate a detected gesture performed by a driver of a vehicle, to the response time of the driver following or addressing an instruction to take charge and control the vehicle when the vehicle transitions from autonomous mode to manual driving mode. In such embodiments, the operation mode of the vehicle may be controlled and changed in association with detected gestures and/or predicted behavior of the user.

In some embodiments, the processor may be configured to correlate a detected location, position, posture, or orientation of one or more of the driver's body parts and determine the driver's level of attentiveness to the road, the driver's level of control over the vehicle, or the driver's response time to an event of emergency. In some embodiments, the processor may be configured to correlate a detected gesture performed by a user who may not be the driver, and a change in the driver's level of attentiveness to the road, a change in the driver gaze direction, and/or a predicted gesture to be performed by the driver. Examples of gestures performed by a user who may not be the driver may include, for example, changing the volume setting of the car stereo, change a mode of multimedia operation, change parameters of the air-conditioner, searching for something in the vehicle, opening vehicle compartments, twist the body position backwards to talk with the passengers in the back (such as talking to the kids in the back), buckling or unbuckling the seat-belt, changing seating position, adjusting the location or position of a seat, opening a window or door, reaching out of the vehicle through the window or door, or passing an object into or out of the vehicle.

In yet another embodiment, machine learning algorithms may train the processor to correlate detected gestures to a change in user's gaze direction before, during, and after the gesture is performed by the user. By way of example, when the processor detects the user moving the user's hand toward a multimedia system in a car, the processor may be able to predict that the user's gaze will follow the user's finger rather than stay on the road when the user's fingers move near the display or touch-display of the multimedia system.

In some embodiments, machine learning algorithms may configure the processor to predict the direction of driver gaze along a sequence of time in relation to a detected gesture. For example, machine learning algorithms may configure the processor to detect the driver's gesture towards an object and predict that the direction of the driver's gaze will shift towards the object after a first period of time. The machine learning algorithms may also configure the processor to predict that the driver's gaze will shift back towards the road after a second period of time after the driver's gaze has shifted towards the object. The first, and/or second period of time may be values saved in the memory, values that were detected in previous similar event of that driver, or values that represent a statistical value. As a non-limiting example, when a driver begins a gesture toward a multimedia device (such as changing a radio station or selecting an audio track), the processor may predict that the driver's gaze will shift downward and to the side toward the multimedia device for 2 seconds, and then will shift back to the road after another 600 milliseconds. As another example, when the driver begins looking toward the main rear-view mirror, the processor may predict that the gaze will shift upward and toward the center for about 2-3 seconds. In yet another embodiment, the processor may be configured to predict when and for how long the driver gaze will be shifted from the road using information associated with previous events performed by the driver.

In yet another embodiment, the processor may be configured to receive information from one or more sensors, devices, or applications in a vehicle of the user and predict a change in gaze direction of the user based on the received information. For example, the processor may be configured to receive data associated with active devices, applications, or sensors in the car, for example data from multimedia systems, navigation systems, or microphones, and predict the direction of a driver's gaze in relation to the data. In some embodiments, an active device may include a multimedia system, an application and include a navigation system, and a sensor in the car may include a microphone. The processor may be configured to analyze the data received. For example, the processor may be configured to analyze data received via speech recognition performed on microphone data to determine the content of a discussion/talk in the vehicle. In this example, data is gathered by a microphone, a speech recognition analyzer is employed by the processor to identify spoken words in the data, and the processor may determine that a child sitting in the back of the vehicle has asked the driver to pick up a gaming device that was just fell from his hands. In such an example, the machine learning algorithms may enable the processor to predict that the driver's gaze will divert from the road to the rear seat as the driver responds to the child's request.

In yet another embodiment, the processor may be configured to predict a sequence or frequency of change of driver gaze direction from the road toward a device/object or a person. In one example, the processor predicts a sequence or frequency of change of driver gaze direction from the road by detect an activity the driver is involved with or detect a gesture performed by the driver, detect the object or device associated with the detected gesture and determine the activity the driver is involving with. For example, the processor may detect the driver looking for an object in a bag located on the other seat, or for a song in the multimedia application. Based on the detected activity of the driver, the processor may be configured to predict that the driver's change in gaze direction from the road to the object and/or the song will continue until the driver finds the desired object and/or song. The processor may be configured to predict the sequence of this change in driver's gaze direction. Accordingly, the processor may be configured to predict that each subsequent change in gaze direction will increase in time as long as the driver's gaze is toward the desired object and/or song, rather than toward the road. In some embodiments, the processor may be configured to predict the level of driver attentiveness using data associated with features related to the change of gaze direction. For example, the predicted driver attentiveness may be predicted in relation to the time of the change in gaze direction (from the road, to the device, and back to the road), the gesture/activity/behavior the driver performs, sequence of gaze direction, frequency of gaze direction, or the volume or magnitude of the change in gaze direction.

In some embodiments, machine learning algorithms may configure the processor to predict the direction of the driver's gaze wherein the prediction is in a form of a distribution function. In some embodiments, the processor may be configured to generate a message or a command associated with the detected or predicted change in gaze direction. In such embodiments, the processor may generate a command or message in response to any of the detected or predicted scenarios or events discussed above. The message or command generated may be audible or visual, or may comprise a command generated and sent to another system or software application. For example, the processor may be configured to generate an audible or visual message after detecting that the driver's gaze has shifted towards an object for a period of time greater than a predetermined threshold. In some embodiments, the processor may be configured to alert the driver that the driver should not operate the vehicle. In other embodiments, the processor may be configured to control an operation mode of the vehicle based on the detected or predicted change in gaze direction. For example, the processor may be configured to change the operation mode of the vehicle from a manual driving mode to an autonomous driving mode based on the detected or predicted change in gaze direction. In some embodiments, the processor may be configured to activate or deactivate functions related to the vehicle, to the control over the vehicle, to the vehicle movement including stopping the vehicle, to devices or sub-systems in the vehicle. In some embodiments, the processor may be configured to communicate with other cars, with one or more systems associated lights control or with any system associated with transportation.

In some embodiments, the processor may be configured to generate a message or a command based on the prediction. The message or command may be generated to other systems, devices, or software applications. In some aspects, the message or command may be generated to other systems, devices, or applications located in the user's car or located outside the user's car. For example, the message or command may be generated to a cloud system or other remote devices or cars. In some embodiments, the message or command generated may indicate the detected or forecasted behavior of the user, including, for example, data associated with a gaze direction of the user or attention parameters of the user.

In some embodiments, a message to a device may be a command. By way of example, the message or command may be selected from a message or command notifying or alerting the driver about the driver's actions or risks associated with the driver's actions, providing instructions or suggestions to the driver on what to do and what not to do while operating the vehicle, providing audible, visual, or tactile feedback to the driver such as a vibration on the steering wheel or highlighting location(s) on the steering wheel at which the driver's hand(s) should be placed, changing settings of the vehicle such as switching the driving mode to an automated control, stopping the vehicle on the side of the road or at a safe place, or the like. In other embodiments, the command may be selected, for example, from a command to run an application on the device, a command to stop an application running on the device or website, a command to activate a service running on the device, a command to stop a service running on the device, a command to activate a service or a process running on the external device or a command to send data relating to a graphical element identified in an image.

The action may also include, for example responsive to a selection of a graphical element, receiving from the external device or website data relating to a graphical element identified in an image and presenting the received data to a user. The communication with the external device or website may be over a communication network.

Gestures may be one-handed or two handed. Exemplary actions associated with a two-handed gesture can include, for example, selecting an area, zooming in or out of the selected area by moving the fingertips away from or towards each other, rotation of the selected area by a rotational movement of the fingertips. Actions associated with a two-finger pointing gesture can include creating an interaction between two objects, such as combining a music track with a video track or for a gaming interaction such as selecting an object by pointing with one finger, and setting the direction of its movement by pointing to a location on the display with another finger.

Gestures may be any motion of one or more part of the user's body, whether the motion of that one or more part is performed mindfully (e.g., purposefully) or not, as an action with a purpose to activate something (such as turn on/off the air-condition) or as a way of expression (such as when people are talking and moving their hands simultaneously, or nodding with their head while listening). The motion may be of one or more parts of the user's body in relation to another part of the user's body. In some embodiments, a gesture may be associated with addressing a body disturbance, whether the gesture is performed by the user's hand(s) or finger(s) such as scratching a body part of the user, such as eye, nose, mouth, ear, neck, shoulder. In some embodiments, a gesture may be associated with a movement of part of the body such as stretching the neck, the shoulders, the back by different movement of the body, or associated with a movement of the entire body such as changing the position of the body. A gesture may also be any motion of one or more parts of the user's body in relation to an object or a device located in the vehicle, or in relation to another person in the vehicle or outside the vehicle.

Gestures may be any motion of one or more part of the user's body that has no meaning such as a gestures performed for users that has Tourette syndrome or motor tics. Gestures may be associated as the user's response to a touch by other person, a behavior or the other person, a gesture of the other person, or an activity of the other person in the car.

In some embodiments, gesture may be performed by a user who may not be the driver of a vehicle. Examples of gestures performed by a user who may not be the driver may include, for example, changing the volume setting of the car stereo, change a mode of multimedia operation, change parameters of the air-conditioner, searching for something in the vehicle, opening vehicle compartments, twist the body position backwards to talk with the passengers in the back (such as talking to the kids in the back), buckling or unbuckling the seat-belt, changing seating position, adjusting the location or position of a seat, opening a window or door, reaching out of the vehicle through the window or door, or passing an object into or out of the vehicle.

Gestures may be in a form of facial expression. A gesture may be performed by muscular activity of facial muscles, whether it is performed as a response to an external trigger (such as squinting or turning away in response to a flash of strong light that may be caused by beam of high-lights from a car on the other direction), or internal trigger by physical or emotional state (such as squinting and moving the head due to laughter or crying). More particular, gestures that may be associated with facial expression may include gestures indicating stress, surprise, fear, focusing, confusion, pain, emotional stress, a string emotional response such as crying.

In some embodiments, gestures may include actions performed by a user in relation to the user's body. Users may include a driver or passengers of a vehicle, when the disclosed embodiments are implemented in a system for detecting gestures in a vehicle.

Exemplary gestures or actions in relation to the user's body may include, for example, bringing an object closer to the user's body, touching the user's own body, and fully or partially covering a part of the user's body. Objects may include the user's one or more fingers and user's one or more hands. In other embodiments, objects may be items separate from the user's body. For example, objects may include hand-held objects associated with the user, such as food, cups, eye glasses, sunglasses, hats, pens, phones, other electronic devices, mirrors, bags, and any other object that can be held by the user's fingers and/or hands. Other exemplary gestures may include, for example, bringing a piece of food to the user's mouth, touching the user's hair with the user's fingers, touching the user's eyes with the user's fingers, adjusting the user's glasses, and covering the user's mouth fully and/or partially, or any interaction between an object and the user body, and in specifically face related body parts.

In some embodiments, the processor may be configured to receive information associated with an interior area of the vehicle from at least one sensor in the vehicle and analyze the information to detect a presence of a driver's hand. Upon detecting a presence of the driver's hand, the processor may be configured to detect at least one location of the driver's hand, determine a level of control of the driver of the vehicle, and generate a message or command based on the determined level of control. In some embodiments, the processor may be configured to determine that the driver's hand doesn't touch the steering wheel and generate a second message or command. In other embodiments, the processor may determine that the driver's body parts (such as a knee) other than the driver's hands are touching the steering wheel and generate a third message or command based on the determination. Additionally, or alternatively, the processor may be configured to determine a response time of the driver or the driver's level of control based on a detection of the driver's body posture, based on a detection of the driver holding one or more objects other than the steering wheel, based on a detection of an event taking place in the vehicle, or based on at least one of a detection of a passenger other than the driver holding or touching the steering wheel, or a detection of an animal or a child between the driver and the steering wheel. For example, the processor may determine the driver's response time or level of control based on a detection of a baby or an animal on the driver's lap such as detection of hands, feet, or paws on the driver's lap.

In other embodiments, the processor may detect one or more of no hands on the wheel, the driver holding one or more objects in the driver's hand(s) such as a mobile phone, sandwich, drink, book, bag, lipstick, etc., the driver placing his other body parts (such as knee or feet) on the steering wheel instead of the driver's hands, the driver holding an object and placing an elbow on the steering wheel to control the steering wheel instead of the driver's hands, the driver controlling the steering wheel using a body part other than the hands, a passenger or a child holding the steering wheel, a pet placed in between the driver and the steering wheel, or the like. The processor may determine, based on the detection, the driver's level of control over the steering wheel and the driver's response time to an event of an emergency.

As will be discussed in further detail below, in some embodiments, placing only one hand over the steering wheel as opposed to both hands, may indicate improper control over the car and a low response time for drivers if the system has a record or historical data that the drivers usually drive with two hands on the steering wheel. Accordingly, in some embodiments, the processor may implement one or more machine learning algorithms to learn offline the patterns of the drivers placing their hands over the steering wheel during a driving session and in relation to driving events (including maneuvers, turns, sudden stops, sharp turns, swerves, hard braking, fast acceleration, sliding, fish-tailing, approaching another vehicle or object at a dangerous speed, impacting a road hazard, being impacted by another vehicle or object, approaching or passing a traffic light, approaching or passing a stop sign), using images or video information as input and/or tagging reflecting level of driver control, response time, and/or attentiveness associated with locations and orientations of different hands, as well as different patterns of placing the hands over the steering wheel. In other embodiments, the processor may implement one or more machine learning algorithms to learn online the driver's patterns of placing his hands over the steering wheel during a driving session and in relation to driving events.

FIG. 1 is a diagram illustrating an example touch-free gesture recognition system 100 that may be used for implementing the disclosed embodiments. System 100 may include, among other things, one or more devices 2, illustrated generically in FIG. 1. Device 2 may be, for example, a personal computer (PC), an entertainment device, a set top box, a television, a mobile game machine, a mobile phone, a tablet computer, an e-reader, a portable game console, a portable computer such as a laptop or ultrabook, a home appliance such as a kitchen appliance, a communication device, an air conditioning thermostat, a docking station, a game machine such as a mobile video gaming device, a digital camera, a watch, an entertainment device, speakers, a Smart Home device, a media player or media system, a location-based device, a pico projector or an embedded projector, a medical device such as a medical display device, a vehicle, an in-car/in-air infotainment system, a navigation system, a wearable device, an augmented reality-enabled device, wearable goggles, a robot, interactive digital signage, a digital kiosk, a vending machine, an automated teller machine (ATM), or any other apparatus that may receive data from a user or output data to a user. Moreover, device 2 may be handheld (e.g., held by a user's hand 19) or non-handheld.

System 100 may include some or all of the following components: a display 4, image sensor 6, keypad 8 comprising one or more keys 10, processor 12, memory device 16, and housing 14. In some embodiments, some or all of the display 4, image sensor 6, keypad 8 comprising one or more keys 10, processor 12, housing 14, and memory device 16, are components of device 2. However, in some embodiments, some or all of the display 4, image sensor 6, keypad 8 comprising one or more keys 10, processor 12, housing 14, and memory device 16, are separate from, but connected to the device 2 (using either a wired or wireless connection). For example, image sensor 6 may be located apart from device 2. Moreover, in some embodiments, components such as, for example, the display 4, keypad 8 comprising one or more keys 10, or housing 14, are omitted from system 100.

A display 4 may include, for example, one or more of a television set, computer monitor, head-mounted display, broadcast reference monitor, a liquid crystal display (LCD) screen, a light-emitting diode (LED) based display, an LED-backlit LCD display, a cathode ray tube (CRT) display, an electroluminescent (ELD) display, an electronic paper/ink display, a plasma display panel, an organic light-emitting diode (OLED) display, thin-film transistor display (TFT), High-Performance Addressing display (HPA), a surface-conduction electron-emitter display, a quantum dot display, an interferometric modulator display, a swept-volume display, a carbon nanotube display, a variforcal mirror display, an emissive volume display, a laser display, a holographic display, a transparent display, a semitransparent display, a light field display, a projector and surface upon which images are projected, or any other electronic device for outputting visual information. In some embodiments, the display 4 is positioned in the touch-free gesture recognition system 100 such that the display 4 is viewable by one or more users.

Image sensor 6 may include, for example, a CCD image sensor, a CMOS image sensor, a camera, a light sensor, an IR sensor, an ultrasonic sensor, a proximity sensor, a short-wave infrared (SWIR) image sensor, a reflectivity sensor, or any other device that is capable of sensing visual characteristics of an environment. Moreover, image sensor 6 may include, for example, a single photosensor or 1-D line sensor capable of scanning an area, a 2-D sensor, or a stereoscopic sensor that includes, for example, a plurality of 2-D image sensors. Image sensor 6 may be associated with a lens for focusing a particular area of light onto the image sensor 6. In some embodiments, image sensor 6 is positioned to capture images of an area associated with at least some display-viewable locations. For example, image sensor 6 may be positioned to capture images of one or more users viewing the display 4. However, a display 4 is not necessarily a part of system 100, and image sensor 6 may be positioned at any location to capture images of a user and/or of device 2.

Image sensor 6 may view, for example, a conical or pyramidal volume of space 18, as indicated by the broken lines in FIG. 1. The image sensor 6 may have a fixed position on the device 2, in which case the viewing space 18 is fixed relative to the device 2, or may be positionably attached to the device 2 or elsewhere, in which case the viewing space 18 may be selectable. Images captured by the image sensor 6 may be digitized by the image sensor 6 and input to the processor 12, or may be input to the processor 12 in analog form and digitized by the processor 12.

Some embodiments may include at least one processor. The at least one processor may include any electric circuit that may be configured to perform a logic operation on at least one input variable, including, for example one or more integrated circuits, microchips, microcontrollers, and microprocessors, which may be all or part of a central processing unit (CPU), a digital signal processor (DSP), a field programmable gate array (FPGA), a graphical processing unit (GPU), or any other circuit known to those skilled in the art that may be suitable for executing instructions or performing logic operations. Multiple functions may be accomplished using a single processor or multiple related and/or unrelated functions may be divided among multiple processors.

In some embodiments, such is illustrated in FIG. 1, at least one processor may include processor 12 connected to memory 16. Memory 16 may include, for example, persistent memory, ROM, EEPROM, EAROM, flash memory devices, magnetic disks, magneto optical disks, CD-ROM, DVD-ROM, Blu-ray, and the like, and may contain instructions (i.e., software or firmware) or other data. Generally, processor 12 may receive instructions and data stored by memory 16. Thus, in some embodiments, processor 12 executes the software or firmware to perform functions by operating on input data and generating output. However, processor 12 may also be, for example, dedicated hardware or an application-specific integrated circuit (ASIC) that performs processes by operating on input data and generating output.

Processor 12 may be any combination of dedicated hardware, one or more ASICs, one or more general purpose processors, one or more DSPs, one or more GPUs, or one or more other processors capable of processing digital information.

Figure 2:
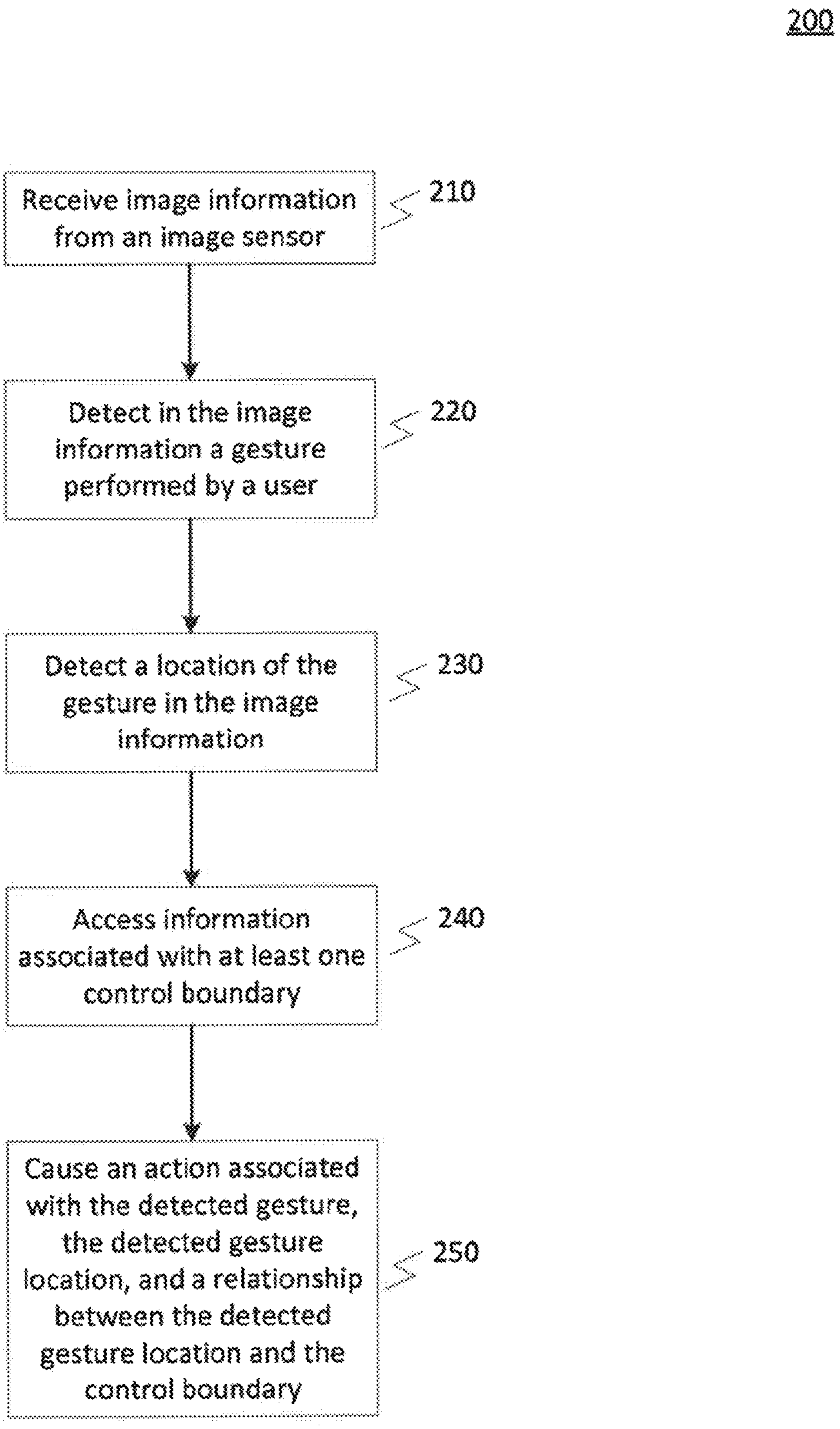
FIG. 2 illustrates example operations that a processor of a touch-free gesture recognition system may be configured to perform, in accordance with some of the disclosed embodiments.

FIG. 2 illustrates exemplary operations 200 that at least one processor may be configured to perform. For example, as discussed above, processor 12 of the touch-free gesture recognition system 100 may be configured to perform these operations by executing software or firmware stored in memory 16, or may be configured to perform these operations using dedicated hardware or one or more ASICs.

In some embodiments, at least one processor may be configured to receive image information from an image sensor (operation 210). In order to reduce data transfer from the image sensor 6 to an embedded device motherboard, general purpose processor, application processor, GPU a processor controlled by the application processor, or any other processor, including, for example, processor 12, the gesture recognition system may be partially or completely be integrated into the image sensor 6. In the case where only partial integration to the image sensor, ISP or image sensor module takes place, image preprocessing, which extracts an object's features related to the predefined object, may be integrated as part of the image sensor, ISP or image sensor module. A mathematical representation of the video/image and/or the object's features may be transferred for further processing on an external CPU via dedicated wire connection or bus. In the case that the whole system is integrated into the image sensor, ISP or image sensor module, only a message or command (including, for example, the messages and commands discussed in more detail above and below) may be sent to an external CPU. Moreover, in some embodiments, if the system incorporates a stereoscopic image sensor, a depth map of the environment may be created by image preprocessing of the video/image in each one of the 2D image sensors or image sensor ISPs and the mathematical representation of the video/image, object's features, and/or other reduced information may be further processed in an external CPU.

"Image information," as used in this application, may be one or more of an analog image captured by image sensor 6, a digital image captured or determined by image sensor 6, subset of the digital or analog image captured by image sensor 6, digital information further processed by an ISP, a mathematical representation or transformation of information associated with data sensed by image sensor 6, frequencies in the image captured by image sensor 6, conceptual information such as presence of objects in the field of view of the image sensor 6, information indicative of the state of the image sensor or its parameters when capturing an image (e.g., exposure, frame rate, resolution of the image, color bit resolution, depth resolution, or field of view of the image sensor), information from other sensors when the image sensor 6 is capturing an image (e.g. proximity sensor information, or accelerometer information), information describing further processing that took place after an image was captured, illumination conditions when an image is captured, features extracted from a digital image by image sensor 6, or any other information associated with data sensed by image sensor 6.

Moreover, "image information" may include information associated with static images, motion images (i.e., video), or any other visual-based data. Image information may be raw image or video data, or may be processed, conditioned, or filtered.

In some embodiments, the at least one processor may be configured to detect in the image information a gesture performed by a user (operation 220). Moreover, in some embodiments, the at least one processor may be configured to detect a location of the gesture in the image information (operation 230). The gesture may be, for example, a gesture performed by the user using predefined object 24 in the viewing space 16. The predefined object 24 may be, for example, one or more hands, one or more fingers, one or more fingertips, one or more other parts of a hand, or one or more hand-held objects associated with a user. In some embodiments, detection of the gesture is initiated based on detection of a hand at a predefined location or in a predefined pose. For example, detection of a gesture may be initiated if a hand is in a predefined pose and in a predefined location with respect to a control boundary. More particularly, for example, detection of a gesture may be initiated if a hand is in an open-handed pose (e.g., all fingers of the hand away from the palm of the hand) or in a first pose (e.g., all fingers of the hand folded over the palm of the hand). Detection of a gesture may also be initiated if, for example, a hand is detected in a predefined pose while the hand is outside of the control boundary (e.g., for a predefined amount of time), or a predefined gesture is performed in relation to the control boundary, Moreover, for example, detection of a gesture may be initiated based on the user location, as captured by image sensor 6 or other sensors. Moreover, for example, detection of a gesture may be initiated based on a detection of another gesture. E.g., to detect a "left to right" gesture, the processor may first detect a "waving" gesture.

As used in this application, the term "gesture" may refer to, for example, a swiping gesture associated with an object presented on a display, a pinching gesture of two fingers, a pointing gesture towards an object presented on a display, a left-to-right gesture, a right-to-left gesture, an upwards gesture, a downwards gesture, a pushing gesture, a waving gesture, a clapping gesture, a reverse clapping gesture, a gesture of splaying fingers on a hand, a reverse gesture of splaying fingers on a hand, a holding gesture associated with an object presented on a display for a predetermined amount of time, a clicking gesture associated with an object presented on a display, a double clicking gesture, a right clicking gesture, a left clicking gesture, a bottom clicking gesture, a top clicking gesture, a grasping gesture, a gesture towards an object presented on a display from a right side, a gesture towards an object presented on a display from a left side, a gesture passing through an object presented on a display, a blast gesture, a tipping gesture, a clockwise or counterclockwise two-finger grasping gesture over an object presented on a display, a click-drag-release gesture, a gesture sliding an icon such as a volume bar, or any other motion associated with a hand or handheld object. A gesture may be detected in the image information if the processor 12 determines that a particular gesture has been or is being performed by the user.

In some embodiments, a gesture may comprise a swiping motion, a pinching motion of two fingers, pointing, a left to right gesture, a right to left gesture, an upwards gesture, a downwards gesture, a pushing gesture, opening a clenched fist, opening a clenched first and moving towards the image sensor, a tapping gesture, a waving gesture, a clapping gesture, a reverse clapping gesture, closing a hand into a fist, a pinching gesture, a reverse pinching gesture, a gesture of splaying fingers on a hand, a reverse gesture of splaying fingers on a hand, pointing at an activatable object, holding an activating object for a predefined amount of time, clicking on an activatable object, double clicking on an activatable object, clicking from the right side on an activatable object, clicking from the left side on an activatable object, clicking from the bottom on an activatable object, clicking from the top on an activatable object, grasping an activatable object the object, gesturing towards an activatable object the object from the right, gesturing towards an activatable object from the left, passing through an activatable object from the left, pushing the object, clapping, waving over an activatable object, performing a blast gesture, performing a tapping gesture, performing a clockwise or counter clockwise gesture over an activatable object, grasping an activatable object with two fingers, performing a click-drag-release motion, sliding an icon.

Gestures may be any motion of one or more part of the user's body, whether the motion of that one or more part is performed mindfully or not, as an action with a purpose to activate something (such as turn on/off the air-condition) or as a way of expression (such as when people are talking and moving their hands simultaneously, or nodding with their head while listening). Whether the motion of that one or more part of the user's body relates to other part of the user body. Gesture may be associated with addressing a body disturbance, whether the gesture is performed by the user's hand/s or finger/s such as scratching a body part of the user, such as eye, nose, mouth, ear, neck, shoulder. Gesture may be associated with a movement of part of the body such as stretching the neck, the shoulders, the back by different movement of the body, or associated with a movement of all the body such as changing the position of the body. A gesture may be any motion of one or more part of the user's body in relation to an object or a device located in the car, or in relation to other person. Gestures may be any motion of one or more part of the user's body that has no meaning such as a gesture performed for users that has Tourette syndrome or motor tics. Gestures may be associated as a respond to a touch by another person.

Gestures may be in a form of facial expression. Gesture performed by muscular activity of facial muscles, whether it is performed as a respond to external trigger (such as a flash of strong light that may be caused by beam of headlights from a car on the other direction), or internal trigger by physical or emotional state. More particular, gestures that may be associated with facial expression may include a gesture indicating stress, surprise, fear, focusing, confusion, pain, emotional stress, a string emotional response such as crying.

In some embodiments, gestures may include actions performed by a user in relation to the user's body. Users may include a driver or passengers of a vehicle, when the disclosed embodiments are implemented in a system for detecting gestures in a vehicle.

Exemplary gestures or actions in relation to the user's body may include, for example, bringing an object closer to the user's body, touching the user's own body, and fully or partially covering a part of the user's body. Objects may include the user's one or more fingers and user's one or more hands. In other embodiments, objects may be separate from the user. For example, objects may include hand-held objects associated with the user, such as food, cups, eye glasses, sunglasses, hats, pens, phones, other electronic devices, mirrors, bags, and any other object that can be held by the user's fingers and/or hands. Other exemplary gestures may include, for example, bringing a piece of food to the user's mouth, touching the user's hair with the user's fingers, touching the user's eyes with the user's fingers, adjusting the user's glasses, and covering the user's mouth fully and/or partially, or any interaction between an object and the user body, and in specifically face related body parts.

An object associated with the user may be detected in the image information based on, for example, the contour and/or location of an object in the image information. For example, processor 12 may access a filter mask associated with predefined object 24 and apply the filter mask to the image information to determine if the object is present in the image information. That is, for example, the location in the image information most correlated to the filter mask may be determined as the location of the object associated with predefined object 24. Processor 12 may be configured, for example, to detect a gesture based on a single location or based on a plurality of locations over time. Processor 12 may also be configured to access a plurality of different filter masks associated with a plurality of different hand poses. Thus, for example, a filter mask from the plurality of different filter masks that has a best correlation to the image information may cause a determination that the hand pose associated with the filter mask is the hand pose of the predefined object 24. Processor 12 may be configured, for example, to detect a gesture based on a single pose or based on a plurality of poses over time. Moreover, processor 12 may be configured, for example, to detect a gesture based on both the determined one or more locations and the determined one or more poses. Other techniques for detecting real-world objects in image information (e.g., edge matching, greyscale matching, gradient matching, and other image feature-based methods) are well known in the art, and may also be used to detect a gesture in the image information. For example, U.S. Patent Application Publication No. 2012/0092304 and U.S. Patent Application Publication No. 2011/0291925 disclose techniques for performing object detection, both of which are incorporated by reference in their entirety. Each of the above-mentioned gestures may be associated with a control boundary.

A gesture location, as used herein, may refer to one or a plurality of locations associated with a gesture. For example, a gesture location may be a location of an object or gesture in the image information as captured by the image sensor, a location of an object or gesture in the image information in relation to one or more control boundaries, a location of an object or gesture in the 3D space in front of the user, a location of an object or gesture in relation to a device or physical dimension of a device, or a location of an object or gesture in relation to the user body or part of the user body such as the user's head. For example, a "gesture location" may include a set of locations comprising one or more of a starting location of a gesture, intermediate locations of a gesture, and an ending location of a gesture. A processor 12 may detect a location of the gesture in the image information by determining locations on display 4 associated with the gesture or locations in the image information captured by image sensor 6 that are associated with the gesture (e.g., locations in the image information in which the predefined object 24 appears while the gesture is performed). For example, as discussed above, processor 12 may be configured to apply a filter mask to the image information to detect an object associated with predefined object 24. In some embodiments, the location of the object associated with predefined object 24 in the image information may be used as the detected location of the gesture in the image information.

In other embodiments, the location of the object associated with predefined object 24 in the image information may be used to determine a corresponding location on display 4 (including, for example, a virtual location on display 4 that is outside the boundaries of display 4), and the corresponding location on display 4 may be used as the detected location of the gesture in the image information. For example, the gesture may be used to control movement of a cursor, and a gesture associated with a control boundary may be initiated when the cursor is brought to an edge or corner of the control boundary. Thus, for example, a user may extend a finger in front of the device, and the processor may recognize the fingertip, enabling the user to control a cursor. The user may then move the fingertip to the right, for example, until the cursor reaches the right edge of the display. When the cursor reaches the right edge of the display, a visual indication may be displayed indicating to the user that a gesture associated with the right edge is enabled. When the user then performs a gesture to the left, the gesture detected by the processor may be associated with the right edge of the device.

The following are examples of gestures associated with a control boundary:

"Hand-right motion"—the predefined object 24 may move from right to left, from a location which is beyond a right edge of a control boundary, over the right edge, to a location which is to the left of the right edge.

"Hand-left motion"—the predefined object 24 may move from left to right, from a location which is beyond a left edge of a control boundary, over the left edge, to a location which is to the right of the left edge.

"Hand-up motion"—the predefined object 24 may move upwards from a location which is below a bottom edge of a control boundary, over the bottom edge, to a location which is above the bottom edge.

"Hand-down motion"—the predefined object 24 may move downwards from a location which is above a top edge of a control boundary, over the top edge, to a location which is below the top edge.

"Hand-corner up-right"—the predefined object 24 may begin at a location beyond the upper-right corner of the control boundary and move over the upper-right corner to the other side of the control boundary.

"Hand-corner up-left"—the predefined object 24 may begin at a location beyond the upper-left corner of the control boundary and move over the upper-left corner to the other side of the control boundary.

"Hand-corner down-right"—the predefined object 24 may begin at a location beyond the lower-right corner of the control boundary and move over the lower-right corner to the other side of the control boundary.

"Hand-corner down-left"—the predefined object 24 may begin at a location beyond the lower-left corner of the control boundary and move over the lower-left corner to the other side of the control boundary.

Figure 5A:
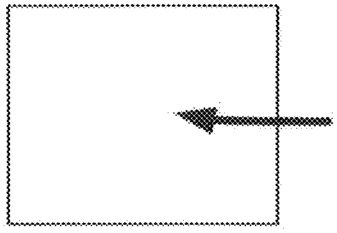
FIGS. 5A-5L illustrate graphical representations of example motion paths that may be associated with touch-free gesture systems and methods consistent with the disclosed embodiments.
Figure 5B:
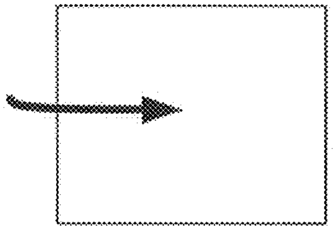
Figure 5C:
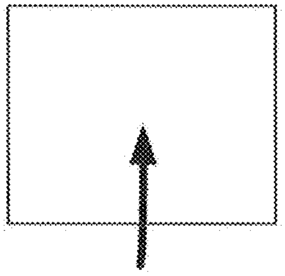
Figure 5D:
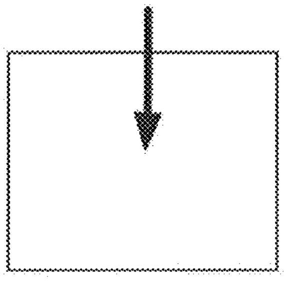
Figure 5E:
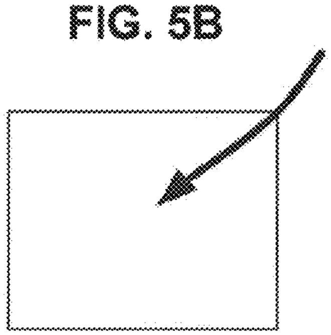
Figure 5F:
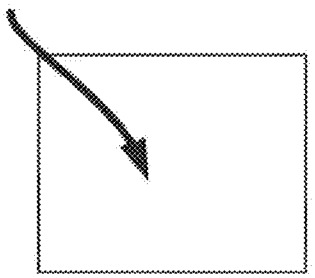
Figure 5G:
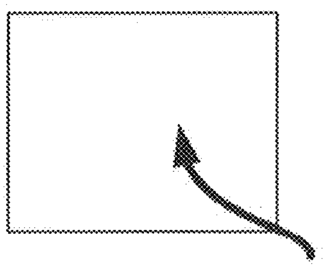
Figure 5H:
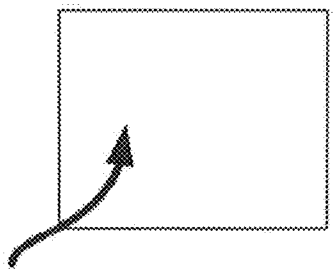
Figure 5I:
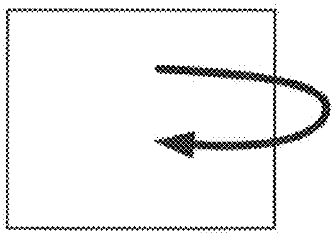
Figure 5J:
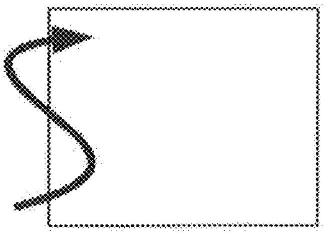
Figure 5K:
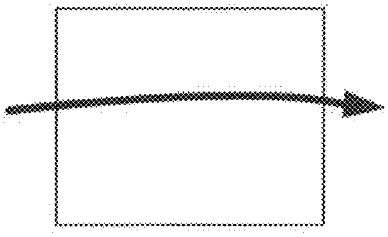
Figure 5L:
Figure 6:
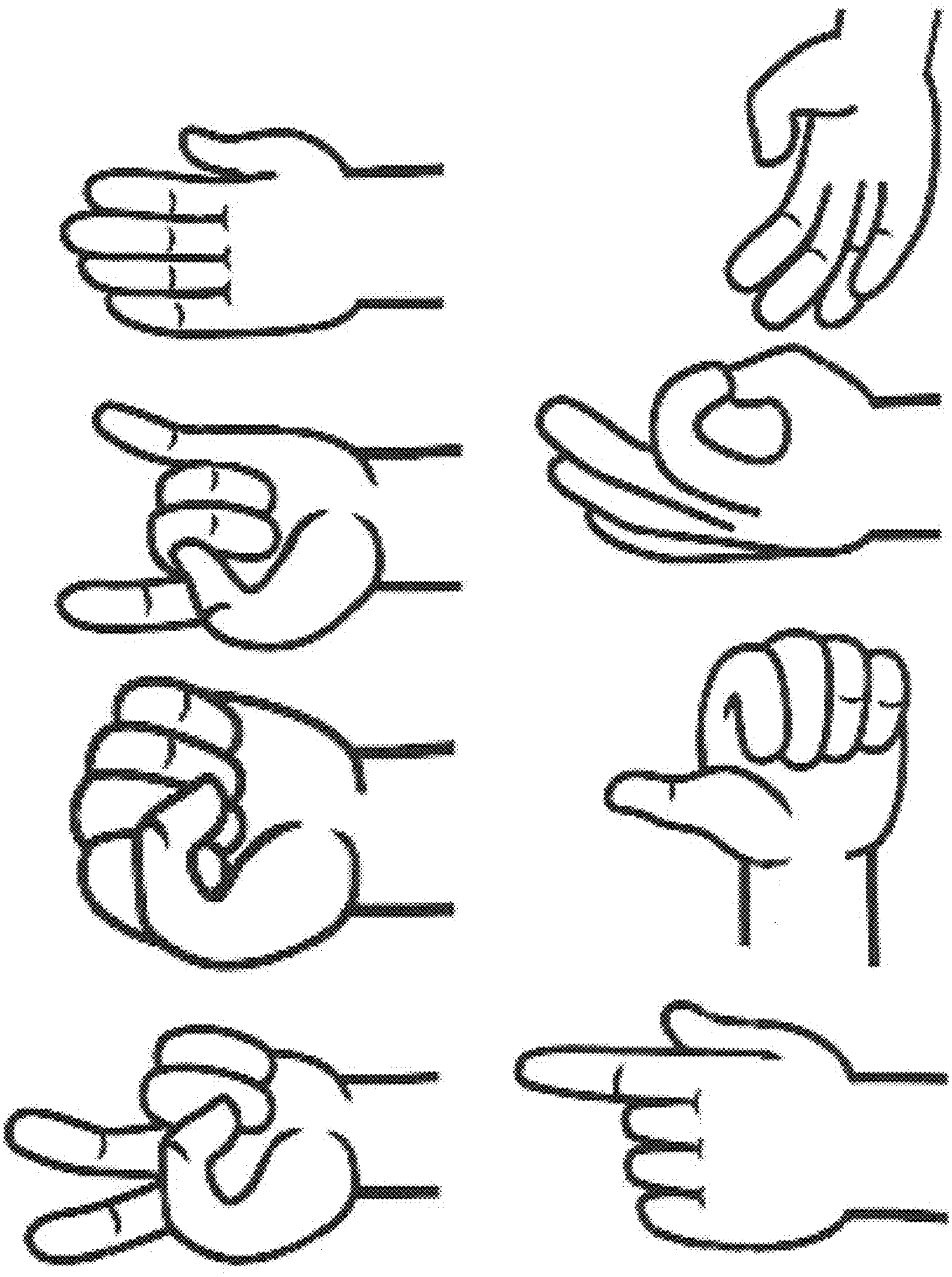
FIG. 6 illustrates a few exemplary hand poses that may be associated with touch-free gesture systems and methods consistent with the disclosed embodiments.

FIGS. 5A-5L depict graphical representations of a few exemplary motion paths (e.g., the illustrated arrows) of gestures, and the gestures' relationship to a control boundary (e.g., the illustrated rectangles). FIG. 6 depicts a few exemplary representations of hand poses that may be used during a gesture, and may affect a type of gesture that is detected and/or action that is caused by a processor. Each differing combination of motion path and gesture may result in a differing action.

In some embodiments, the at least one processor is also configured to access information associated with at least one control boundary, the control boundary relating to a physical dimension of a device in a field of view of the user, or a physical dimension of a body of the user as perceived by the image sensor (operation 240). In some embodiments the processor 12 is configured to generate the information associated with the control boundary prior to accessing the information. However, the information may also, for example, be generated by another device, stored in memory 16, and accessed by processor 12. Accessing information associated with at least one control boundary may include any operation performed by processor 12 in which the information associated with the least one control boundary is acquired by processor 12. For example, the information associated with at least one control boundary may be received by processor 12 from memory 16, may be received by processor 12 from an external device, or may be determined by processor 12.

A control boundary may be determined (e.g., by processor 12 or by another device) in a number of different ways. As discussed above, a control boundary may relate to one or more of a physical dimension of a device, which may, for example, be in a field of view of the user, a physical location of the device, the physical location of the device in relate to the location of the user, physical dimensions of a body as perceived by the image sensor, or a physical location of a user's body or body parts as perceived by the image sensor. A control boundary may be determined from a combination of information related to physical devices located in the physical space where the user performs a gesture and information related to the physical dimensions of the user's body in that the physical space. Moreover, a control boundary may relate to part of a physical device, and location of such part. For example, the location of speakers of a device may be used to determine a control boundary (e.g., the edges and corners of a speaker device), so that if a user performs gestures associated with the control boundary (e.g., a downward gesture along or near the right edge of the control boundary, as depicted, for example, in FIG. 5L), the volume of the speakers may be controlled by the gesture. A control boundary may also relate one or more of a specific location on the device, such as the location of the manufacturer logo, or components on the device. Furthermore, the control boundary may also relate to virtual objects as perceived by the user. Virtual objects may be objects displayed to the user in 3D space in the user's field of view by a 3D display device or by a wearable display device, such as wearable augmented reality glasses. Virtual objects, for example, may include icons, images, video, or any kind of visual information that can be perceived by the user in real or virtual 3D. As used in this application, a physical dimension of a device may include a dimension of a virtual object.

In some embodiments, the control boundary may relate to physical objects or devices located temporarily or permanently in a vehicle. For example, physical objects may include hand-held objects associated with the user, such as bags, sunglasses, mobile devices, tablets, game controller, cups or any object that is not part of the vehicle and is located in the vehicle. Such objects may be considered "temporarily located" in the vehicle because they are not attached to the vehicle and/or can be removed easily by the user. For example, an object "temporarily located" in the vehicle may include a navigation system (Global Positioning System) that can be removed from the vehicle by the user. Physical objects may also include objects associated with the vehicle, such as a multimedia system, steering wheel, shift lever or gear selector, display device, or mirrors located in the vehicle, glove compartment, sun-shade, light controller, air-condition shades, windows, seat, or any interface device in the vehicle that may be controlled or used by the driver or passenger. Such objects may be considered "permanently located" in the vehicle because they are physically integrated in the vehicle, installed, or attached such that they are not easily removable by the user. Alternatively, or additionally, the control boundary may relate to the user's body. For example, the control boundary may relate to various parts of the user's body, including the face, mouth, nose, eyes, hair, lips, neck, ears, or arm of the user. Moreover, the control boundary may also relate to objects or body parts associated with one or more persons proximate the user. For example, the control boundary may relate to other person's body parts, including the face, mouth, nose, eyes, hair, lips, neck, or arm of the other person.

In some embodiments, the at least one processor may be configured to detect the user's gestures in relation to the control boundary determined and identify an activity or behavior associated with the user. For example, the at least one processor may detect movement of one or more physical object (such as a coffee cup or mobile phone) and/or one or more body parts in relation to the control boundary. Based on the movement in relation to the control boundary, the at least one processor may identify or determine the activity or behavior associated with the user. Exemplary activities or user behavior may include, but are not limited to, eating or drinking, touching parts of the face, scratching parts of the face, putting on makeup or fixing makeup, putting on lipstick, looking for sunglasses or eyeglasses, putting on or taking off sunglasses or eyeglasses, changing between sunglasses and eyeglasses, adjusting a position of glasses on the user, yawning, fixing the user' hair, stretching, the user searching their bag or other container, the user or front seat passenger reaching behind the front row to objects in the rear seats, manipulating one or more levers for activating turn signals, a driver turning backward, a driver turning backward to reach for an object, a driver turning backward to reach for an object in a bag, a driver, a driver looking for an item in the glove compartment, adjusting the position or orientation of the side mirrors or main rear-view mirror(s) located in the car, moving one or more hand-held objects associated with the user, operating a hand-held device such as a smartphone or tablet computer, adjusting a seat belt, open or close a seat-belt, modifying in-car parameters such as temperature, air-conditioning, speaker volume, windshield wiper settings, adjusting the car seat position or heating/cooling function, activating a window defrost device to clear fog from windows, manually moving arms and hands to wipe/remove fog or other obstructions from windows, a driver or passenger raising and placing legs on the dashboard, a driver or passenger looking down, a driver or other passengers changing seats, placing a baby in a baby-seat, taking a baby out of a baby-seat, placing a child of a child-seat, taking a child out of a child-seat, or any combination thereof.

In some embodiments, the at least one processor may be configured to detect movement of one or more physical devices, hand-held objects, and/or body parts in relation to the user's body, in order to improve the accuracy in identifying the user's gesture, determined parameters related to driver attentiveness, driver gaze direction and accuracy in executing a corresponding command and/or message. By way of example, if the user is touching the user's eye, the at least one processor may be able to detect that the user's eye in the control boundary is at least partially or fully covered by the user's hand, and determine that the user is scratching the eye. In this scenario, the user may be driving a vehicle and gazing toward the road with the uncovered eye, while scratching the covered eye. Accordingly, the at least one processor may be able to disregard the eye that is being touched and/or at least partially covered, such that the detection of the user's behavior will not be influenced by the covered eye, and the at least one processor may still perform gaze detection based on the uncovered eye.

In some embodiments, the processor may be configured to disregard a particular gesture, behavior, or activity performed by the user for detecting the user's gaze direction, or any change thereof. For example, the detection of the user's gaze by the processor may not be influenced by a detection of the user's finger at least partially covering the user's eye. As such, the at least one processor may be able to avoid false detection of gaze due to the partially covered eye, and accurately identify the user's activity, and/or behavior even if other object and/or body parts are moving, partially covered, or fully covered.

In some embodiments, the processor may be configured to detect the user's gesture in relation to a control boundary associated with a body part of the user in order to improve the accuracy in detecting the user's gesture. As an example, in the event that at least one processor detects that the user's hand or finger crossed a boundary associated with a part of the user body, such as eyes or mouth, the processor may use this information to improve the detection of features associated with the user, features such as head pose or gaze detection. For example, when an object/feature of the user's face is covered partly or fully by the user hand, the processor may ignore detection of that object when extracting information related to the user. In one example, when the user's hand covers fully or partly the user mouth, the processor may use this information and ignore detecting the user's mouth when detecting the user's face to extract the user's head-pose. As another example, when the user's hand cross a boundary associated with the user's eye, the processor may determine that the eye is at least partly covered by the user hand or fingers, and that eye should be ignored when extracting data associated with the user's gaze. In one example, in such event, the gaze detection should be based only on the eye which is not covered. In such an embodiment, the hand, fingers, or other object covering the eye may be detected and ignored, or filtered out of the image information associated with the user's gaze. In another example, when the user finger touches or scratches an area next to the eye, the processor may address to that gesture as "scratching the eye", and therefore the form of the eye will be distorted during the "scratching the eye" gesture. Therefore, that eye should be ignored for gaze detection during the "scratching the eye" gesture. In another example, a set of gestures associated with interaction with the user's face or objects placed on the user face such as glasses, can be considered as gestures indicating that during the period they are performed, the level of attentiveness and alertness of the user is decreased. In one example, the gestures of scratching the eye or fixing glasses' position is considered as distracted gesture, while touching the nose or the beard may be considered as non-distracting gestures. In other embodiments, the processor may be configured to detect an activity, gesture, or behavior of the user by detecting a location of a body part of the user in relation to a control boundary. For example, the processor may detect an action such as "scratching" the eye, by detecting the user's hand of finger crossed a boundary associated with the user's eye/s. In other embodiments, the processor may be configured to detect an activity, behavior, or gesture of the user by detecting not only a location of a body part of the user in relation to the control boundary, but also a location of an object associated with the gesture. For example, the processor may be configured to detect an activity such as eating, based on a combination of a detection of user's hand crossing a boundary associated with the user's mouth, a detection of an object which is not the user hand but is "connected" to the upper part of the user hand, and a detection of this object moving with the hand at least in the motion of the hand up toward the mouth. In another example, the eating activity is detected as long as the hand is within a boundary associated with the mouth. In another example, the processor detect an eating activity from the moment the hand with an object attached to it crossed the boundary associated with the mouth and the hand moved away from the boundary after a predetermined period of time. In another example, the processor may be required to detect also a gesture performed by the lower part of the user's face, a repeated gesture in which the lower part is moving down and up, or right and left or any combination thereof, in order to identify the user activity as eating.

Figure 3:
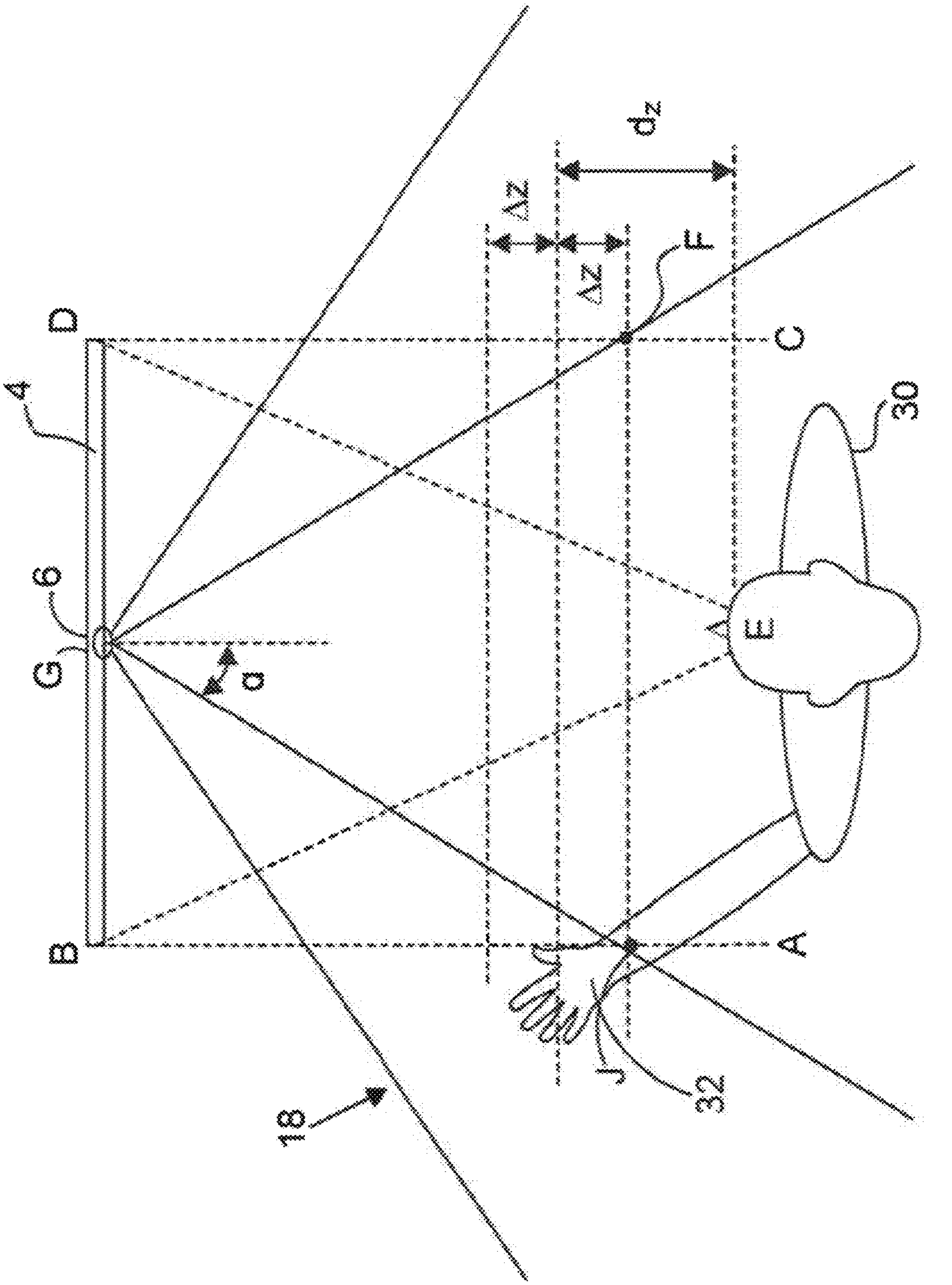
FIG. 3 illustrates an example implementation of a touch-free gesture recognition system in accordance with some of the disclosed embodiments.
Figure 4:
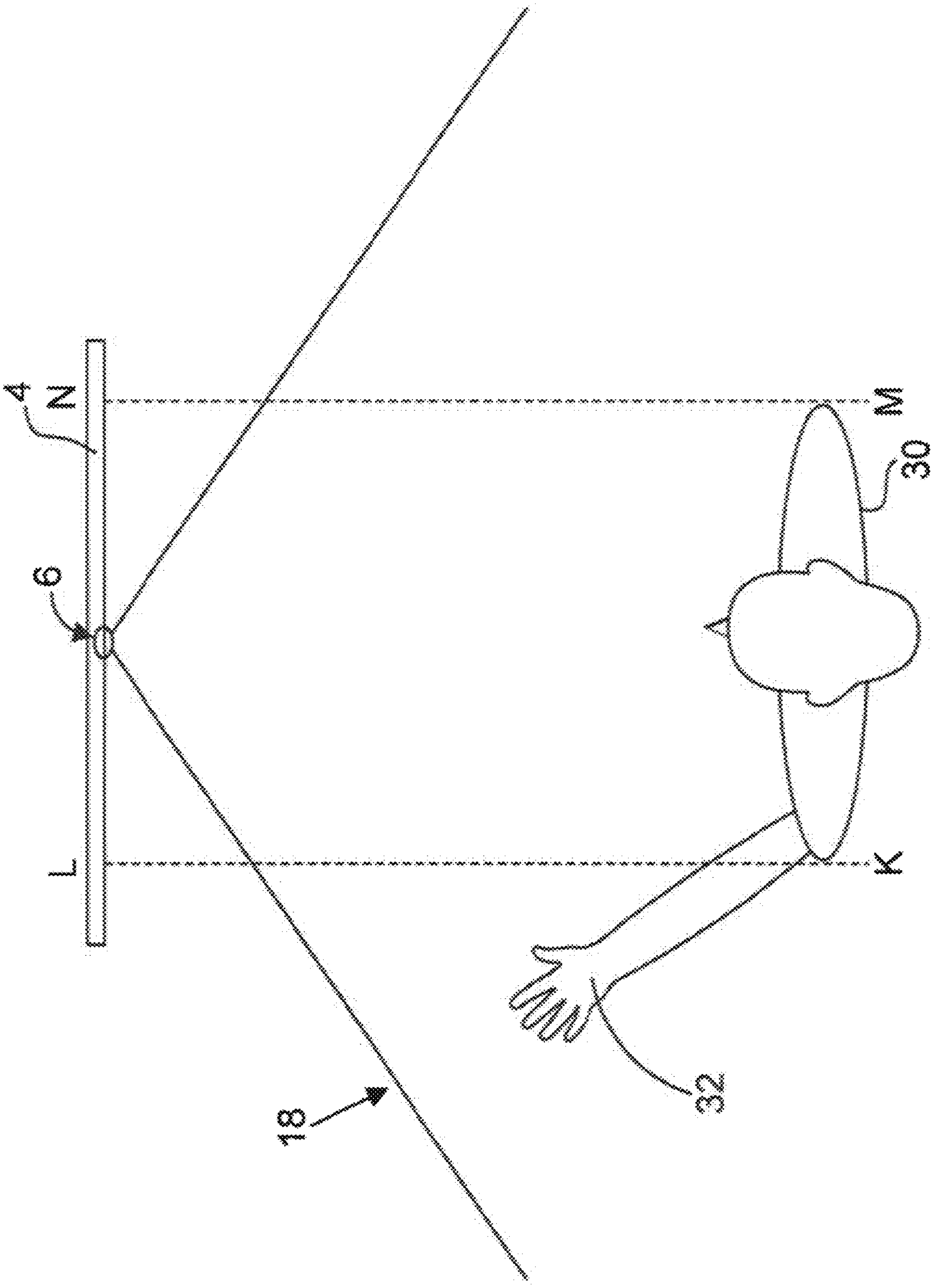
FIG. 4 illustrates another example implementation of a touch-free gesture recognition system in accordance with some of the disclosed embodiments.

FIG. 3 depicts an exemplary implementation of a touch-free gesture recognition system in accordance with some embodiments in which the control boundary may relate to a physical dimension of a device in a field of view of the user. FIG. 4 depicts an exemplary implementation of a touch-free gesture recognition system in accordance with some embodiments in which the control boundary may relate to a physical dimension of a body of the user.

As depicted in the example implementation in FIG. 3, user 30 may view display 4 within the conical or pyramidal volume of space 18 viewable by image sensor 6. In some embodiments, the control boundary relates to broken lines AB and CD, which extend perpendicularly from defined locations on the device, such as, for example, the left and right edges of display 4. For example, as discussed below, the processor 12 may be configured to determine one or more locations in the image information that correspond to lines AB and CD. While only broken lines AB and CD are depicted in FIG. 3, associated with the left and right edges of display 4, in some embodiments the control boundary may additionally or alternatively be associated with the top and bottom edges of display 4, or some other physical dimension of the display, such as a border, bevel, or frame of the display, or a reference presented on the display. Moreover, while the control boundary may be determined based on the physical dimensions or other aspects of display 4, the control boundary may also be determined based on the physical dimensions of any other device (e.g., the boundaries or contour of a stationary object).

The processor 12 may be configured to determine the location and distance of the user from the display 4. For example, the processor 12 may use information from a proximity sensor, a depth sensing sensor, information representative of a 3D map in front of the device, or use face detection to determine the location and distance of the user from the display 4, and from the location and distance compute a field of view (FOV) of the user. For example, an inter-pupillary distance in the image information may be measured and used to determine the location and distance of the user from the display 4. For example, the processor may be configured to compare the inter-pupillary distance in the image information to a known or determined inter-pupillary distance associated with the user, and determine a distance based on the difference (as the user stands further from image sensor 6, the inter-pupillary distance in the image information may decrease). The accuracy of the user distance determination may be improved by utilizing the user's age, since, for example, a younger user may have a smaller inter-pupillary distance. Face recognition may also be applied to identify the user and retrieve information related to the identified user. For example, an Internet social medium (e.g., Facebook) may be accessed to obtain information about the user (e.g., age, pictures, interests, etc.). This information may be used to improve the accuracy of the inter-pupillary distance, and thus improve the accuracy of the distance calculation of the user from the screen.

The processor 12 may also be configured to determine an average distance dz in front of the user's eyes that the user positions the predefined object 24 when performing a gesture. The average distance dz may depend on the physical dimensions of the user (e.g., the length of the user's forearm), which can be estimated, for example, from the user's inter-pupillary distance. A range of distances (e.g., $dz+\Delta z$ through $dz-\Delta z$) surrounding the average distance dz may also be determined. During the performance of a gesture, the predefined object 24 may often be found at a distance in the interval between $dz+\Delta z$ to $dz-\Delta z$. In some embodiments, $\Delta z$ may be predefined. Alternatively, $\Delta z$ may be calculated as a fixed fraction (e.g., 0.2) of dz. As depicted in FIG. 3, broken line FJ substantially parallel to the display 4 at a distance $dz-\Delta z$ from the user may intersect the broken lines AB and CD at points F and J. Points F and J may be representative of a region of the viewing space of the image sensor 6 having semi-apical angle a, indicated by the broken lines GJ and GF, which serve to determine the control boundary. Thus, for example, if the user's hand 32 is outside of the region bounded by the lines GJ and GF, the hand 32 may be considered to be outside the control boundary.

Thus, in some embodiments, the information associated with the control boundary may be, for example, the locations of lines GJ and GF in the image information, or information from which the locations of lines GJ and GF in the image information can be determined.

Alternatively or additionally, in some embodiments, at least one processor is configured to determine the control boundary based, at least in part, on a dimension of the device (e.g., display 4) as is expected to be perceived by the user. For example, broken lines BE and BD in FIG. 3, which extend from a location on or near the body of the user (determined, for example, based on the distance from the image sensor 6 to the user, the location of the user's face or eyes, and/or the FOV of the user) to the left and right edges of display 4, are representative of dimensions of display 4 as is expected to be perceived by the user. That is, based on the distance and orientation of the user relative to the display 4, the processor may be configured to determine how the display is likely perceived from the vantage point of the user.

(E.g., by determining sight lines from the user to the edges of the display.) Thus, the processor may be configured to determine the control boundary by determining one or more locations in the image information that correspond to lines BE and BD (e.g., based on an analysis of the average distance from the user's body that the user positions the predefined object 24). While only broken lines BE and BD are depicted in FIG. 3, associated with the left and right edges of display 4, in some embodiments the control boundary may additionally or alternatively be associated with the top and bottom edges of display 4.

Alternatively or additionally, the control boundary may relate to a physical dimension of a body of the user as perceived by the image sensor. That is, based on the distance and/or orientation of the user relative to the display or image sensor, the processor may be configured to determine a control boundary. The farther the user from the display, the smaller the image sensor's perception of the user, and the smaller an area bounded by the control boundaries. The processor may be configured to identify specific portions of a user's body for purposes of control boundary determination. Thus the control boundary may relate to the physical dimensions of the user's torso, shoulders, head, hand, or any other portion or portions of the user's body. The control boundary may be related to the physical dimension of a body portion by either relying on the actual or approximate dimension of the body portion, or by otherwise using the body portion as a reference for setting control boundaries. (E.g., a control boundary may be set a predetermined distance from a reference location on the body portion.)

The processor 12 may be configured to determine a contour of a portion of a body of the user (e.g., a torso of the user) in the image information received from image sensor 6. Moreover, the processor 12 may be configured to determine, for example, an area bounding the user (e.g., a bounding box surrounding the entire user or the torso of the user). For example, the broken lines KL and MN depicted in FIG. 4 are associated with the left and right sides of a contour or area bounding the user. The processor 12 may be configured to determine the control boundary by determining one or more locations in the image information that correspond to the determined contour or bounding area. Thus, for example, the processor 12 may be configured to determine the control boundary by detecting a portion of a body of the user, other than the user's hand (e.g., a torso), and to define the control boundary based on the detected body portion.

While only broken lines associated with the left and right sides of the user are depicted in FIG. 4, in some embodiments the control boundary may additionally or alternatively be associated with the top and bottom of the contour or bounding area.

In some embodiments, the at least on processor may be configured to cause a visual or audio indication when the control boundary is crossed. For example, if an object in the image information associated with predefined object 24 crosses the control boundary, this indication may inform the user that a gesture performed within a predefined amount of time will be interpreted as gesture associated with the control boundary. For example, if an edge of the control boundary is crossed, an icon may begin to fade-in on display 4. If the gesture is completed within the predefined amount of time, the icon may be finalized; if the gesture is not completed within the predefined amount of time, the icon may no longer be presented on display 4.

While a control boundary is discussed above with respect to a single user, the same control boundary may be associated with a plurality of users. For example, when a gesture performed by one user is detected, a control boundary may be accessed that was determined for another user, or that was determined for a plurality of users. Moreover, the control boundary may be determined based on an estimated location of a user, without actually determining the location of the user.

In some embodiments, the at least one processor is also configured to cause an action associated with the detected gesture, the detected gesture location, and a relationship between the detected gesture location and the control boundary (operation 250). As discussed above, an action caused by a processor may be, for example, generation of a message or execution of a command associated with the gesture. A message or command may be, for example, addressed to one or more operating systems, one or more services, one or more applications, one or more devices, one or more remote applications, one or more remote services, or one or more remote devices. In some embodiments, the action includes an output to a user.

For example, the action may provide an indication to a user that some event has occurred. The indication may be, for example, visual (e.g., using display 4), audio, tactile, ultrasonic, or haptic. An indication may be, for example, an icon presented on a display, change of an icon presented on a display, a change in color of an icon presented on a display, an indication light, an indicator moving on a display, a directional vibration indication, or an air tactile indication. Moreover, for example, the indicator may appear on top of all other images appearing on the display.

In some embodiments, memory 16 stores data (e.g., a look-up table) that provides, for one or more predefined gestures and/or gesture locations, one or more corresponding actions to be performed by the processor 12. Each gesture that is associated with a control boundary may be characterized by one or more of the following factors: the starting point of the gesture, the motion path of the gesture (e.g., a semicircular movement, a back and forth movement, an "S"-like path, or a triangular movement), the specific edges or corners of the control boundary crossed by the path, the number of times an edge or corner of the control boundary is crossed by the path, and where the path crosses edges or corners of the control boundary. By way of example only, a gesture associated with a right edge of a control boundary may toggle a charm menu, a gesture associated with a top edge of a control boundary or bottom edge of a control boundary may toggle an application command, a gesture associated with a left edge of a control boundary may switch to a last application, and a gesture associated with both a right edge and a left edge of a control boundary (e.g., as depicted in FIG. 5K) may select an application or start menu. As an additional example, if a gesture crosses a right edge of a control boundary, an image of a virtual page may progressively cross leftward over the right edge of the display so that the virtual page is progressively displayed on the display; the more the predefined object associated with the user is moved away from the right edge of the screen, the more the virtual page is displayed on the screen.

For example, processor 12 may be configured to cause a first action when the gesture is detected crossing the control boundary, and to cause a second action when the gesture is detected within the control boundary. That is, the same gesture may result in a different action based on whether the gesture crosses the control boundary. For example, a user may perform a right-to-left gesture. If the right-to-left gesture is detected entirely within the control boundary, the processor may be configured, for example, to shift a portion of the image presented on display 4 to the left (e.g., a user may use the right-to-left gesture to move a photograph presented on display 4 in a leftward direction). If, however, the right-to-left gesture is detected to cross the right edge of the control boundary, the processor may be configured, by way of example only, to replace the image presented on display 4 with another image (e.g., a user may use the right-to-left gesture to scroll through photographs in a photo album).

Moreover, for example, the processor 12 may be configured to distinguish between a plurality of predefined gestures to cause a plurality of actions, each associated with a differing predefined gesture. For example, if differing hand poses cross the control boundary at the same location, the processor may cause differing actions. For example, a pointing finger crossing the control boundary may cause a first action, while an open hand crossing the control boundary may cause a differing second action. As an alternative example, if a user performs a right-to-left gesture that is detected to cross the right edge of the control boundary, the processor may cause a first action, but crossing the control boundary in the same location with the same hand pose, but from a different direction, may cause a second action. As another example, a gesture performed in a first speed may cause a first action; the same gesture, when performed in second speed, may cause a second action. As another example, a left-to-right gesture performed in a first motion path representative of the predefined object (e.g., the user's hand) moving a first distance (e.g. 10 cm) may cause a first action; the same gesture performed in a second motion path representative of the predefined object moving a second distance (e.g. 30 cm) may cause a second action The first and second actions could be any message or command. By way of example only, the first action may replace the image presented on display 4 with a previously viewed image, while the second action may cause a new image to be displayed.

Moreover, for example, the processor 12 may be configured to generate a plurality of actions, each associated with a differing relative position of the gesture location to the control boundary. For example, if a first gesture (e.g. left to right gesture) crosses a control boundary near the control boundary top, the processor may be configured to generate a first action, while if the same first gesture, crosses the control boundary near the control boundary bottom, the processor may be configured to generate a second action. Another example, if a gesture that crosses the control boundary begins at a location outside of the control boundary by more than a predetermined distance, the processor may be configured to generate a first action. However, if a gesture that crosses the control boundary begins at a location outside of the control boundary by less than a predetermined distance, the processor may be configured to generate a second action. By way of example only, the first action may cause an application to shut down while the second action may close a window of the application.

Moreover, for example, the action may be associated with a predefined motion path associated with the gesture location and the control boundary. For example, memory 16 may store a plurality of differing motion paths, with each detected path causing a differing action. A predefined motion path may include a set of directions of a gesture (e.g., left, right, up down, left-up, left-down, right-up, or right-down) in a chronological sequence. Or, a predefined motion path may be one that crosses multiple boundaries (e.g., slicing a corner or slicing across entire display), or one that crosses a boundary in a specific region (e.g., crosses top right).

A predefined motion path may also include motions associated with a boundary, but which do not necessarily cross a boundary. (E.g., up down motion outside right boundary; up down motion within right boundary).

Moreover, a predefined motion path may be defined by a series of motions that change direction in a specific chronological sequence. (E.g., a first action may be caused by down-up, left right; while a second action may be caused by up-down, left-right).

Moreover, a predefined motion path may be defined by one or more of the starting point of the gesture, the motion path of the gesture (e.g., a semicircular movement, a back and forth movement, an "S"-like path, or a triangular movement), the specific edges or corners of the control boundary crossed by the path, the number of times an edge or corner of the control boundary is crossed by the path, and where the path crosses edges or corners of the control boundary.

In some embodiments, as discussed above, the processor may be configured to determine the control boundary by detecting a portion of a body of the user, other than the user's hand (e.g., a torso), and to define the control boundary based on the detected body portion. In some embodiments, the processor may further be configured to generate the action based, at least in part, on an identity of the gesture, and a relative location of the gesture to the control boundary. Each different predefined gesture (e.g., hand pose) may have a differing identity.

Moreover, a gesture may be performed at different relative locations to the control boundary, enabling each different combination of gesture/movement relative to the control boundary to cause a differing action.

In addition, the processor 12 may be configured to perform different actions based on the number of times a control boundary is crossed or a length of the path of the gesture relative to the physical dimensions of the user's body. For example, an action may be caused by the processor based on a number of times that each edge or corner of the control boundary is crossed by a path of a gesture. By way of another example, a first action may be caused by the processor if a gesture, having a first length, is performed by a first user of a first height. The first action may also be caused by the processor if a gesture, having a second length, is performed by a second user of a second height, if the second length as compared to the second height is substantially the same as the first length as compared to the first height. In this example scenario, the processor may cause a second action if a gesture, having the second length, is performed by the first user.

The processor 12 may be configured to cause a variety of actions for gestures associated with a control boundary. For example, in addition to the examples discussed above, the processor 12 may be configured to activate a toolbar presented on display 4, which is associated with a particular edge of the control boundary, based on the gesture location. That is, for example, if it is determined that the gesture crosses a right edge of the control boundary, a toolbar may be displayed along the right edge of display 4. Additionally, for example, the processor 12 may be configured to cause an image to be presented on display 4 based on the gesture, the gesture location, and the control boundary (e.g., an edge crossed by the gesture).

By configuring a processor to cause an action associated with a detected gesture, the detected gesture location, and a relationship between the detected gesture location and a control boundary, a more robust number of types of touch-free gestures by a user can be performed and detected. Moreover, touch-free gestures associated with a control boundary may increase the usability of a device that permits touch-free gestures to input data or control operation of the device.

As discussed above, systems for determining a driver's level of control over a vehicle and the driver's response time may comprise a processor configured to use one or more machine learning algorithms to learn online or offline the driver's placement of his hand(s) over the steering wheel during a driving session and in relation to driving events. Accordingly, the processor may be configured to implement the one or more machine learning algorithms to predict and determine the driver's level of control over the vehicle and response time based on a detection of, for example, the driver's placement of his hand(s) over the steering wheel. By way of example, FIGS. 7A-7E illustrate various locations and orientations of the driver's hand(s) over a steering wheel of a vehicle, that may be associated with different levels of control and/or response time of the driver, determined using a machine learning algorithm trained using information about the driver and/or information about other drivers.

Figure 7B:
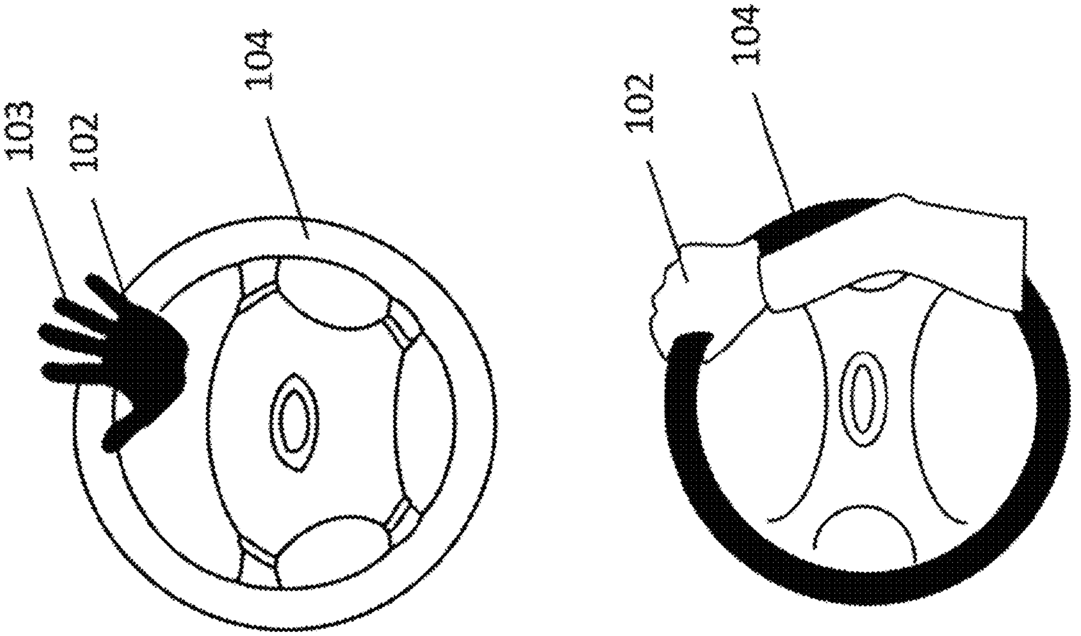
FIG. 7B illustrates an exemplary second detectable placement of a driver's hand over a steering wheel, consistent with the embodiments of the present disclosure.
Figure 7A:
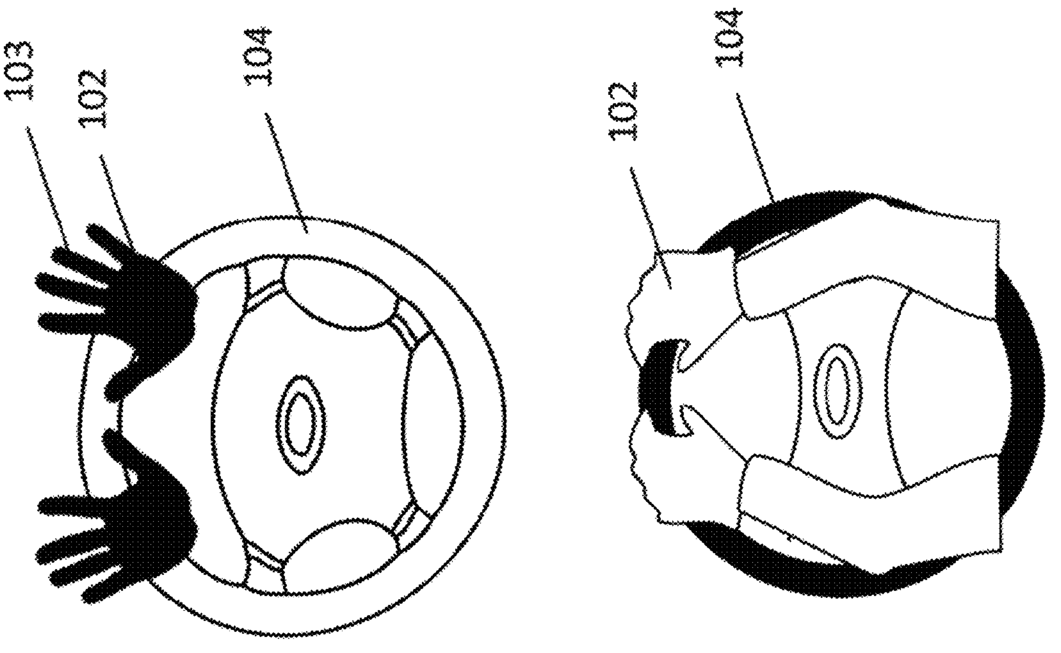
FIG. 7A illustrates an exemplary first detectable placement of a driver's hands over a steering wheel, consistent with the embodiments of the present disclosure.

FIG. 7A, for example, illustrates one embodiment of a location and orientation of a driver's hands 102 over a steering wheel 104 of a vehicle. As illustrated in FIG. 7A, the system may determine that both of the driver's hands 102 are placed over the steering wheel 104 and both of the driver's hands 102 are firmly grasping the steering wheel 104 with all of the driver's fingers 103. In some embodiments, the hand positioning and orientation of the driver's hands 102 over the steering wheel 104 shown in FIG. 7A may be associated with a high level of control over the vehicle for the driver. In some embodiments, the hand positioning and orientation may be associated with a minimum (lowest) response time for the driver to act in response to an emergency driving event.

FIG. 7B illustrates another embodiment of a location and orientation of the driver's hand 102 over the steering wheel 104 of a vehicle. As compared to FIG. 7A where both of the driver's hands 102 are grasping the steering wheel 104, FIG. 7B illustrates only one hand 102 placed on the steering wheel 104. The system may determine that, with respect to FIG. 7B, the driver's hand 102 is grasping the top of the steering wheel 104 of the vehicle with five fingers 103. Accordingly, the system may determine that the location and orientation of the driver's hand 102 over the steering wheel 104 shown in FIG. 7B indicates that the driver is in control of the vehicle. However, as compared to the hand positioning and orientation shown in FIG. 7A, the system may determine that the location and orientation of the driver's hands 102 in FIG. 7B are associated with a lower level of control and/or a slower response time of the driver. For example, if the system has historical data indicating the driver typically drives with two hands on the steering wheel, or historical data indicating the driver's ability to control or react in emergency situations when driving with one or two hands on the steering wheel, then the system may use the historical data to associate later a detection of a single hand on the steering wheel with a certain level of control of the driver over the vehicle and/or a certain response time to act in an event of emergency.

Figure 7C:
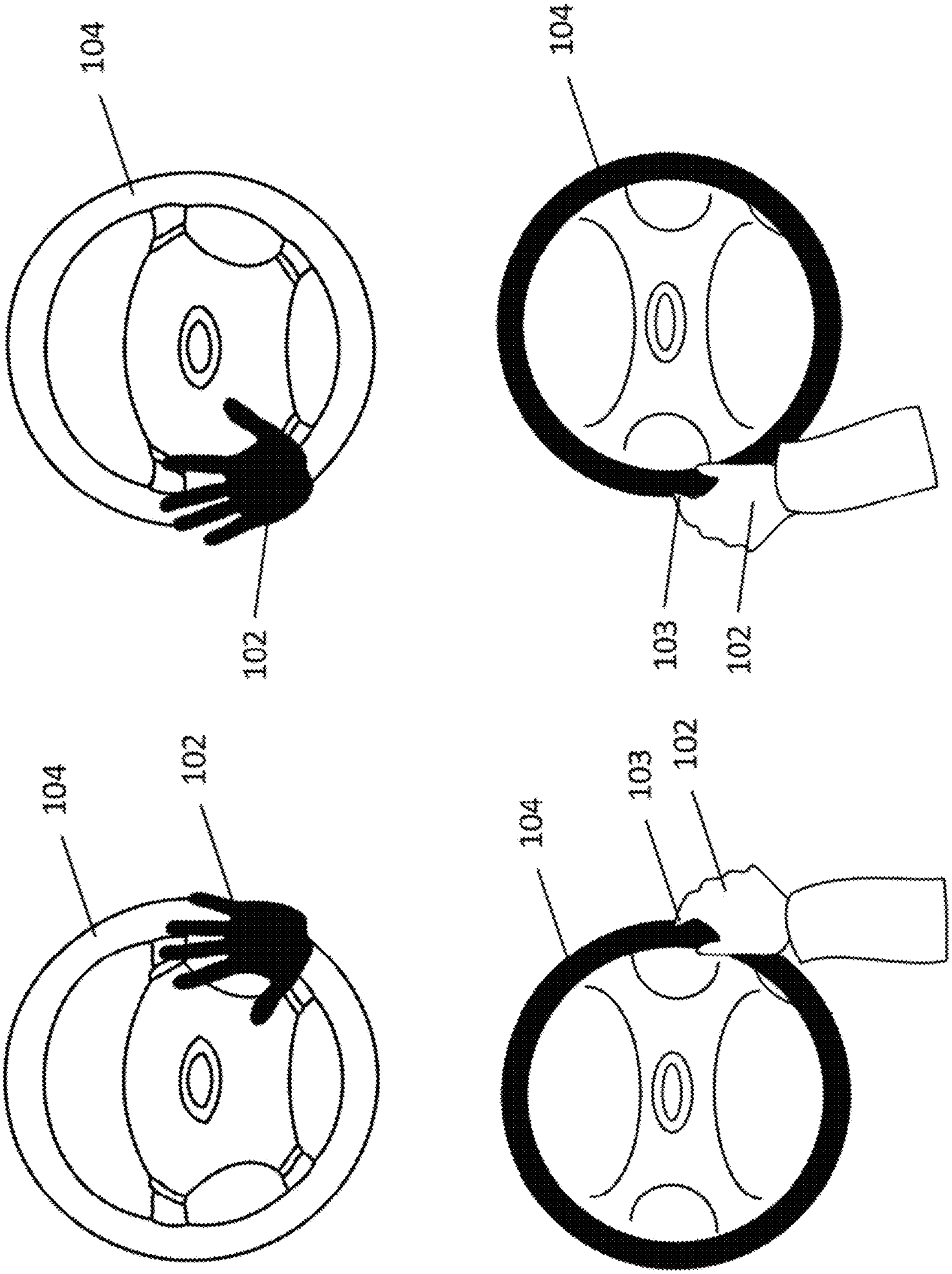
FIG. 7C illustrates an exemplary third detectable placement of a driver's hand over a steering, consistent with the embodiments of the present disclosure.

FIG. 7C illustrates other examples of locations and orientations of the driver's hands 102 on the steering wheel 104 of a vehicle. For example, FIG. 7C illustrates examples of one hand 102 of the driver placed on the side of the steering wheel 104. In addition, FIG. 7C illustrates the driver holding the steering wheel 104 with only two fingers 103, instead of firmly grasping the steering wheel 104 with all fingers. Accordingly, the detected locations and orientations of the driver's hand 102 shown in FIG. 7C may associated with certain levels of control and/or response times in certain driving conditions. In some embodiments, driving conditions or road conditions may include, for example, a type of road on which the driver is driving the vehicle such as a highway, a local road, etc., the environmental conditions, weather around the vehicle, an amount of traffic, behavior of other vehicles surrounding the driver's vehicle, lighting color intensity or brightness of lights on other vehicles surrounding the driver's vehicle, and other road conditions such as a wetness or slickness of the roadway, a roughness of the roadway, or hazards such as ice or debris on the roadway, the surrounding environment such as greenery, city, mountain, and any other factors about the roadway or the environment around the vehicle that may affect the movement or safety of the vehicle. In some embodiments, the positioning, location, and orientation of the driver's hand 102 on the steering wheel 104 in FIG. 7C may be associated with a higher level of control and quick response time in favorable driving conditions, as long as the driver maintains a grip of the steering wheel 104 (e.g., the driver doesn't have an open hand touching the steering wheel). In some embodiments, the same hand 102 positioning, location, and orientation may be associated with a lower level of control and slower response time in driving conditions that the system has associated with emergency driving conditions. Accordingly, the system may dynamically update its assessment of the driver's level of control and response time in relation to changes in the driving conditions and historical data associating driving conditions with hand positioning, location, and orientation on the steering wheel.

Figure 7D:
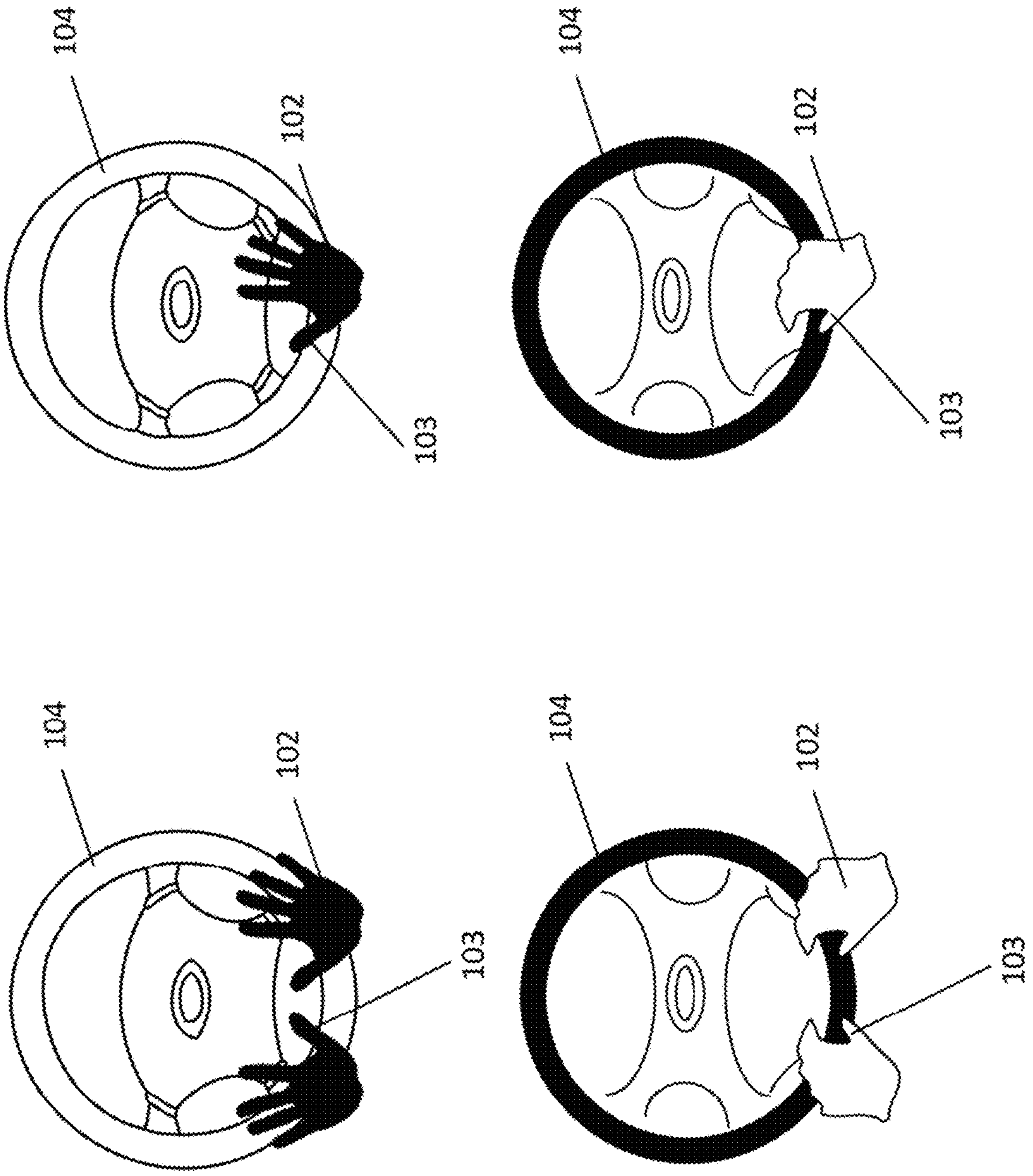
FIG. 7D illustrates exemplary fourth detectable placement of a driver's hand or hands over a steering wheel, consistent with the embodiments of the present disclosure.

FIG. 7D illustrates other embodiments of locations and orientations of the driver's hands 102 over the steering wheel 104 of a vehicle. For example, FIG. 7D illustrates one or two hands 102 of the driver placed on the steering wheel 104 with the driver holding the bottom of the steering wheel 104 with one or both hands 102, and using only two fingers 103 of each hand 102, instead of firmly grasping the steering wheel 104 with all fingers. The locations and orientations of the driver's hands 102 relative to the steering wheel 104 in FIG. 7D may be associated with certain levels of driver control and/or response time for certain driving conditions. For example, the locations and orientations of the driver's hand 102 on the steering wheel 104 shown in FIG. 7D may be associated with a low level of control over the vehicle and/or a long response time in an event of an emergency, but only in a limited types of driving conditions, such as when the driver is driving over a pothole or uneven roadway surface that may be associated with a higher required level of control over the vehicle.

Figure 7E:
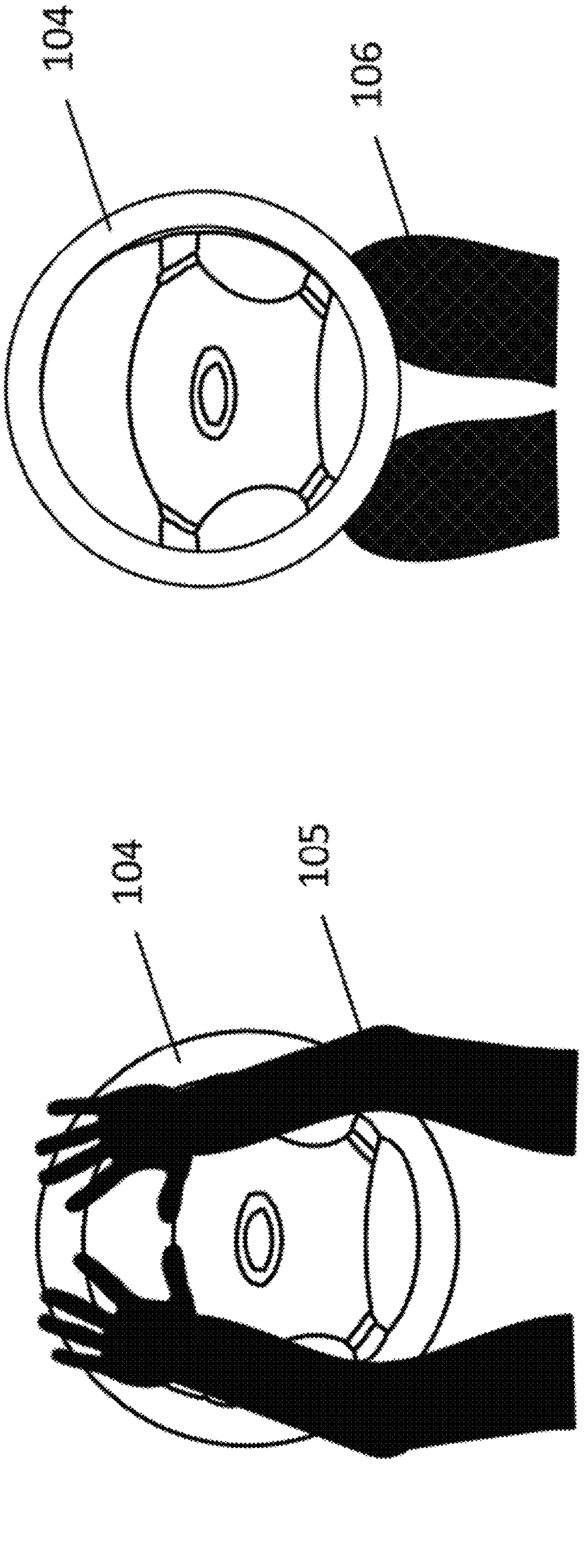
FIG. 7E illustrates exemplary detectable placements of a driver's arms, legs, or knees against a steering wheel, consistent with the embodiments of the present disclosure.

FIG. 7E illustrates other embodiments of locations and orientations of the driver's body parts other than the driver's hands over the steering wheel 104 of a vehicle. For example, FIG. 7E illustrates the driver's arms 105 and the driver's knees 106 placed on the steering wheel 104. For example, when the driver is holding one or more objects with both hands and cannot grasp the steering wheel 104, the driver may attempt to control the steering wheel by using other body parts, such as arms 105 or knees 106. In some embodiments, the position, orientation, or location of the driver's body part(s) on the steering wheel shown in FIG. 7E may be associated with a low level of control of the driver over the vehicle. Accordingly, based on the position, orientation, or location of the driver's body part(s) on the steering wheel of a vehicle, one or more processors of the system may determine the driver's level of control over the vehicle and the driver's response time to an event of an emergency.

In some embodiments, the system may detect one or more gestures, actions, or behaviors of the driver, and determine the driver's level of control or response time in part using information about the driver's gestures, actions, or behavior. The system may comprise at least one processor configured to alert the driver of a subconscious action of picking up a mobile phone, for example, in response to a detection or notification of an incoming content, such as an incoming text message, an incoming call, an instant message, a video beginning to play on the mobile device, a notification on the mobile device, an alert message, or an application launching on the mobile device. For many people, for example, picking up a mobile phone following receiving a notification of an incoming message or call is an automatic, is an involuntary response. Accordingly, drivers may involuntarily reach for and pick up a mobile phone without being aware that the drivers' hands are moving toward the mobile phone. Many times, when a driver reaches for his mobile phone, their gaze also follows and turns toward the screen of the mobile phone. In some embodiments, the processor may be configured to detect the driver's gaze from received image information, or track the user's gaze in the received image information. The at least one processor may be configured to determine that the driver's change in gaze or tracked gaze is associated with a motion for picking up the mobile device based on historical data for the driver or data for other drivers correlating the gaze and motion. Therefore, the processor may be configured to determine the intention of the driver to pick up a mobile phone before the action actually takes place (e.g., before the driver actually picks up the mobile phone). The processor may be configured to provide an alert to the driver in time that is associated with the driver's action or gesture of stretching his hand toward the mobile phone to pick it up. In some embodiments, the processor may be configured to provide one or more additional notifications indicating when the driver can pick up and look at the mobile phone (such as when the driver is at a traffic light), or notify the driver when it is very dangerous for the driver to look at the mobile device based on the environmental condition, the driving condition, surrounding vehicles, surrounding humans, or the like. In some embodiments, the processor may be configured to use information from other sources or other systems such as ADAS or the cloud in order to determine the level of danger of looking at or picking up the mobile device. The at least one processor may associate a low level of control of the driver with one or more gestures, actions, or behaviors that take the driver's gaze away from the road, or remove the driver's hand(s) from the steering wheel.

In other embodiments, the processor may be configured to determine the driver's intention to pick up a device, such as a mobile phone, by tracking the driver's body, change in posture, motion or movement of different part(s) of the driver's body, driver's gestures performed, and gestures of the driver's hand associated with the action of picking up the mobile phone. In some embodiments, the processor may determine the driver's intention by detecting the gesture of picking up the device. However, since the processor needs to alert the driver before the driver actually picks up the mobile device, the processor may detect a gesture indicating the intention of the driver to pick up the device, such as the driver's hand stretching ahead toward the mobile device. In some embodiments, the processor may detect the gesture that indicates a driver's intention to pick up the mobile device by detecting the location of the mobile device in the vehicle and detecting a gesture that correlates to or indicates a gesture of reaching toward a mobile device that is in the location where the mobile device is located. In some embodiments, the processor may use one or more machine learning algorithms, such as neural networks, to learn offline and/or online a driver's gestures that indicate his intention of picking up mobile device while driving. In other embodiments, the processor may learn the specific gestures that indicate a driver's intention of picking up a mobile device while driving. In some embodiments, the processor may learn different gestures specific to a driver that are correlated with picking up a mobile phone, and correlate the different gestures with driver behavior while driving, driving behavior, driving conditions, the driver different actions while driving, and/or the behavior of other passengers (such as the gesture of picking up the mobile phone can be different if there is another passenger in the car, for example, the gesture can be more settle, slower, less implosive, in different motion vectors, etc.).

Figure 8:
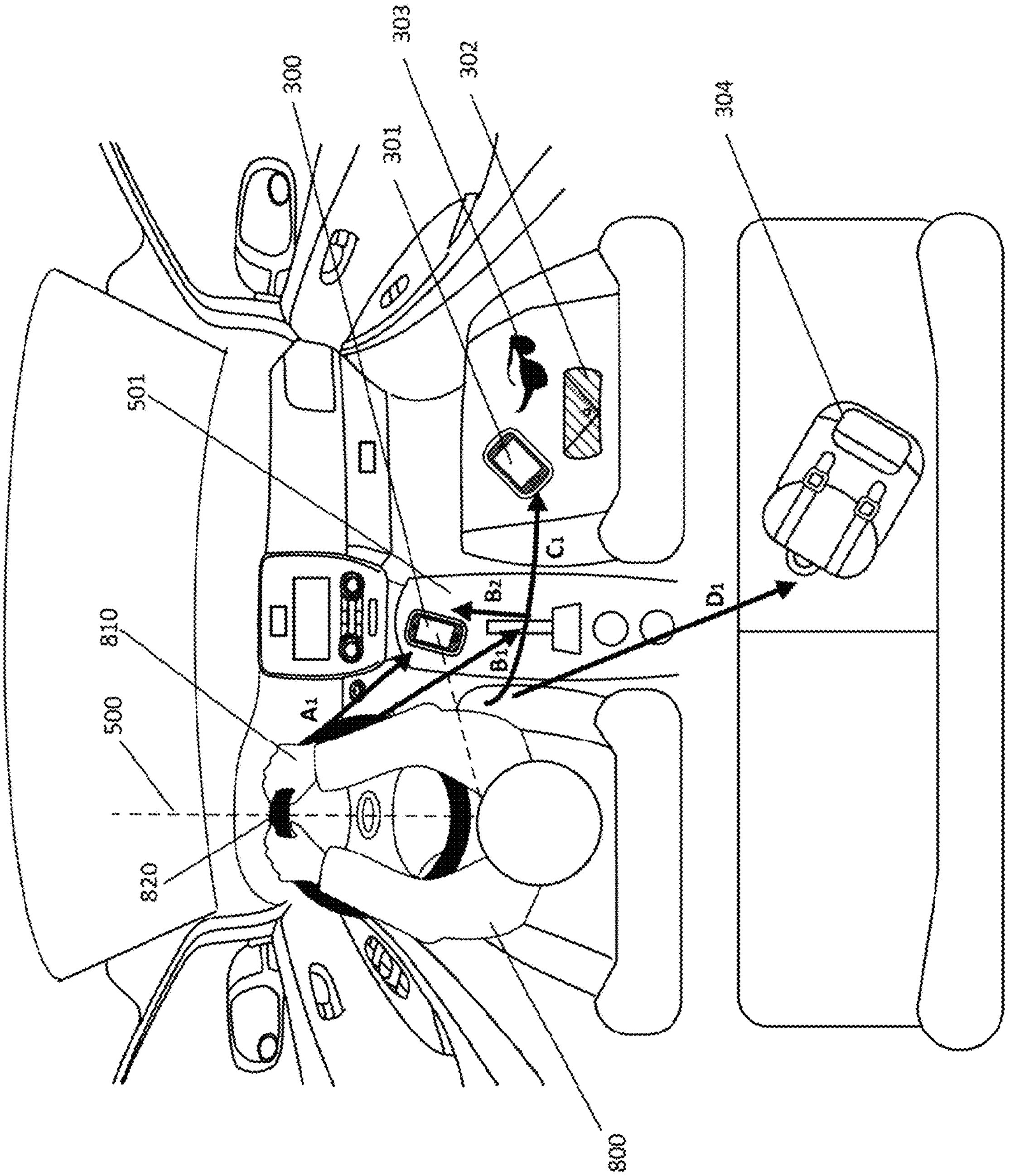
FIG. 8 illustrates an exemplary environment for detecting a driver's intention to interact with a device while driving, consistent with the embodiments of the present disclosure.

In some embodiments, the processor may determine a driver's intention of picking up a device, such as a mobile phone, using information indicating an event that took place in the mobile device (such as a notification of incoming content, incoming phone call, incoming video call, etc.). FIG. 8, for example, illustrates an exemplary system for detecting an intention of a driver 800 to pick up a device 300, such as mobile phone 301, sunglass pouch 302, sunglasses 303, or bag 304 while driving. The processor may detect a beginning of a gesture of the hand of a driver 800 that is closest to an object, such as device 300. In this example, the hand that is closest to device 300 is the right hand 810 of driver 800. Based on motion features associated with the detected gesture of the right hand 810 of driver 800, the processor may determine the intention of the driver 800 to pick up the device 300.

In some embodiments, the processor may determine the intention of the driver 800 to pick up a device, such as device 300, mobile phone 301, sunglass pouch 302, sunglasses 303, or bag 304 using machine learning techniques. For example, an input from a sensor in the vehicle, such as an image sensor, may be used as the input for a neural network that learned gestures performed by driver 800 that ends with driver 800 picking up a device, such as a mobile phone. In other embodiments, the neural network may learn gestures of driver 800 who is driving the car at that moment that ends at picking up a device, such as a mobile phone.

In some embodiments, the processor may track one or more vectors A1, B1-B2, C1, D1 of the motion of different part of the driver's body, such as the hand 810, elbow, shoulder, etc. of driver 800. Based on the one or more motion vectors A1, B1-B2, C1, D1, the processor may determine the intention of the driver 800 to pick up a device. In some embodiments, the processor may detect a location of the device, such as device 300, mobile phone 301, sunglass pouch 302, sunglasses 303, or bag 304, and use the location information with the detected gestures, and/or motion features (such as motion vectors A1, B1-B2, C1, D1) to determine the intention of the driver 800 to pick up a device. In some embodiments, the processor may detect a sequence of gestures/motion vectors such as vectors B1, B2, wherein the first gesture (B1) represents the driver 800, for example, lowering his hand from the steering wheel 820, and then the hand is stopped for T seconds before another gesture starts (B2). The processor may predict the intention of the driver 800 to pick up a device based on the first gesture B1, without waiting until the driver will perform the following gesture B2. In some embodiments, the processor may use information indicating the gaze direction 500, 501 of the driver 800 and change of gaze of the driver 800, for example, toward device 501 as sufficient information to determine or predict that the driver 800 has the intention of picking up device 501. Additionally, or alternatively, the processor may use information indicating the gaze direction 500, 501 of the driver 800 and change of gaze of the driver 800, for example, toward device 501, along with the implementations mentioned above such as detecting hand gestures of the driver and motion features of different part of the driver body, to determine the driver's intention of picking up device 501. In some embodiments, the processor may determine or predict the intention of driver 800 to pick up a device by detecting a subset of a whole gesture of reaching a hand, such as hand 810, toward a device or by detecting the beginning of the gesture toward the device.

In some embodiments, the systems and methods disclosed herein may alert the driver of a subconscious action to pick up a mobile phone in response to a notification of an incoming content, such as an incoming message, an incoming call, or the like. Many mobile phones and mobile applications request that a user operating the phone or application while driving be a passenger, rather than a driver. Accordingly, in order to activate the phone or mobile application the user that operates the phone or application needs to declare that he or she is not the driver. However, conventional systems and methods do not provide verification that the actual user is a passenger and not the driver. The systems and methods disclosed herein may enable verification that the actual use is a passenger and not the driver. While the systems and methods disclosed herein are directed to verifying individuals in a vehicle, the systems and methods herein may be implemented in any environment to verify whether individuals are authorized or unauthorized.

In some embodiments, the system may comprise a processor configured to detect in one or more images or videos from a sensor, such as an image sensor that captures a field of view of the driver, the driver and at least one of a mobile phone, the location of the mobile phone, gesture performed by the driver, motion of one or more body parts of the driver, gesture performed by the driver toward the mobile phone, one or more objects that touched the phone (such as a touch pen) and being held by the driver, the driver touching the phone, the driver's hand holding the phone, etc. to determine that the operator of the mobile phone is the driver. In the event that the processor determines that the operator is the driver of the vehicle, the phone or mobile application may be blocked from being activated according to a predefined criteria. In some embodiments, the system may identify the individual that interacts with the device, such as by determining an identity of an individual looking towards the device, touching the device, manipulating the device, holding the device. In some embodiments, the system may identify the individual attempting to interact with the device, such as by identifying the individual motioning in manner indicative of an intent to answer a call, viewing a message on the device, or opening an application program on the device. In some embodiments, the determined identity may include a personal identification of the individual including their personal identity. In some embodiments the determined identify may include a seating position or role of the individual in the vehicle, such as a determination of whether the individual is the driver, front seat passenger, rear seat passenger, or any other potential preprogrammed or identified seating positions.

The system may identify the individual by detecting the direction of the gesture toward the device, the motion vector of the gesture, the origin of the gesture (e.g., a gesture from the right or from the left toward the device), the motion path of the interacting object (e.g., finger or hand), the size of the fingertip (e.g., diameter of the fingertip) as detected by the touch screen. The system may also determine the individual to whom the gesture of the hand or finger that interacts with the device or holds the device is. In some embodiments, the system may associate the gesture with an individual in the car, such as by associating the gesture with the personal identity of a person determined to be in the vehicle based on personally identifying information such as biometrics, user login information, or other known identifying information. In some embodiments, the system may additionally or alternatively associate the gesture with a role or location of an individual in the car, such as a seating position of the individual or the role of the individual as a driver or passenger. It is to be understood that in some embodiments, all individuals in the vehicle may be considered "passengers" if the vehicle is operating in an autonomous manner, and yet one or more individuals may be also identified as drivers if they are currently in control of some aspects of the vehicle movement or may become in control of the vehicle upon disabling the vehicle's autonomous capabilities. In some embodiments, for example, the criteria may be defined by the mobile phone manufacturer, mobile application developer or manufacturer, the regulation of the state, the vehicle manufacturer, any legal entity (such as the company in which the driver works), the driver, the driver's parents or legal guardian, or any one or more persons or entities.

In some embodiments, the system may detect an interaction by detecting a gesture of at least one body part. The system may associate the detected gesture with an interaction or an attempted operation. In some embodiments, the system may determine an area within a vehicle where the gesture originates, such as a seat in the vehicle, the driver's seat, the passenger seat, the second row in the vehicle, or the like. The system may also associate the detected gesture with an individual in the car or a location of an individual in the vehicle. In other embodiments, the system may determine the individual operating the device and associate the detected gesture with the individual. The area where the gesture originates may be determined in part using one more motion features associated with the gesture, such as a motion path or motion vector.

In other embodiments, the system may track a posture or change in body posture of an individual in the vehicle, such as a driver, to determine that the individual is operating the mobile device. The system may detect the mobile device in the car and use information associated with the detection, such as a location of the mobile device, to determine that the individual is operating the mobile device. In some embodiments, the system may detect a mobile device, detect an object that touches the mobile device, and detect the hand of the individual holding the object to determine that the individual is operating the mobile device.

In some embodiments, the request for verification that the operator is not the driver may be initiated by the mobile phone that communicate the request to the system (for example, via command or message) and waits for the indication from the system whether the operator is the driver. In some embodiments, the processor may provide to the mobile phone or mobile application an indication of whether it is a safe timing to operate the mobile phone by the driver, such as when the vehicle is stopped at a traffic light or when the driver is waiting in parking. In some embodiments, the processor may further recognize the driver via face recognition techniques and correlate the owner of the mobile phone with the identity of the driver to determine if the current operator of the phone is the driver. In other embodiments, the processor may detect the gaze direction of the driver and use data associated with the gaze direction of the driver to determine if the current operator of the mobile phone is the driver.

In some embodiments, the detection system may comprise one or more components embedded in the vehicle or be part of the mobile device, such as the processor, camera, or microphone of the mobile device. In other embodiments, the mobile device could be another device or system in the car, such as the entertainment system, HVAC controls, or other vehicle systems that the driver should not be interacting with while driving. In yet another embodiment, the detection system may not be a digital or smart device, but may be a part of the vehicle, such as the hand brake, buttons, knobs, or door locks of the vehicle.

In some embodiments, inputs from a second sensor may be used to verify the identity of the individual interacting with the device. For example, a microphone may be used to verify the voice of the individual. In other embodiments, proximity sensors or presence sensors may be used to detect interaction with the device and to detect the number of people in the vehicle. In another embodiment, the number of people in proximity to the device may be determined using proximity sensor or presence sensors.

In some embodiments, the system may receive information from at least one image sensor in the vehicle to make one or more of the determinations disclosed herein, such as determining whether the individual is authorized to interact with the device. In some embodiments, the first information may be processed by at least one processor to generate a one or more sequences of images in the first information. In other embodiments, the first information may be input directly into a machine learning algorithm executed by the at least one processor, or by one or more other connected processors, without first generating sequence(s) of images. In some embodiments, the at least one processor or other processors may process the first information to identify and extract features in the first information, such as by identifying particular objects, points of interest, or tagging portions of the first information to be tracked. In such embodiments, the extracted features may be input into a machine learning algorithm, or the at least one processor may further process the first information to generate one or more sequences associated with the extracted features. In other embodiments, the system may detect an object that touches the device in the first information from the image sensor, determine the body part holding the detected object, and identify the interaction between the individual and the device. The first information, or the one or more generated sequences, or the extracted features, or the one or more sequences associated with the extracted features, or any combination thereof, may be input into a machine learning algorithm to generate one or more outcomes. In some embodiments, a classification model may be used to output a classification associated with the inputted first information, extracted features, and/or generated sequences thereof.

In some embodiments, the at least one processor may extract features from the first information such as, for example, a direction of a gaze of the user such as the driver, a motion vector of one or more body parts of the user, or other information that can be directly measured, estimated, or inferred from the received first information.

In some embodiments, the system may receive second information from, for example, the second sensor and determine whether the individual is authorized based at least in part on the second information. In some embodiments, second information may be associated with the interior of the vehicle. In other embodiments, second information may be associated with the device. Second information may comprise, for example, second sensor data associated with a microphone, a light sensor, an infrared sensor, an ultrasonic sensor, a proximity sensor, a reflectivity sensor, a photosensor, an accelerometer, or a pressure sensor. In some embodiments, second information associated with a microphone may include a voice or a sound pattern associated with one or more individuals in the vehicle. In some embodiments, second information may include data associated with the vehicle such as a speed, acceleration, rotation, movement, or operating status of the vehicle. Second information associated with a vehicle may also include information indicative of an active application associated with the vehicle such as an entertainment, performance, or safety application running in the vehicle. In some embodiments, second information associated with the vehicle may include information indicative of one or more road conditions proximate the vehicle or in an estimated or planned path of the vehicle. In some embodiments second information associated with the vehicle may include information regarding the presence, behavior, or condition of surrounding vehicles. In some embodiments, second information associated with the vehicle may include information associated with one or more events proximate to the vehicle, such as an accident or weather event within a predetermined distance of the vehicle or in a planned path of the vehicle, or an action performed by a proximate vehicle, person, or object. Second information may be collected by one or more sensor devices associated with the vehicle, or from a service in communicative connection with the vehicle, for providing second information from a remote source. In some embodiments, the at least one processor may be configured to determine whether a user is authorized to use a device in the vehicle based at least in part on predefined authorization criteria. Such authorization criteria may be associated with certain second information, in some embodiments. As a non-limiting example, the processor may determine that a user is not authorized to operate a mobile phone device due to second information indicating that the vehicle is in motion in unsafe weather conditions, and second information indicating that the voice of the user originates from a driver seating position.

In some embodiments, the processor may detect and track the driver's gaze and decide whether the driver is attentive or not and determine the level of attentiveness to the driving, to the road, and to events that take place on the road. In some embodiments, a gaze of the driver may comprise, for example, a region of the driver's field of view within a predefined or dynamically-determined distance from a point in space where the driver's eyes are looking.

Figure 9:
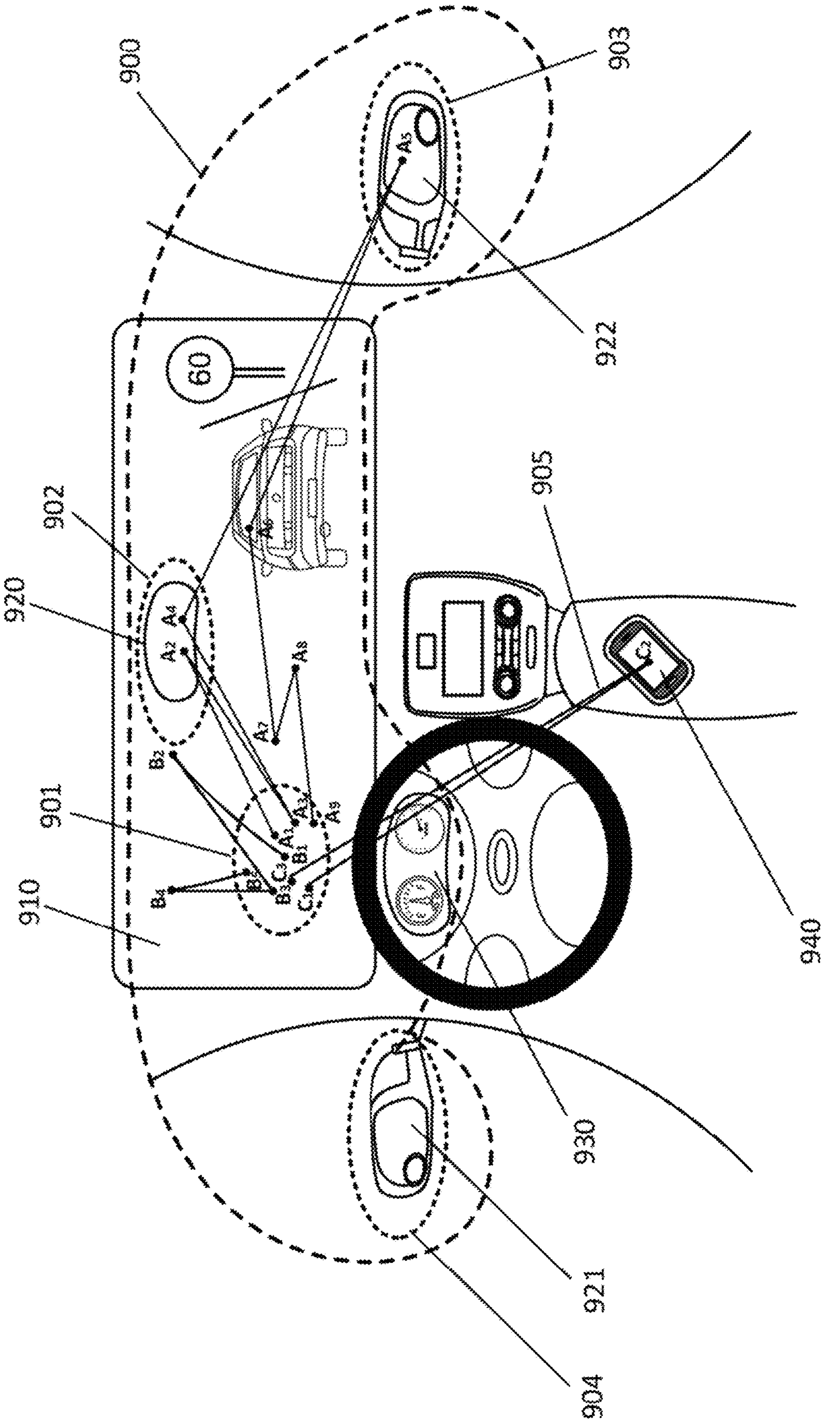
FIG. 9 illustrates a mapping of a field of view of a driver, consistent with the embodiments of the present disclosure.

For example, a gaze may include an elliptical, circular, or irregular region surrounding a point in space along a vector extending from the drivers' eyes relative to the orientation of the driver's head. FIG. 9, for example, illustrates examples of the gaze locations of the driver, and gaze dynamics as the driver's gaze shifts from region to region. In some embodiments, a gaze dynamic may comprise a sequence, pattern, collection, or combination of gaze locations and timing of an individual. For example, a gaze dynamic may include a driver looking straight through the windshield toward the road, then looking down toward a phone for 3 seconds, then looking again through the windshield toward the road. A gaze dynamic may be determined using features extracted from received image information, where the features are associated with the change in driver gaze. In some embodiments, one or more rules-based systems, classifier systems, or machine learning algorithms may use gaze dynamic information as inputs for determining a level of attentiveness, control, or a response time of a driver. In some embodiments, gaze dynamic may be determined by tracking features associated with the gaze of the driver, such as pupil location, gaze direction or vector, head position or orientation, and other features associated with gaze or motion disclosed herein. The dashed regions in FIG. 9 illustrate examples of regions that may be associated with varying levels of attentiveness, and the disclosed systems may be configured to map in the entire possible field of view 900 of a driver that is relevant for attentive driving. Some regions may represent hot spots where the driver should look while driving given the context of the vehicle state and the driver's behavior, whereas other dashed regions may be associated with a low level of attentiveness and/or low level of control over the vehicle, because such regions are associated with distractions or poor ability for the driver to react to driving events.

There may be areas outside of the field of view 900 that are related to non-attentive areas, such as areas that, when the driver is looking at the non-attentive areas, indicate that the driver is not attentive at that moment to driving. In some embodiments, a level of attentiveness of the driver can be tagged to one or more areas outside the field of view 900. In some embodiments, the processor may incorporate more than one areas or regions where each area or region reflects a different level of attentiveness of the driver. In some embodiments, the processor may estimate a field of view of the user/driver based on the user's current head position, orientation, and/or direction of gaze. The processor may additionally or alternatively determine the user's potential field of view, including the areas the user is able to see based on their head orientation, and additional areas that could become part of the field of view upon the user turning their head.

In the field of view 900, there may be one or more areas, including an area 901 associated with the direction of driving. When the driver is looking at the area 901, the driver's gaze may be aligned with the direction of driving. Since area 901 may be associated with the direction of the car, most of the time, the direction of the driver's gaze while driving should be toward area 901. Other areas or regions within field of view 900, such as area 902, may be defined in relation to physical objects within the vehicle. Area 902, for example, may be associated with a center rear view mirror 920, whereas area 903 may be associated with the right mirror, and area 904 may be associated with the left mirror.

In some embodiments, as the field of view 900 may address all relevant field of view of the driver that is relevant for driving, there may be areas within the field of view 900 (other than area 901) that, when the driver looks at these areas, it may be part of normal driving behavior and may indicate that the driver is attentive as long as the driver is looking at these areas for no more than a predefined period of time. For example, if the driver while driving is looking at area 903 associated with the right mirror for up to 800 milliseconds, the processor may determine that the driver is attentive to the driving and to the road ahead. On the other hand, if the driver is looking at area 903 associated with the right mirror for more than 3 seconds, the processor may determine that the driver is not attentive to the road ahead and may pose a risk for not only the driver, but also other vehicles on the road. Thus, the system may determine a state of attentiveness of the driver based on one or more states of attentiveness, or levels of attentiveness, of certain location(s), areas, or zones identified within the driver's field of view, and based on an amount of time that the driver's gaze or gaze dynamic is associated with those identified location(s). In some embodiments, the amount of time may correspond to a length of time on a continuous timeline or timescale that the gaze or gaze dynamic is associated with those locations, such that the system may synchronize a timescale of the gaze dynamic and the locations. For example, if a location associated with a rear view mirror is also associated with an event such as an automobile accident involving one or more surrounding vehicles, such that the driver looked at the mirror to watch the accident, the system may associate the location of the rear view mirror with a low state of attentiveness for the time that the accident occurred, and synchronize a timescale of the driver's gaze or gaze dynamic and the accident, to determine whether the driver's gaze was directed toward the rear view mirror and the event.

For each location (Xi, Yi) or area within field of view 900 and area 901, one or more criteria related to driving attentiveness may be defined. For example, the criteria may be the allowed period of time for the driver to look at that particular area or location. Other criteria may relate to the dynamic of looking at that location or area including the repetition of looking at the location or area, the variance of time each time the driver looks at that location or area, or the like. In another example, the dynamic can relate to how many times the driver is allowed to look at that area or location in a window of T seconds and still be considered that the driver is attentive to the road. In other embodiments, the processor may detect dynamics or patterns of looking at one or more areas and decide whether the patterns reflect an attentive driving and/or the driver's level of attentiveness to the road. For example, if the driver is looking too much to the sides of the road or to the side mirrors, the processor may determine that the driver is not attentive. If the driver is never looking to the sides of the road or to the side mirrors, the processor may also determine that the driver is not attentive.

In some embodiments, the processor may determine the level of driver attentiveness by tracking the movement of the driver's gaze while driving. For example, the processor may, at least in part, implement one or more machine learning algorithms to learn offline the dynamics of the driver's looking at locations or areas within the field of view 900, such as by using images or videos as input, tagging reflecting level of driver attentiveness associated with the input images or videos, etc.). In some embodiments, the processor may learn the dynamics or patterns online to study the dynamics or patterns of a particular driver. In other embodiments, the processor may incorporate both offline and online learning.

The dynamics of patterns may be associated with events that happen during driving. For example, an event can be changing a lane, stopping at a light, accelerating, braking, stopping, or any combination thereof. As illustrated in FIG. 9, an exemplary dynamic or pattern A1-A9 of gaze that is associated with changing a lane is illustrated. A1 represents the location of the driver's gaze when the driver looks ahead, A2 represents the location of the driver's gaze when the driver's gaze changes to the mirror, A3 represents the location of the driver's gaze when the driver is looking back ahead, A4 represents the location of the driver's gaze when the driver is looking to the back mirror, A5 represents the location of the driver's gaze when the driver is looking at the right mirror, A6 represents the location of the driver's gaze when the driver is looking at the car in front of the vehicle, A7 represents the location of the driver's gaze when the driver is again looking ahead, A8 represents the location of the driver's gaze when the driver is looking back at the desired lane, and A9 represents the location of the driver's gaze when the driver is looking back ahead. Together, A1-A9 represents the dynamic or pattern of the driver's change in gaze that is associated with the driver attempting to change lanes on the road. Other dynamics or patterns can be related to driving in different areas, such as an urban area, while other dynamics may relate to driving on highways, driving in different density of cars on the road, driving in a traffic jam, driving next to motorcycles, pedestrians, bikes, stopped cars, or the like. In some embodiments, dynamics or patterns may be associated with the speed of the car, the environmental conditions, and characteristics of the road, such as the width of the road, the number of lanes on the road, the light over the road, the curves on the road, the route of the road, etc.). Other dynamics may be associated with the weather, visibility conditions, environmental conditions, or the like. Additionally, or alternatively, dynamics may be associated with the movement or dynamic of movement of other vehicles on the road, the density of vehicles, the speed of other vehicles, the change of speed of other vehicles, the direction or change in direction of other vehicles, or the like.

In some embodiments, the processor may map regions that the driver is allowed to look at while driving, such as a region 930 associated with speed meter, but that may still indicate that the driver is not attentive to the road. There may also be other areas associated with one or more objects within the vehicle that may indicate that the driver's attentiveness is low when the driver is looking in those areas. For example, dynamics C1-C3 represent the driver's change in gaze as the driver looks toward a mobile phone 940 and back on the road. Dynamics C1-C3 may indicate a low level of driver's attentiveness even if the total amount of time the driver looked outside field of view 900 may be below the maximum criteria. In some embodiments, the processor may associate different patterns of looking at a mobile phone 940 and tag each pattern based on the corresponding level of attentiveness to the road.

The level of attentiveness to the road may be in relation to activities the driver is involved in while driving. For example, different activities may require different levels of driver's attention and, thus, the processor may not only relate the dynamics of the driver's gaze or motion features, but also relate the activities the driver is involved with and the dynamics of the driver's gaze in relation to one or more objects and to activities. By way of example, the dynamics of the driver's gaze may be similar between a driver operating a vehicle air-condition and a driver operating a mobile phone. However, since the activity of operating the air-condition is simple, there may not be much change in driver's attention needed to complete the task, while operating a mobile phone may require much more attention.

In some embodiments, the processor may determine the driver's attentiveness to the road based on tracking the dynamics of the driver's gaze. In some embodiments, the processor may determine the driver's attentiveness based on the tracked dynamics of the gaze during a current drive, or the tracked dynamics of the gaze during a current drive in comparison to those in previous drives or to those in similar weather or environmental conditions. In other embodiments, the dynamics of the driver's gaze may be in relation to previous sessions of the same drive, in relation to similar events such as changing lanes, braking, pedestrian walking on the side, etc., or the like. In other embodiments, the dynamics of the driver's gaze may be in relation to predefined allowed activities in the vehicle, such as controlling vehicle objects (e.g., air-conditioning or windows), controlling objects that require the driver to stop the car (e.g., adjusting the car seat), or the like.

The dynamics of the driver's gaze, or the gaze dynamic of the driver, may comprise motion vectors, locations at which the driver looks, speed of gaze change, features related to motion vectors, locations and/or objects at which the driver's gaze stops, the time at which the driver's gaze stops at different locations and/or objects, the sequence of motion vectors, or any tracked features associated with the gaze of the driver. In some embodiments, the processor may determine the driver's attentiveness based on tracking the dynamics of the drivers gaze and correlating the dynamics with activities of the driver, such as looking at the speed meter of the vehicle, operating a device of the vehicle, or interacting with other objects or passengers in the vehicle. Within and outside the field of view 900, the processor may tag or correlate one or more regions with the driver's level of attentiveness to the road. For example, the processor may tag a particular region within or outside the field of view 900 with "local degradation of driver attentiveness to the road."

Figure 10:
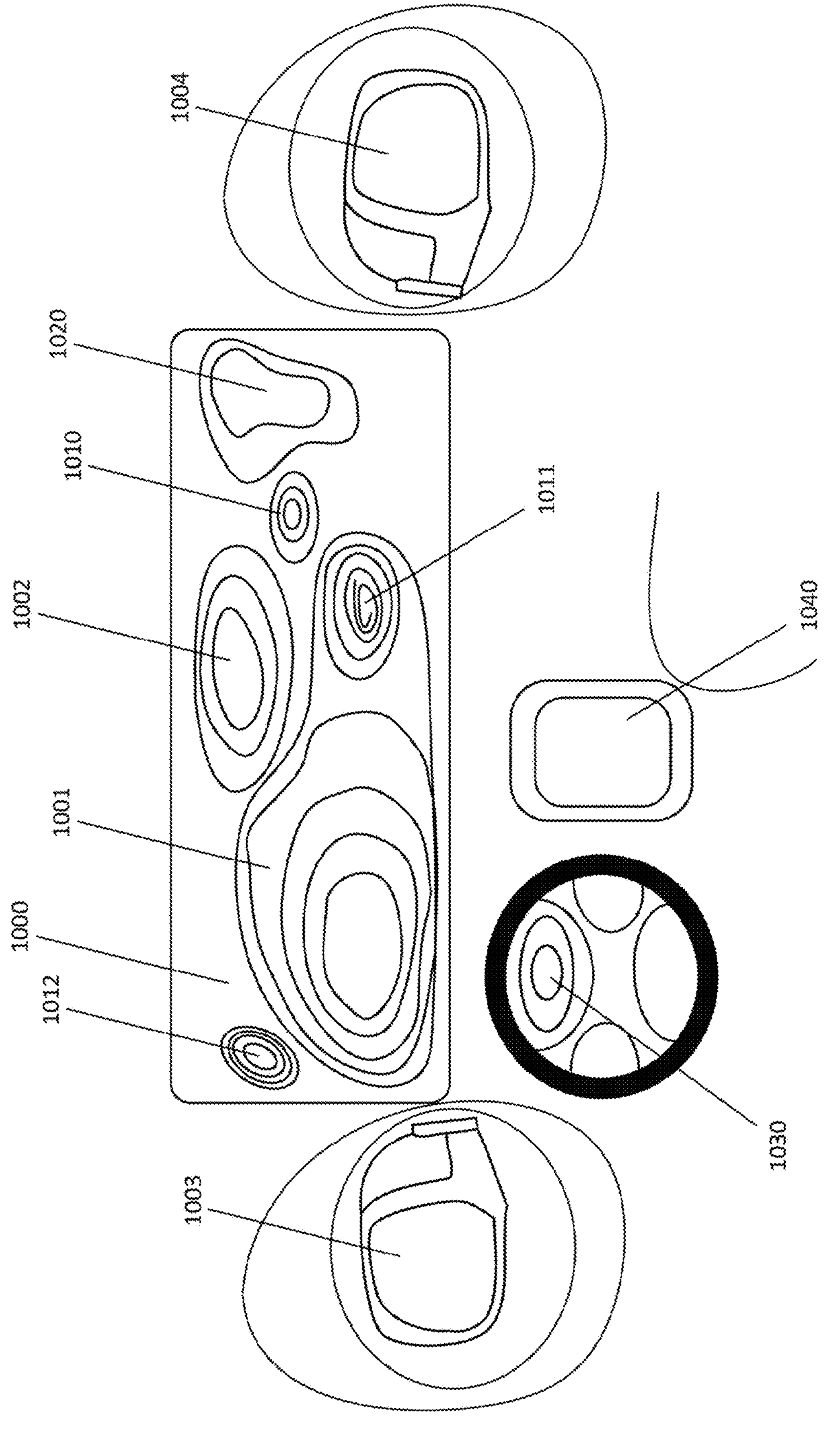
FIG. 10 illustrates a mapping of a location that is different from a field of view of a driver, consistent with the embodiments of the present disclosure.

Referring now to FIG. 10, an exemplary mapping of different locations, areas, or zones that may be associated with different levels of driver attentiveness is shown. In some embodiments, the areas, locations, or zones may be associated with a driver's field of view at a particular time. In some embodiments, the areas, locations, or zones may be associated with a driver's potential field of view, such as the full range of the driver's field of view if the driver were to pan, tilt, or rotate their head. In some embodiments, the mapping may be related to landscape mapping, in which a higher location may be associated to an area that presents higher driver attentiveness when looking at that location. Area 1001 represents a location associated with the vehicle direction, and areas 1003, 1004 are locations associated with the left and right side mirrors, respectively. Drivers should look at area 1001 for a long time, and drivers should only look at areas 1003, 1004 for a short time. In some embodiments, a dimension of time may be associated with the mapping. Accordingly, each location may reflect the time period for which a driver is allowed to look toward each location. The areas illustrated in FIG. 10 may be associated with different levels of attentiveness, and the associated levels of attentiveness may vary dynamically based on information such as the driving status of the vehicle, events occurring within and around the vehicle such as driving and weather events, and the physiological or psychological state of the driver or other individuals within the vehicle. Therefore, in some embodiments the associated levels of attentiveness may be fixed, and in some embodiments the levels may be periodically or continuously determined or assigned for particular moments and situations.

In some embodiments, the mapping may, at least in part, be implemented using one or more machine learning algorithms. In some embodiments, the processor may learn and map offline the dynamics of the driver's gaze at locations or areas within field of view 1000, such as by using images and/or videos as input and tagging corresponding levels of driver attentiveness with the input images and/or videos. In other embodiments, the processor may learn and map the dynamics or patterns of the driver's gaze online to study the dynamics or patterns of the particular driver and/or in relation to events that are taking place during driving.

For example, area 1012 represents a location that may be associated with another vehicle that is approaching the vehicle from another direction, such as the opposite lane, and thus, area 1012 may exist only in relation to that event and may change its features, such as size or location, in relation the location of the other vehicle and the driver's gaze direction toward the other vehicle. When the other vehicle passes the driver's vehicle, area 1012 may disappear. Additionally, area 1011 may represent a location of a vehicle that brakes. When the driver notices the event, the driver may look toward area 1011. Therefore, noticing the event (e.g., driver looking at area 1011) may indicate the driver's attentiveness to the road, while not noticing the event (e.g., driver not looking at area 1011) may indicate the driver's lack of attentiveness. Area 1010 may represent a location of another vehicle that may be driving in the same direction as the driver's vehicle but changing lanes. As such, the probability of the driver looking at area 1010 should be higher in comparison to an event where another vehicle is not changing lanes. Area 1020 may represent a location of a pedestrian walking on a sidewalk or intending to cross the road. In other embodiments, there may be areas or locations that represent a negative attentiveness (or lack of attentiveness), such as area 140 associated with the vehicle multimedia system. Although the driver looking at area 140 associated with the vehicle multimedia system is an activity, such activity may reflect a negative attentiveness of the driver to the road. In yet another embodiment, the learning and mapping offline or line may be based on input received from one or more other systems, such as ADAS, radars, lidars, cameras, or the like. In other embodiments, the processor may incorporate both offline and online learning and mapping.

In some embodiments, the processor may use a predefined mapping between the gaze direction of the driver and a level of attentiveness. The processor may detect the current driver's gaze direction and correlate the gaze direction with a predefined map. Then, the processor may also modify a set of values associated with the driver's level of attentiveness based on the correlation between the gaze direction and the predefined map. The processor may also initiate an action based on the set of values. In some embodiments, the map may be a 2-dimensional (2D) map or a 3-dimensional (3D) map. The map may contain areas that are defined as areas indicating driver attentiveness and areas indicating driver non-attentiveness. Areas that are indicated as driver attentiveness may be areas that, in the event the driver is looking toward these areas, the processor determines that the driver is attentive to driving. For example, areas that are indicated as driver attentiveness may be defined by a cone, where the center is in front of the driver where the cone's projection on the map creates a circle. Alternatively, the area may be an ellipse. Additionally, or alternatively, areas indicating driving attentiveness may be areas associated with the location of an object in the vehicle, such as mirrors, and the projection of the physical location of the object on the field of view of the driver. Areas that are indicated as driver non-attentiveness may be areas that, in the event the driver is looking toward these areas, the processor determines that the driver is not attentive to driving.

In some embodiments, each location on the map may comprise a set of values associated with the driver's level of attentiveness, or the driver's driving behavior (such as driver looking forward in the direction of motion of the vehicle, driver looking to the right/left/back mirror, driver looking at vehicles in other lanes, driver looking at pedestrians in the vicinity of the vehicle, driver looking at traffic signs or traffic lights, etc.). The map may also comprise one or more locations that indicate that, when the driver is looking toward these locations for a predefined period of time, the processor determines that the driver is attentive to the road.

However, when the driver is looking toward these locations for a period of time that exceeds the predefined period of time, the processor may determine that the driver is not attentive to the road and will not be able to respond in time in an event of an emergency. These locations on the map may comprise, for example, locations associated with the back mirror, right side mirror, and/or left side mirror.

In other embodiments, the processor may relate to historical data of the driver, such as history of driver gaze direction or history of driver head pose, to determine driver's level of attentiveness. The map may be modified for different driving actions. For example, when the driver turns the vehicle to the right, the driver's point of focus should be adjusted to the right, and when the vehicle is in front of a crosswalk, the driver's point of focus should be along the crosswalk and to the side of the road to look for a pedestrian that may intend to cross the road. In addition, when the vehicle is stopped, the driver's point of focus should be changed to the traffic light, or on a police officer's gesture.

In some embodiments, areas in the driver's field of view associated with predefined levels of driver attentiveness may be modified based on current driving activity and needs. For example, the processor may receive and process inputs from one or more systems and modify the map or areas in the map based on the inputs. The input may comprise, for example, information associated with the state or condition of the vehicle, driving actions with other vehicles or pedestrians outside the driver's vehicle, passengers exiting the vehicles, and/or information related to passenger activities in the vehicle. As another example of "needs" consistent with the present disclosure, as a driver approaches a crosswalk in a vehicle, the driver may need to scan both sides to see if a pedestrian is standing, waiting, or trying to cross the crosswalk. Thus, current needs associated with driving activities may include actions or steps the driver is expected to take to be a safe and considerate driver. In some embodiments, the driver's level of attentiveness may include driver distraction due to an event or activity that is unrelated to driving. In some embodiments, the processor may report driver attentiveness only when the processor detects that the driver is distracted. As used herein, "driver distraction" may comprise any event in which the driver may be at least partly occupied mentally or in which the driver's activity or inactivity is not related directly to driving (such as reaching for an item in the car, operating a device, operating a digital device, operating a mobile phone, opening a car window, fixing a mirror orientation, fixing the position of the vehicle, conversing with someone in the vehicle, addressing other passenger(s), drinking, eating, changing clothes, etc.). Accordingly, the processor may calculate the level of attentiveness of the driver over time under the assumption that the driver's attentiveness would be affected by various parameters, including gaze, head pose, area of interest, or the like.

In order for the processor to determine the level of attentiveness of the driver continuously, a discrete decay function may be used to describe the full range from fully attentive to fully distracted (not attentive at all). For each processed frame, according to one or more parameters, the processor may calculate the number of steps along the decay function. The sign of the number may define the direction (e.g., negative means more attentive, and positive means less attentive). The starting point in each frame may be the point that was calculated in the prior frame such that the level is preserved and alternation between extreme states is prevented. Since driving is dynamic and the driver is usually required to turn his head and scan the road, rather than looking straight ahead at the driving direction only, the algorithm may, on one hand, be loose in order to allow the driver to drive properly and avoid false-negative alerts but, on the other hand, tight enough to detect distractions.

In some embodiments, systems and methods may extract features related to driver's attentiveness, capability to drive, response time to take control over the car, actions (such as eating, drinking, fixing glasses, touching his face, etc.), emotions, behaviors, interactions (such as interactions with other passengers, vehicle devices, digital devices, other objects), or the like. In some embodiments, a sensor, such as an image sensor (e.g., a camera), may be located on a steering wheel column in the vehicle. Based on the position of the steering wheel, the processor may execute different detection modules or algorithms. For example, to avoid false detection, when the driver turns the steering wheel and part of the field of view of the sensor is block by the steering wheel, the processor may execute detection modules to extract features related to the driver's state.

In other embodiments, different modules or algorithms for detection may be executed according to the state of the vehicle. For example, the processor may execute different algorithms or detection modules when the vehicle is in parking mode or in driving model. By way of example, the processor may run a calibration algorithm when the vehicle is in parking mode and run a detection module to detect driver attentiveness when the vehicle is in driving mode. In parking mode, the processor may also not report the driver state and may begin reporting the driver state when the vehicle changes from parking mode to driving mode.

In some embodiments, the processor may adjust one or more parameters of the machine learning algorithm based on the training data or based on feedback data indicating an accuracy of the outcomes of the techniques disclosed herein. For example, the processor may modify one or more parameters of the machine learning algorithm, including hyperparameters, such as a number of branches used in a random forest system in order to achieve an acceptable outcome based on inputs to the machine learning algorithm. In other embodiments, the processor may adjust a confidence level or number of iterations of the machine learning output based on a reaction time for an associated driving event. For example, when the processor determines that the vehicle is experiencing an emergency, or an emergency is imminent, the processor may decrease the required machine learning confidence level or decrease a number of layers/iterations of the machine learning algorithm to achieve an output in a shorter length of time. In other embodiments, the processor may dynamically modify the types of data processed and/or inputted into the machine learning algorithm depending on the type of driving event, based on setting information associated with a particular user or driving event, or based on other indications of accuracy, confidence levels, or reliability associated with particular data types and particular users.

In some embodiments, the processor may use information related to the angle of the steering wheel in order to decide when to relate and when not to relate to inputs from the sensor, such as a camera. In other embodiments, the processor may use the angle of the steering wheel or other indications related to the direction of the steering wheel when determining whether the driver is attentive to the road and/or whether the driver is looking toward the right direction. For example, if the driver turns the vehicle to the right, it is likely that the driver will shift his gaze direction to the right also. In some embodiments, when the driver turns the steering wheel, the processor may widen the field of view to include the driver's gaze to the right and to the left to avoid false detection in events where the driver may need to look to both sides (such as when the driver needs to look to the right ad to the left to see if any vehicle is approaching at a stop sign).

In some embodiments, the processor may use machine learning techniques to learn the driver's "common" attentive direction of gaze in various situations while driving normally. In order to map the driver's attentive driving, the processor may implement general statistical techniques to the driver's whole driving session on various different roads, such as driving sessions on highways, local roads, in the city, at different speeds, or to the driver's driving actions, such as making emergency stops, changing lanes, overtaking other vehicles, or the like. The disclosed embodiments are not limited to highways and local roads, and may be used to monitor individuals while traveling on a roadway, as well as while moving in a vehicle through areas such as parking lots, parking garages, drive-thru roads adjacent a building, loading dock areas, airport taxiways, airport runways, tunnels, bridges, and other areas where vehicles may operate. In real time, the processor may also determine a "distance" between the driver's attentiveness and gaze direction in the current driving session and a proper driving level of driving attentiveness and gaze direction that one or more machine learning algorithms may have learned.

In other embodiments, the processor may use one or more indications from the car (such as a direction of the steering wheel) or from other systems such as ADAS system or from the cloud in order to decide which learned attentiveness sessions to use as the attentiveness distribution when comparing the attentiveness session to the driver's current attentiveness level and gaze direction. For example, if the car is changing lanes, the processor may choose attentiveness and gaze direction modules learned during situations of changing lanes.

In some embodiments, the processor may use at least one of a vehicle speed, acceleration, angle of velocity, angular acceleration, state of gear (such as parking, reverse, neutral, or drive), angle of steering wheel, angle of wheels, or the like to determine when inputs from a sensor are not relevant, which modules to execute and/or report to one or more other modules, which detection modules are relevant, which parameters related to the detection and determination of driver attentiveness to modify, and which indications to the location of the attention of the driver to determine or generate. For example, if there is a determined zone that is located in front of the driver while the vehicle is moving forward, the determined zone may shift to the right if the driver turns to the right.

The processor may use information related to the driving action performed (or needed to be performed) to determine whether the driver is attentive to the road. Driving actions may require a complex shift of the driver's gaze to different locations. For example, if the driver is turning to the right without a stop sign, it may require the driver to not only look to the right but also look to the left to see if any vehicles are approaching. Alternatively, if the driver is stopping, the driver may be required to look in the back mirror before and while hitting the brakes.

In some embodiments, the processor may use information from other systems such as the ADAS to determine the driving situation. In other embodiments, the processor may use information from the ADAS to determine whether it would be mandatory for the driver to shift his gaze back to the driving direction or not. The processor may use information from the ADAS, or send information to the ADAS related to the time it may require the driver to shift his gaze back to the right or from one location to another location. The processor may also determine if the driver needs to take control over the car to address a dangerous situation or an event of an emergency. Thus, it may be critical to know the response time of the driver to take back control over the vehicle. Moreover, the processor may adjust or modify the size of the zone, such as a field of view. For example, in high speed, the zone may be set to be smaller or narrower than when the vehicle is traveling at a low speed. When the car is stopped, the zone may be bigger or wider than when the vehicle is traveling at a low speed.

According to some embodiments of the present disclosure, systems and methods may be used for predicting an amount of time required for the driver to shift her or his gaze between different directions, each of the directions being associated with different events taking place on the road simultaneously. In some embodiments, the amount of time may be indicative of a reaction time of the driver to a sudden event while the driver's gaze is aimed in a different direction. As an example, the system may predict an amount of time that the driver would take to shift a gaze from a first direction while viewing a pedestrian crossing the street from the right side, to a second direction toward a car that has begun crossing the street from the left side. In the context of this example, the system may "predict" the amount of time by determining or estimating an amount of time based on a collection of current and historical information, including information associated with the particular driver, so that the system determines an amount accurate of time before the shift in gaze direction occurs. In some embodiments, the system may comprise one or more processors configured to predict an amount or length time it will take for the driver to shift his gaze from different locations, or from different locations relevant to the current driving requirements.

The predicted amount of time may be used as a factor in determining the driver's level of attentiveness, and may also be determined using the driver's detected level of attentiveness. In some embodiments, a predicted amount of time may be used as training data or input data for a machine learning system used to determine the driver's level of attentiveness in later driving sessions. In some embodiments, the driver's level of attentiveness may be used as training data or input data for a machine learning system used to determine the driver's predicted amount of time to shift gaze direction.

In some embodiments, the one or more processors may predict the amount of time based on at least one of the current driver gaze direction (such as gaze direction 500 shown in FIG. 8, or actual gaze direction 1300 shown in FIG. 11), one or more different locations of events happening in or around the vehicle, a body position of the driver, a head position of the driver, a seat location of the driver, a determined fatigue level of the driver, a blood alcohol level the driver determined using information received from a sensor device or an electronic record, historical information including recordings from previous moments in the current driving session, information associated with activity taking place on the road, a determined overall level of attentiveness and focus of the driver to the driving activity, historical information including recordings from previous driving session, historical information including information recorded from previous driving sessions similar to the current driving session, or any combination thereof. In some embodiments, these types of information may be used to train, refine, or implement one or more predictive algorithms or machine learning techniques to predict an amount of time to change gaze direction.

As an example of the above-disclosed techniques, at least one processor may be configured to detect a gaze direction of a driver while driving a vehicle, by receiving image information from an image sensor. The processor may detect driver 1101 in the received image information. In some embodiments, driver 1101 may be detected using one or more techniques disclosed herein, such as by recognizing a contour of an individual located in the driver seat position, by recognizing one or more visual features of the driver, or by using one or more machine learning algorithms to detect a driver within the vehicle interior. The processor may also detect a gaze direction of driver 1101 in the image information, consistent with techniques disclosed herein. The detected gaze direction may be associated with driver 1101 looking in a first direction, such as driver 1101 looking straight ahead toward the road or path that the vehicle is traveling, looking toward the side at an object or distraction, or looking at a location within the vehicle. The processor may predict amount of time it will take for the driver to shift the gaze direction toward a second direction using information associated with the detected gaze direction of driver. In some embodiments, the at least one processor may generate a message or a command based on the predicted amount of time. To make the prediction, the at least one processor may use information associated with the first direction and the second direction, or information associated with at least one of a posture of the driver, a location of the driver in the car, a seat location of the driver, or a seat position of the driver.

In some embodiments, the at least one processor may be further configured to determine a level of attentiveness of the driver while driving on a road, and predict the amount of time it will take for the driver to shift the gaze direction toward the second direction using the determined level of attentiveness of the driver to the road. The processor may determine the level of attentiveness using techniques disclosed herein, and further based on a detection of at least one of an activity of the driver while driving, a behavior of the driver, an action of the driver, a gesture performed by the driver, an activity taking place in the vehicle by one or more passengers, an interaction of the driver with a mobile phone, an interaction of the driver with a digital device, an interaction of the driver with a system in the vehicle, an action of the driver looking for an object in the vehicle, or the driver looking at a passenger in the vehicle, or an activity of a person outside the vehicle.

In some embodiments, the at least one processor may predict the amount of time needed for the driver to shift gaze from the first direction toward the second direction using information associated with a physiological parameter associated with the driver including at least one of a fatigue level, a heart rate, a blood alcohol level, or a parameter associated with a sickness of the driver. The processor may additionally or alternatively use information associated with a psychological parameter associated with the driver, including at least one of a fatigue level, an emotional state, a level of alertness, or a level of attentiveness of the driver.

In some embodiments, the at least one processor may predict the amount of time using information associated with a driving condition such as an amount of traffic proximate the vehicle. The at least one processor may be configured to determine the amount of traffic using information from one or more sensors in the vehicle or from received traffic information. In some embodiments, the processor may determine the amount of traffic based on information received from an Advanced Driver Assistance System.

In some embodiments, the processor may predict the amount of time using historical information. For example, the processor may use information associated with one or more recordings of one or more previous driving sessions. The processor may additionally or alternatively use one or more recordings of previous driving sessions involving a road condition or a vehicle speed similar to that of the current driving session. For example, if the driver is currently driving on a winding road at a high speed, the processor may retrieve or receive historical information associated with prior driving sessions on similarly-winding roads at similar speeds. Thus, the processor may predict an amount of time needed for the driver to change gaze direction based on historical data associated with similar driving conditions and/or road conditions. As a further examine, road conditions may include those discussed in this disclosure and including a type of road, a width of the road, a number of lanes of the road, a lighting condition of the road, a lighting condition of one or more other vehicles on the road, a curvature of the road, a weather condition, or a visibility level where the vehicle is currently traveling.

Figure 11:
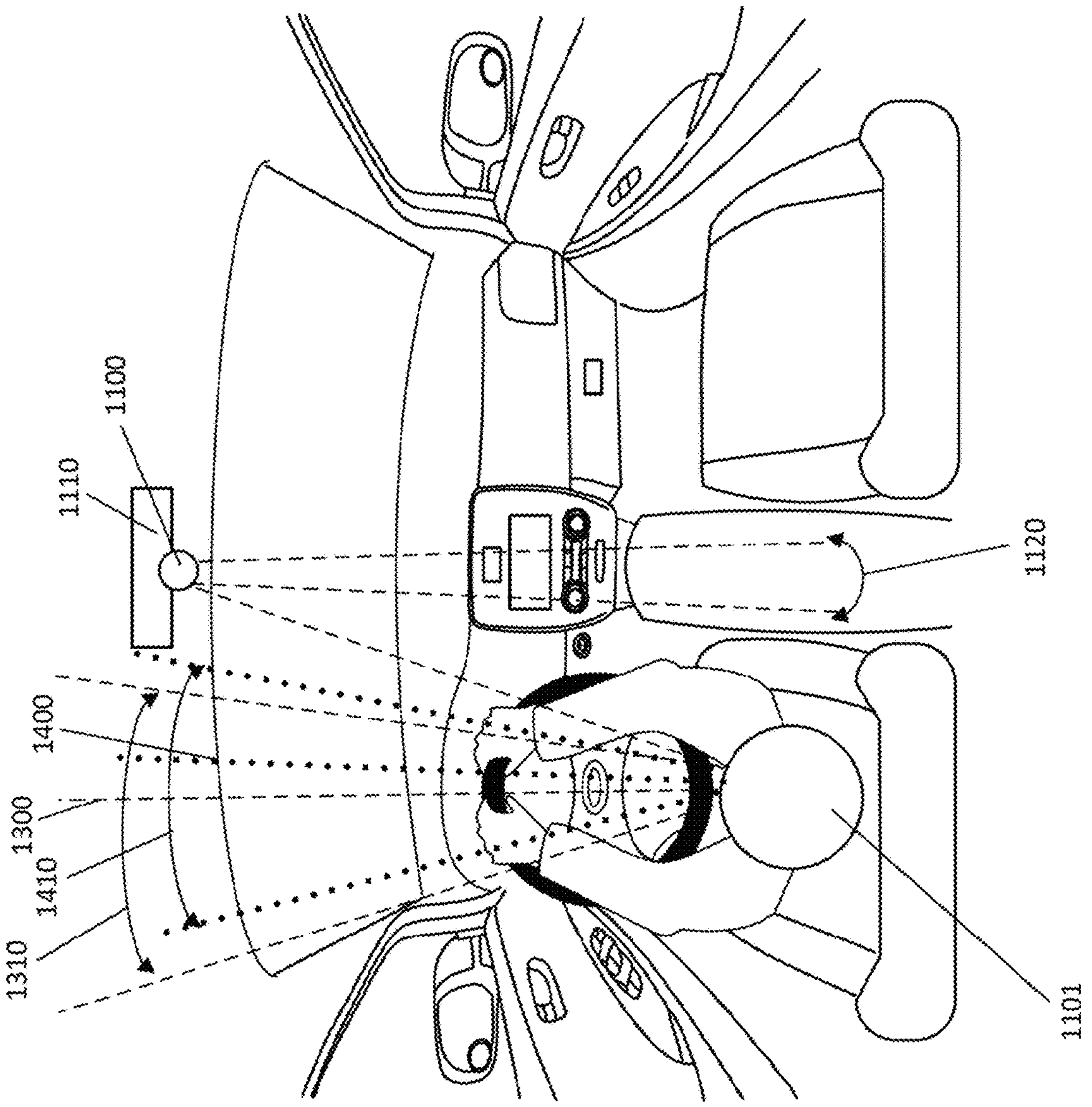
FIG. 11 illustrates an exemplary environment associated with camera calibration, consistent with the embodiments of the present disclosure.

Referring to FIG. 11, in some embodiments, one or more processors of the system may be configured to detect that a camera used for one or more techniques disclosed herein is not calibrated. Although a system having a camera that is only slightly out of calibration may appear to be working properly but may actually be incorrect in determining whether the driver is attentive to driving. For example, a camera that is angled slightly away from a predetermined calibration angle may provide the system with sufficient information to detect the driver's fatigue level or track the driver's gaze, but the image information from the off-angle camera may not allow the system to properly determine whether the driver is looking at the road or elsewhere, or determine whether the driver is attentive to the road or inattentive. With insufficient hardware calibration, the system may not be able to make such determinations, or may return false-positive or false-negative results. In some embodiments, calibration may involve one or more physical positioning attributes or one or more settings associated with the camera, such as an orientation of the camera, an angle of the camera relative to an environment inside a vehicle, or a location and perspective of a field of view of the camera. Although a camera is described herein, disclosed embodiments may apply to types of environmental sensors such as infrared cameras, thermal cameras, visible light cameras, sonar sensors, and other types of sensors capable of providing an image of objects in the vehicle interior.

FIG. 11 illustrates an exemplary system with a camera 1110 on a mount 1100 that is out of calibration. In the example shown, a driver 1101 is operating a vehicle, and is attentive to a range of space sin the driver's field of view shown as the driver's actual cone of attention 1310. Within cone 1310, the driver's actual gaze 1300 is represented with a dashed line projected from the driver's face.

In the example illustrated in FIG. 11, a camera 1100 may be out of calibration, and there may be a difference 1120 in a direction of the camera 1110 due to a physical shift of mount 1100. For example, camera 1100 may face either further toward the driver, further away from the driver, further upward, further downward relative to the driver, or a combination thereof, resulting in a camera angle or perspective that is different than what the one or more processors expect in the captured image information. As a result, the captured image information may incorrectly provide the one or more processors with an incorrect cone of attention 1410, and an incorrect gaze 1440, represented in dotted lines. Due to the different angle of the captured image information, the processor may not determine the actual gaze direction 1300 of driver 1101 and the actual cone 1310 indicating the driver's attentiveness to the road. Instead, a shift in the mount 1100 may result in the processor determining an incorrect cone 1410 and incorrect gaze 1400, and fail to properly or accurately indicate the driver's attentiveness to the road. In some embodiments, the one or more processors may detect that the camera 1110 is out of calibration and calibrate the gaze of the driver in relation to the road accordingly. In some embodiments, the one or more processors may transmit a message or command, such as an alert message or a command for another system to issue an alert message, indicating a need to calibrate camera 1110.

As an example of the embodiments described above, system and method, and computer readable medium storing instructions to perform one or more operations for improving detection of a gaze direction of a driver (such as driver 1101) while driving a vehicle. At least one processor may be configured to receive image information from an image sensor. In some embodiments, the image sensor may be part of a device connected to the vehicle such as camera 1100, a rearview mirror, an instrument gauge, an entertainment system, a steering wheel, or any other device positioned so that an image sensor in the device can provide image information for the vehicle interior. In some embodiments, the processor may detect the driver of the vehicle in the image information, consistent with techniques disclosed herein. In some embodiments, the processor may determine that the image sensor is out of calibration detecting the driver in the image information.

The processor may determine that the image sensor is out of calibration, using information associated with the received image information. In some embodiments, the image sensor may be determined to be out of calibration due to a change in orientation of the device in relation to the vehicle. For example, if the image sensor is mounted in a rearview mirror and the mirror is knocked out of its normal orientation, the image sensor may be forced out of calibration because the orientation of the device having the image sensor has changed in relation to the vehicle. As a result, the field of view, perspective, or camera angle of the image sensor may shift, as represented by 1120 in FIG. 11.

After or concurrently while detecting the driver, the processor may detect the gaze direction of the driver of the vehicle in the received image information, consistent with techniques disclosed herein. In some embodiments, the processor may determine an amount or degree that the image sensor orientation has changed, by determining an orientation of the image sensor in relation to the vehicle, and may calibrate the detected gaze direction of the driver in relation to the road using the determined orientation.

In some embodiments, the processor may detect one or more cues in the image information to determine that the image sensor is not calibrated. As a non-limiting example, cues in the image information include a physical structure of the vehicle such as an appearance of the fixed pillars between windows in the vehicle, and the processor may determine that the image sensor is out of calibration if the position or orientation of the pillars in the image information has changed relative to image information associated with a calibrated status. In some embodiments, the processor may utilize other visual cues in the image information such as an object in the vehicle, a window of the vehicle, a seat of the vehicle, or any other object associated with the vehicle. Objects and parts of the vehicle that remain in relatively fixed locations and orientations may allow the processor to determine the calibration status more quickly, accurately, and reliably, than visual cues for objects that are freely movable within the vehicle. The processor may detect and analyze visual cues in accordance with image processing techniques disclosed herein, such as contour recognition, feature recognition and tracking, pattern matching, and machine learning algorithms trained using image information of the vehicle interior and/or image information of other vehicle interiors. In some embodiments, the processor may determine that the image sensor is out of calibration using a machine learning algorithm trained using information associated with the vehicle or other vehicles, and based on the received image information or one or more visual cues in the image information, consistent with techniques disclosed herein.

In some embodiments, one or more of the cues may be associated with the driver. In such embodiments, the cues may relate to one or more visual facial features of the driver, such as a location and orientation of the driver's eyes, nose, ears, hair, chin, jaw line or other contour, or any other visual features that can be used to observe a change in the image sensor calibration. In some embodiments, cues associated with the driver may include a contour of the driver's body or body part, or features of one or more body parts of the driver. In some embodiments, the processor may detect an orientation of the driver, such as an orientation of the driver relative to the image sensor, and at least one of the cues may be associated with a detected orientation of the driver.

In some embodiments, the processor may generate a message or a command based on the determination that the image sensor is out of calibration. In some embodiments, the message or command may also indicate that the detected gaze direction is not correct. The message or command may be sent to another device, processor, or system within the vehicle. In some embodiments, a message may be sent to an operator or other system indicating a requirement to calibrate the image sensor. For example, the processor may send a message to a vehicle service center system or to an individual at a vehicle service center indicating that the image sensor needs to be calibrated. In some embodiments, a message may be provided to an operator of the vehicle such as the driver or other individuals operating or servicing the vehicle. In some embodiments, the message may be sent to an operator or a telematic system, indicating errors in the driver's gaze direction due to the image sensor being out of calibration or due to a change in an orientation of the device relative to the vehicle. In some embodiments, after the image sensor has been recalibrated, the processor may detect that the image-sensor being in a calibrated state, and send a confirmation message indicating that the detected gaze direction of the driver is accurate once again. Such a confirmation message may be sent to any of the recipients discussed above, such as an operator or telematic system.

Figure 19:
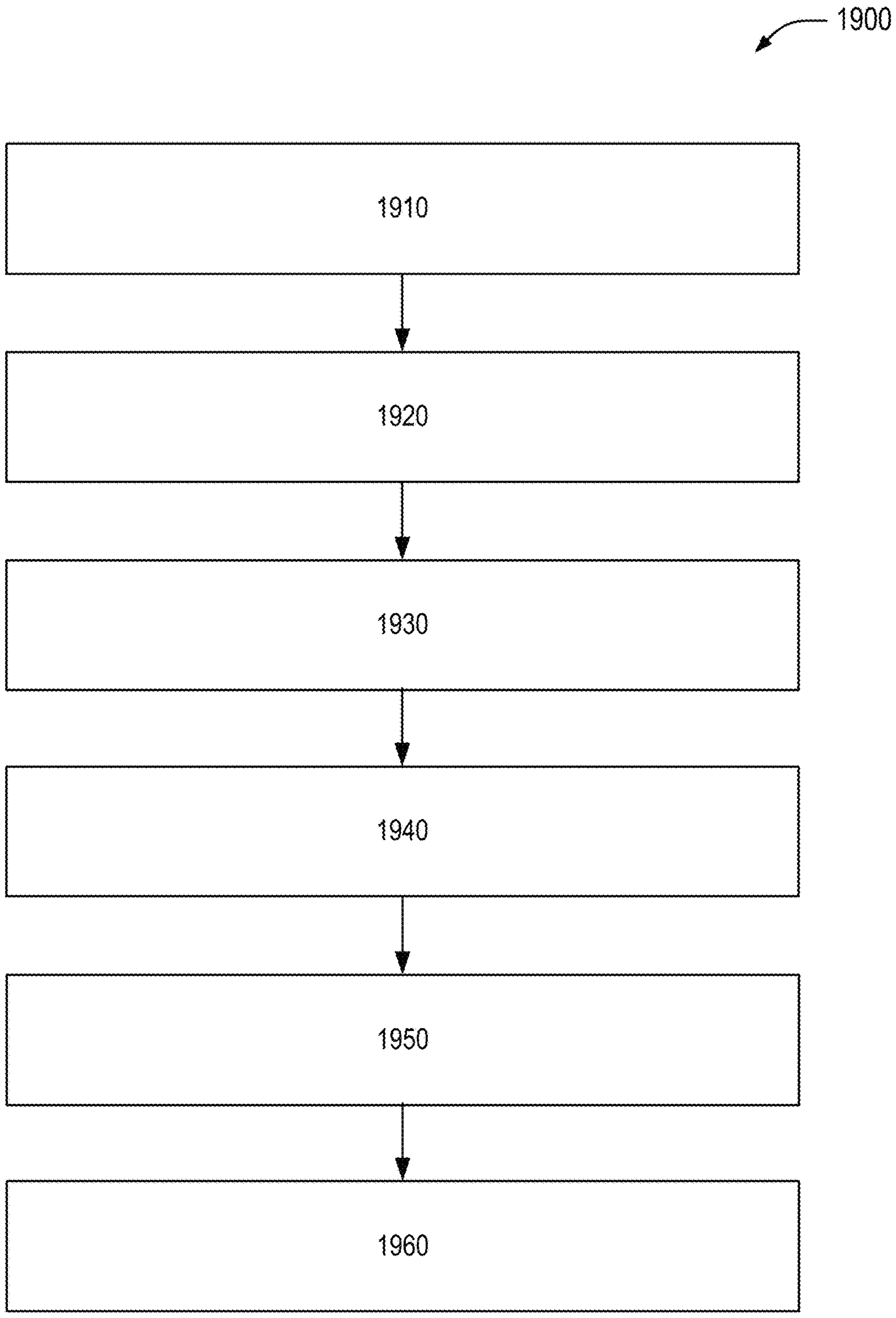
FIG. 19 is a flow chart illustrating aspects of method(s) for sensor-based in-vehicle dynamic driver gaze tracking, in accordance with example embodiment(s).

FIG. 19 is a flow chart illustrating a method 1900, according to an example embodiment, as described herein. The method is performed by processing logic that can comprise hardware (circuitry, dedicated logic, etc.), software (such as is run on a computing device such as those described herein), or a combination of both. In one implementation, the method 1900 (and the other methods described herein) is/are performed by one or more elements depicted and/or described in relation to FIG. 1 (including but not limited to system 100 and/or processor 12, as described herein). In some other implementations, the one or more blocks of FIG. 19 can be performed by another machine or machines. Additionally, in certain implementations, one or more of the described operations can be performed via a neural network and/or utilizing one or more machine learning techniques.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 1910, one or more first inputs can be received. In certain implementations, such inputs can include information corresponding to one or more dimensions of the vehicle. (e.g., windshield size, etc., as described herein). Moreover, in certain implementations such inputs can include information corresponding to one or more parameters associated with one or more components of the vehicle (e.g., mirror settings, adjustable seat settings, steering wheel position settings, etc., as described herein). Additionally, in certain implementations such inputs can include information corresponding to one or more events associated with the vehicle (e.g., if a turn signal is activated, etc., as described herein).

At operation 1920, the one or more first inputs (such as those received at 1910) can be processed. In doing so one or more first directional adjustments can be computed (e.g., via a neural network). In certain implementations, such directional adjustments can include or otherwise reflect a region that corresponds to an area of an image that relates to a road on which the vehicle is traveling, such as is described herein.

At operation 1930, one or more second inputs can be received. In certain implementations, such input(s) can originate from an image sensor (e.g., a sensor positioned within a vehicle, as described herein). Additionally, in certain implementations such input(s) can include a sequence of gaze instances, such as is described herein.

At operation 1940, the one or more second inputs (such as those received at 1930) can be processed. In doing so, a gaze direction of at least one eye of a driver of the vehicle can be determined (e.g., via a neural network), such as is described herein.

At operation 1950, one or more aspects of distractedness of the driver can be determined, such as is described herein (e.g., via a neural network). In certain implementations, such aspects of distractedness of the driver can be determined based on (a) the determined gaze direction of the at least one eye of the driver (e.g., as computed at 1940) and/or (b) the computed first directional adjustment (such as computed at 1920).

At operation 1960, one or more operations can be initiated. In certain implementations, such operations can be initiated based on the determined one or more aspects of distractedness (e.g., as computed at 1950). For example, in certain implementations a message or a command can be generated, such as is described herein. By way of further example, one or more events can be filtered, as described herein.

By way of further illustration, in certain implementations, the described technologies can be further configured for road center configuration (e.g., computing directional adjustments and initiating operation(s) based on such adjustments, as described herein). For example, the described technologies can be configured to detect a driver's gazes/glances (e.g., on/off road glances), e.g., as described herein. Based on such detection(s), the described technologies can calculate and/or otherwise compute various aspects of the driver's attentiveness, as also described herein. Based on such computation(s), the described technologies can further adjust, configure, and/or otherwise account the range of gazing in which the driver can be considered/determined to be looking on or off of the road.

By way of further illustration, it can be appreciated that, in order to drive safely, a driver is expected to maintain his/her gaze towards the road at substantially the entire time he/she is driving. However, various factors may affect whether certain behavior (e.g., the driver directing his/her eyes in a specific direction) reflects normal/safe driving (e.g., looking towards the road) or unsafe driving (e.g., looking away from the road). For example, the size/dimensions of a vehicle's windshield can be accounted for, such that a user driving a vehicle with a certain windshield dimension who gazes in a certain direction may not be distracted, while another user driving a vehicle with another size windshield who gazes in the same direction may be distracted. Accordingly, as described herein, the described technologies can further account for such circumstances (e.g., using the described directional adjustments) in determining whether a driver is (or is not) likely to be distracted, as described herein.

In certain implementations, the described technologies can enable configuration of the positive and/or negative yaw and pitch angels relative to the road center vector (e.g., a corresponding directional adjustment can be generated, as described herein). The defined +yaw/−yaw/+pitch/−pitch values can represent a "cone shape" that can be 'drawn around' (and/or otherwise surround the center of a road. Doing so enables accurate and adjustable distraction detection, while minimizing/avoiding false distraction alerts.

Examples of differentiative attributes in different vehicle types that can be accounted for in generating the referenced directional adjustments include but are not limited to: windshield width, windshield height, which mirrors are available (for example, sometimes there is no rearview mirror), mirror size, vehicle height from the road (e.g., for high/low vehicles), driver height (e.g., based on seat adjustment).

Moreover, in certain implementations the described technologies can be configured to compute and/or otherwise determine a driver engagement level, score, etc. (e.g., by assessing the level of distraction of the driver in view of the generated directional adjustments, as described herein). In certain implementations, such a level of distraction can be computed based on elements including: distraction score (which can be computed based on/in relation to the level of distractedness of the driver); distraction threshold (e.g., a defined distraction score above which the driver is considered distracted and below which the driver is considered not distracted); distraction factor (which can be a rate of increase in distraction score, e.g., from 0 to 100 in number of frames, such as for a 30 FPS camera, which can be associated with a specific AOI (attention zone)); attention factor (e.g., the rate of decrease in distraction score from 100 to 0 in number of frames, such as for a 30 FPS camera, which is associated with the road center).

In certain implementations, the referenced distraction score can be computed (e.g., for each frame) based on the AOI the driver is determined to be looking at during that frame and in the preceding frames, and the distraction factor which is assigned to the specific AOI. As noted, the referenced distraction factor can dictate the rate of increase of the driver's distraction score.

In a scenario in which the referenced computed distraction score crosses the distraction threshold, the driver's determined state can change (e.g., to "distracted"), while the change of driver state from "not-distracted" to "distracted" can create/initiate a distraction event, as described herein.

Figure 14:
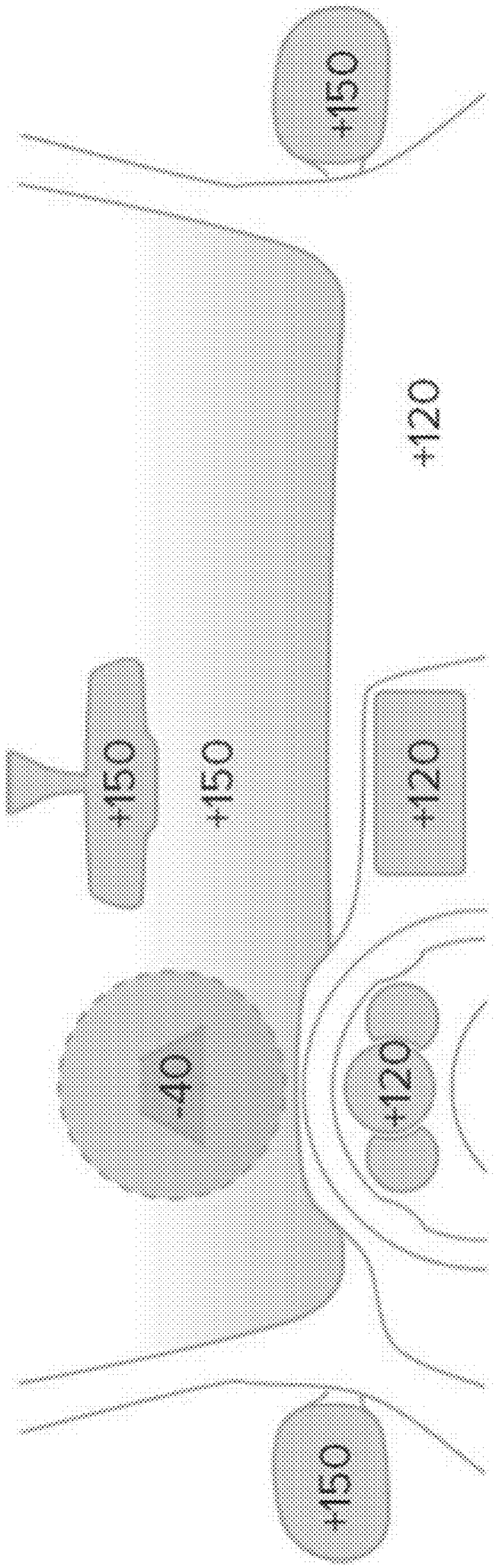
FIG. 14 illustrates example scenario(s) described herein, according to example embodiment(s).

Further aspects of the described technologies are depicted in FIG. 14 which depicts an example configuration (e.g., a default configuration) of AOIs and distraction factors, such as is described herein.

Figure 15:
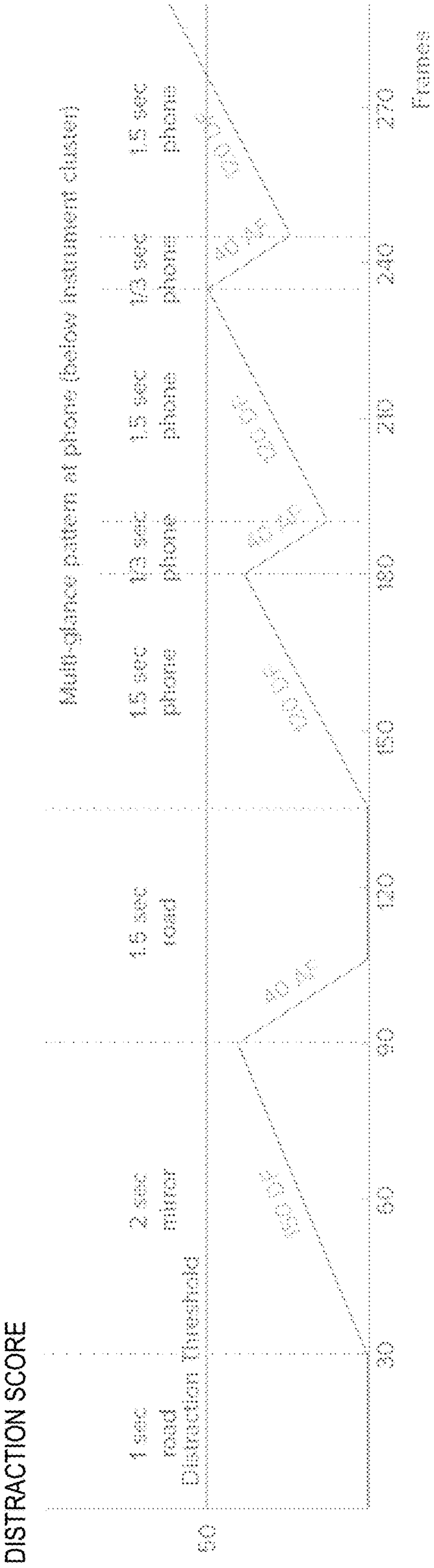
FIG. 15 illustrates example scenario(s) described herein, according to example embodiment(s).

FIG. 15 is a diagram depicting an example for a sequence in which the driver starts by looking at the road, then shifts their gaze to the rearview mirror, back to the road, and then alternates between the road and a phone held below the infotainment console.

Figure 16:
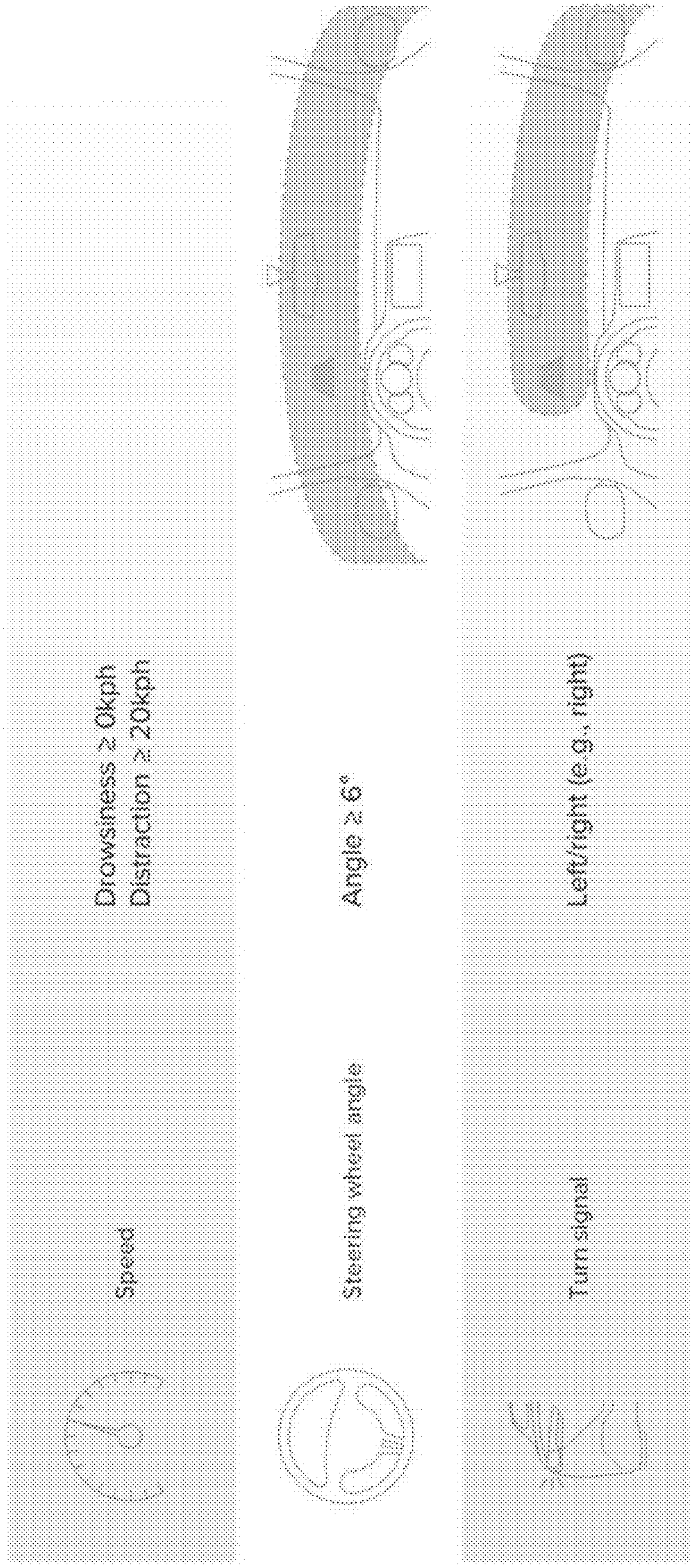
FIG. 16 illustrates example scenario(s) described herein, according to example embodiment(s).

The described technologies can also be further configured with respect to vehicle data filtering. By way of illustration, as depicted in FIG. 16, example of vehicle data that can be used for filtering include: speed (can be used to filter events, can be configurable per event type (e.g., filtering distraction events when the vehicle is stationary or at low speeds when looking for parking)). Another example of vehicle data that can be used for filtering includes: steering wheel angle. That is, since the road layout may be unknown (e.g., when merging onto highway, at a traffic circle, etc.), the legitimate gaze directions may also be unknown when the vehicle is turning. Therefore, the described technologies can utilize the generated directional adjustments to adjust or 'open' the road center horizontally, to allow the driver to look around, while still filtering low glances at non-driving related areas (e.g., phone), as described herein.

Another example of vehicle data that can be used for filtering includes: turn signal. By way of illustration, when switching lanes, a driver's glance above the shoulder at the 'blind spot' is more than desired. The described technologies can utilize the generated directional adjustments to adjust or 'open' the road center horizontally in the direction of the turn signal.

The described technologies can also be configured to detect and/or track passengers in the back seat(s) of a vehicle. In certain implementations, such passengers can be detected, tracked, etc. based on direct detection(s) (e.g., by a camera sensor) and/or indirect detections (e.g., by a mirror). In doing so, the presence, activity, behavior, and/or state of such passenger(s) can be determined.

Figure 17:
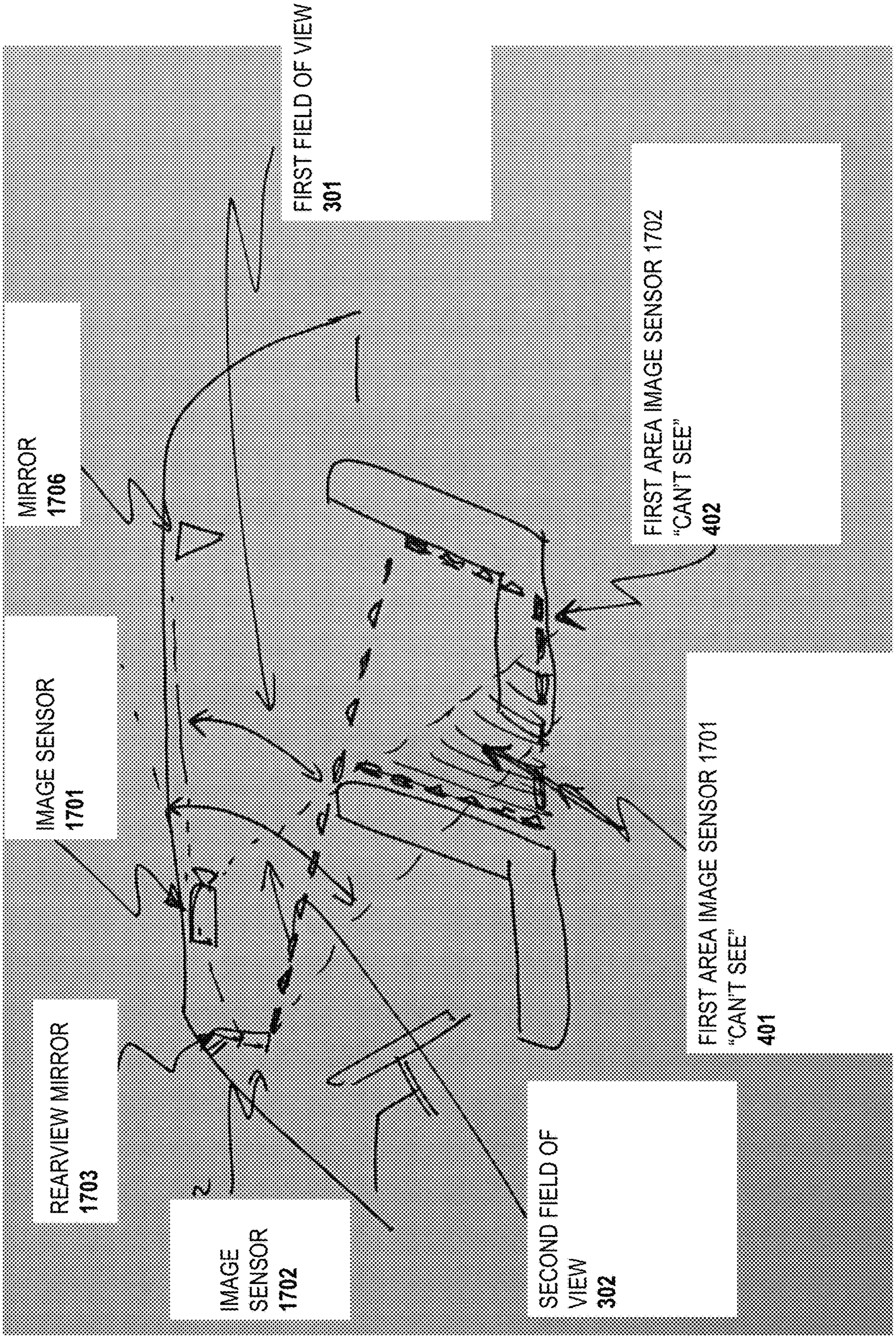
FIG. 17 illustrates example scenario(s) described herein, according to example embodiment(s).

For example, as depicted in FIG. 17, an in-vehicle system can be deployed which utilizes a combination of rearview mirror 1703 and image sensor(s) 1701 and 1702 (e.g., high-resolution cameras) front view camera which may be positioned above/below the front view mirror. A mirror 1706 can also be positioned (e.g., towards the back of the interior of the vehicle). By processing inputs originating from the referenced sensors, the described technologies can, for example, identify and/or otherwise detect: small children that may have been forgotten/hidden in the back seat of the car; objects forgotten in the backseat (e.g., when all passengers left the car); animals (dogs, cats, etc.) forgotten in the back seat; action, activity, etc., in the backseat that can distract the driver or harm the interior of the vehicle, etc.

As noted, mirror 1706 can be placed or positioned within the vehicle (e.g. on the ceiling of the interior of the vehicle, as shown in FIG. 17), and image sensor that capture at least part of the back seat including the mirror; and uses the information in the region associated with the mirror to determine the state of one or more passenger, animal or objects on the back seat.

Moreover, in certain implementations the described technologies can be configured to detect and/or otherwise determine the activity of a passenger seated in the back seat of a vehicle, e.g., using a first set of information as captured by a first image sensor. In certain implementations, such information can be associated with a passenger seated in the back seat and/or an area other than the front seat of a vehicle, e.g., as captured by the direct line of sight of a first sensor directed towards such an area (e.g., as shown in FIG. 17). Moreover, in certain implementations such determinations can be further determined based on a second set of information which may be extracted from a region in the captured image (e.g., a region associated with a mirror). As noted, such a mirror can be located or positioned in a manner that the region associated with the mirror in the captured image includes additional information relating to the passenger and/or the backseat area of the vehicle, such as information that is not capture by first image sensor (e.g., by a direct line of sight, such as the area depicted in FIG. 18 and described herein).

Figure 18:
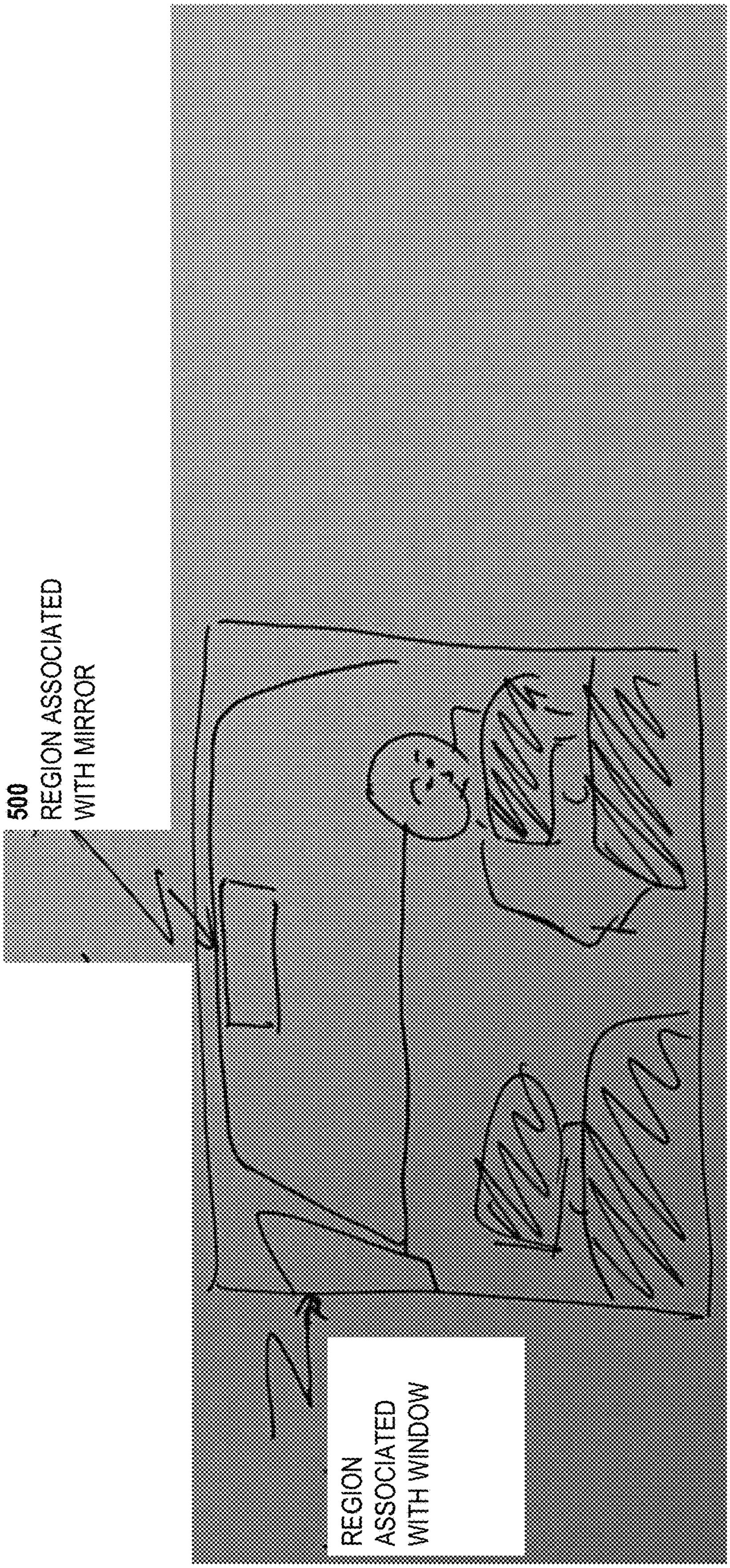
FIG. 18 illustrates example scenario(s) described herein, according to example embodiment(s).

As shown in FIG. 18, the described technologies can use information from region 500 (e.g., the region associated with the mirror, as shown in FIG. 18) in the frame as if there is another image sensor at that location, as described herein.

Additionally, in certain implementations the described system can be configured to detect or otherwise identify a presence of a passenger, e.g., even if such a passenger is bending down and thus cannot be seen or otherwise perceived by the direct sight of the first image sensor.

The described technologies can also be configured to detect an object a passenger is holding and/or activities associated with such an object.

It should also be understood that the described system can use other information extracted from other sensors in the car and/or other (e.g., external/remote) data sources.

It can therefore be appreciated that the described technologies are directed to and address specific technical challenges and longstanding deficiencies in multiple technical areas, including but not limited to image processing, communication interfaces, and machine vision. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a sub combination.

In some embodiments, a system may be configured for determining an expected interaction with a mobile device in a vehicle, as described in the following numbered paragraphs:

1. The system may comprise at least one processor configured to receive, from at least one image sensor in the vehicle, first information associated with an interior area of the vehicle; extract, from the received first information, at least one feature associated with at least one body part of the driver; determine, based on the at least one extracted feature, an expected interaction between the driver and a mobile device; and generate at least one of a message, command, or alert based on the determination.
2. In the system of paragraph 1, the at least one processor may be further configured to determine a location of the mobile device in the vehicle, and the expected interaction reflects an intention of the driver to handle the mobile device.
3. In the system of paragraph 2, the location of the mobile device may be determined using information received from the image sensor, other sensors in the vehicle, from a vehicle system, or from historical data associated with previous locations of the mobile device within the vehicle. In some embodiments, the vehicle system may include an infotainment system of the vehicle or a communication link between the mobile device and the vehicle such as a wireless phone charger or near field communication (NFC) device. In some embodiments, the mobile device may be determined to be located within a user's pocket, in a bag within the vehicle, or on a floor surface of the vehicle.
4. In the system of paragraph 1, the at least one extracted feature may be associated with at least one of a gesture or a change of driver posture, consistent with the gestures and postures disclosed herein.
5. In the system of paragraph 4, the at least one gesture may be performed by a hand of the driver. In some embodiments, the gesture may be performed by one or more other body parts of the driver, consistent with the examples disclosed herein.

6. In the system of paragraph 5, the at least one gesture may be toward the mobile device.
7. In the system of paragraph 1, the at least one extracted feature may be associated with at least one of a gaze direction or a change in gaze direction,
8. In the system of paragraph 1, the at least one extracted feature may be associated with at least one of physiological data or psychological data of the driver.

Physiological or psychological data may be consistent with the examples disclosed herein, and may include additional measures of physiological or psychological state known in the art.

9. In the system of paragraph 1, the at least one processor may be configured to extract the at least one feature by tracking the at least one body part.
10. In the system of paragraph 1, the at least one processor may be further configured to track the at least one of the extracted features to determine the expected interaction between the driver and mobile phone.
11. In the system of paragraph 1, the at least one processor may be further configured to determine the expected interaction using a machine learning algorithm based on: input data associated with the at least one extracted feature; and historical data associated with the driver or a plurality of other drivers.
12. In the system of paragraph 11, the at least one processor may be further configured to determine, using the machine learning algorithm, a correlation between the at least one extracted feature and a detected interaction between the driver and the mobile device, to increase an accuracy of the machine learning algorithm.
13. In the system of paragraph 12, the detected interaction between the driver and the mobile phone may be associated with a gesture of the driver picking up the mobile phone, and the machine learning algorithm determines the expected interaction associated with a prediction of the driver picking up the mobile phone.
14. In the system of paragraph 11, the historical data may include previous gestures or attempts of the driver to pick up the mobile device while driving.
15. In the system of paragraph 1, the at least one extracted feature may be associated with one or more motion features of the at least one body part.
16. In the system of paragraph 1, the at least one processor may be further configured to: extract, from the received first information or from second information, at least one second feature associated with the at least one body part; determine, using the at least one second feature, the expected interaction with the mobile device; and generate the at least one of the message, command, or alert based on the determined expected interaction.
17. In the system of paragraph 1 the at least one processor may be further configured to determine the expected interaction using a machine learning algorithm using at least one extracted feature associated with a beginning of a gesture toward the mobile device.
18. In the system of paragraph 1, the at least one processor may be further configured to recognize, in the first information, one or more gestures that the driver previously performed to interact with the mobile device while driving.
19. The system of claim 1 wherein the at least one processor is further configured to determine the expected interaction with the mobile device using information associated with at least one event in the mobile device, wherein the at least one mobile device event is associated with at least of: a notification, an incoming message, an incoming voice call, an incoming video call, an activation of a screen a sound emitted by the mobile device, a launch of an application on the mobile device, a termination of an application on the mobile device, a change in multimedia content played on the mobile device, or receipt of an instruction via a separate device in communication with the driver.
20. In the system of claim 1, the at least one of the message, command, or alert may be associated with at least one of: a first indication of a level of danger of picking up or interacting with the mobile device; or a second indication that the driver can safely interact with the mobile device, wherein the at least one processor is further configured to determine the first indication or the second indication using information associated with at least one of: a road condition, a driver condition, a level of driver attentiveness to the road, a level of driver alertness, one or more vehicles in a vicinity of the driver's vehicle, a behavior of the driver, a behavior of other passengers, an interaction of the driver with other passengers, the driver actions prior to interacting with the mobile device, one or more applications running on a device in the vehicle, a physical state of the driver, or a psychological state of the driver. In some embodiments, an indication of levels of danger, as well as what is classified by the system to be "dangerous" or "safe," may be preprogrammed in one or more rule sets stored in memory or accessed by the at least one processor, or may be determined by a machine learning algorithm trained using data sets indicative of various types of behaviors and driving events, and outcomes indicative of actual or potential harm to persons or property.
21. Disclosed embodiments may include a method for determining an expected interaction with a mobile device in a vehicle. The method may be performed by at least one processor and may comprise receiving, from at least one image sensor in the vehicle, first information associated with an interior area of the vehicle; extracting, from the received first information, at least one feature associated with at least one body part of an individual; determining, based on the at least one extracted feature, an expected interaction between the individual and a mobile device; and generating at least one of a message, or command, or alert based on the determination.
22. In the method of paragraph 21, the at least one body part may be associated with a driver or a passenger, and the at least one extracted feature is associated with one or more of: a gesture of a driver toward the mobile device, or a gesture of the passenger toward the mobile device.
23. The method of paragraph 21 may further comprise: determining a location of the mobile device in the vehicle, wherein the expected interaction reflects an intention of the individual to handle the mobile device.
24. In the method of paragraph 23, the location of the mobile device may be determined using information received from the image sensor, other sensors in the vehicle, from a vehicle system, or from historical data associated with previous locations of the mobile device within the vehicle.

25. In the method of paragraph 21, the at least one extracted feature may be associated with at least one of a gesture or a change of the individual's posture
26. In the method of paragraph 25, the at least one gesture may be performed by a hand of the individual.
27. In the method of paragraph 26, the at least one gesture may be toward the mobile device.
28. In the method of paragraph 21, the at least one extracted feature may be associated with at least one of a gaze direction or a change in gaze direction.
29. In the method of paragraph 21, the at least one extracted feature may be associated with at least one of physiological data or psychological data of the individual.
30. The method of paragraph 21 may further comprise extracting the at least one feature by tracking the at least one body part.
31. The method of paragraph 21 may further comprise tracking the at least one of the extracted features to determine the expected interaction between the individual and mobile device.
32. In the method of paragraph 21, the at least one processor may be further configured to determine the expected interaction using a machine learning algorithm based on: input data associated with the at least one extracted feature; and historical data associated with the individual or a plurality of other individuals.
33. In the method of paragraph 32, the at least one processor may be further configured to determine, using the machine learning algorithm, a correlation between the at least one extracted feature and a detected interaction between the individual and the mobile device, to increase an accuracy of the machine learning algorithm.
34. In the method of paragraph 33, the detected interaction between the driver and the mobile phone may be associated with a gesture of the driver picking up the mobile phone, the machine learning algorithm determines the expected interaction associated with a prediction of the driver picking up the mobile phone, and the historical data includes previous gestures or attempts of the driver to pick up the mobile device while driving.
35. In the method of paragraph 21, the at least one extracted feature may be associated with one or more motion features of the at least one body part.
36. In the method of paragraph 21, the at least one processor may be further configured to: extract, from the received first information or from second information, at least one second feature associated with the at least one body part; determine, using the at least one second feature, the expected interaction with the mobile device; and generate the at least one of the message, command, or alert based on the determined expected interaction.
37. The method of paragraph 21, the at least one processor may be further configured to determine the expected interaction using a machine learning algorithm using at least one extracted feature is associated with a beginning of a gesture toward the mobile device.
38. In the method of paragraph 21, the at least one processor may be further configured to determine the expected interaction with the mobile device using information associated with at least one or more event in the mobile device, wherein the at least one mobile device event may be associated with at least of: a notification, an incoming message, an incoming voice call, an incoming video call, an activation of a screen, a sound emitted by the mobile device, a launch of an application on the mobile device, a termination of an application on the mobile device, a change in multimedia content played on the mobile device, or receipt of an instruction via a separate device in communication with the individual.

In the method of paragraph 21, the at least one of the message, command, or alert may be associated with at least one of: a first indication of a danger of interacting with the mobile device phone; or a second indication that the driver can safely interact with the mobile device, wherein the at least one processor is further configured to determine the first indication or the second indication using information associated with at least one of: a road condition, a condition of the individual, driving conditions, a level of the individual's attentiveness to the road, a level of alertness of the individual, one or more other vehicles in a vicinity of the vehicle, a behavior of the individual, a behavior of other individuals in the vehicle, an interaction of the individual with other individuals in the vehicle, the individual's actions prior to interacting with the mobile device, one or more applications running on a device in the vehicle, a physical state of the individual, or a psychological state of the individual.

The disclosed embodiments may include a computer readable medium storing instructions which, when executed, configure at least one processor to perform operations for determining an expected interaction with a mobile device in a vehicle. The operations may comprise: receiving, from at least one image sensor in the vehicle, first information associated with an interior area of the vehicle; extracting, from the received first information, at least one feature associated with at least one body part of an individual; determining, based on the at least one extracted feature and using a machine learning algorithm, an expected interaction between the individual and a mobile device, using input data associated with the at least one extracted feature and historical data associated with the individual or a plurality of other individuals; and generating at least one of a message, or command, or alert based on the determination.

Exemplary embodiments have been described in this application and in the claims. The disclosed embodiments may also encompass those consistent with the following additional numbered paragraphs:

1. A touch-free gesture recognition system, comprising: at least one processor configured to: receive image information from an image sensor; detect in the image information a gesture performed by a user; detect a location of the gesture in the image information; access information associated with at least one control boundary, the control boundary relating to a physical dimension of a device in a field of view of the user, or a physical dimension of a body of the user as perceived by the image sensor; and cause an action associated with the detected gesture, the detected gesture location, and a relationship between the detected gesture location and the control boundary.
2. The system of paragraph 1, wherein the processor is further configured to generate information associated with at least one control boundary prior to accessing the information.
3. The system of paragraph 1, wherein the processor is further configured to determine the control boundary based, at least in part, on a dimension of the device as is expected to be perceived by the user.

4. The system of paragraph 3, wherein the control boundary is determined based, at least in part, on at least one of an edge or corner of the device as is expected to be perceived by the user.
5 The system of paragraph 1, wherein the processor is further configured to distinguish between a plurality of predefined gestures to cause a plurality of actions, each associated with a differing predefined gesture.
6. The system of paragraph 1, wherein the processor is further configured to generate a plurality of actions, each associated with a differing relative position of the gesture location to the control boundary.
7. The system of paragraph 1, wherein the processor is further configured to determine the control boundary by detecting a portion of a body of the user, other than the user's hand, and to define the control boundary based on the detected body portion, and wherein the processor is further configured to generate the action based, at least in part, on an identity of the gesture, and a relative location of the gesture to the control boundary.
8. The system of paragraph 1, wherein the processor is further configured to determine the control boundary based on a contour of at least a portion of a body of the user in the image information.
9. The system of paragraph 1, wherein the device includes a display, and wherein the processor is further configured to determine the control boundary based on dimensions of the display.
10. The system of paragraph 9, wherein processor is further configured to determine the control boundary based on at least one of an edge or corner of a display associated with the device.
11. The system of paragraph 9, wherein the processor is further configured to activate a toolbar associated with a particular-edge based, at least in part, on the gesture location.
12. The system of paragraph 1, wherein the action is related to a number of times at least one of an edge or corner of the control boundary is crossed by a path of the gesture.
13. The system of paragraph 1, wherein the action is associated with a predefined motion path associated with the gesture location and the control boundary.
14. The system of paragraph 1, wherein the action is associated with a predefined motion path associated with particular edges or corners crossed by the gesture location.
15. The system of paragraph 1, wherein the processor is further configured to detect a hand in predefined location relating to the control boundary and initiate detection of the gesture based on the detection of the hand at the predefined location.
16. The system of paragraph 1, wherein the processor is further configured to cause at least one of a visual or audio indication when the control boundary is crossed.
17. The system of paragraph 1, wherein the control boundary is determined, at least in part, based on a distance between the user and the image sensor.
18. The system of paragraph 1, wherein the control boundary is determined, at least in part, based on a location of the user in relation to the device.
19. A method for a touch-free gesture recognition system, comprising: receiving image information from an image sensor; detecting in the image information a gesture performed by a user; detecting a location of the gesture in the image information; accessing information associated with at least one control boundary, the control boundary relating to a physical dimension of a device in a field of view of the user, or a physical dimension of a body of the user as perceived by the image sensor; causing an action associated with the detected gesture, the detected gesture location, and a relationship between the detected gesture location and the control boundary.
20. The method of paragraph 19, further comprising determining the control boundary based on a dimension of the device as is expected to be perceived by the user.
21. The method of paragraph 20, wherein the control boundary is determined based, at least in part, on at least one of an edge or corner of the device as is expected to be perceived by the user.
22. The method of paragraph 19, further comprising generating a plurality of actions, each associated with a differing relative position of the gesture location to the control boundary.
23. The method of paragraph 19, further comprising determining the control boundary by detecting a portion of a body of the user, other than the user's hand, and defining the control boundary based on the detected body portion, and generating the action based, at least in part, on an identity of the gesture, and a relative location of the gesture to the control boundary.
24. The method of paragraph 19, further comprising determining the control boundary based on dimensions of the display.
25. The method of paragraph 24, further comprising activating a toolbar associated with a particular edge based, at least in part, on the gesture location.
26. The method of paragraph 19, wherein the control boundary is determined based on at least one of an edge or a corner of the device.
27. The method of paragraph 19, wherein the action is associated with a predefined motion path associated with the gesture location and the control boundary.
28. The method of paragraph 19, wherein the action is associated with a predefined motion path associated with particular edges or corners crossed by the gesture location.
29. The method of paragraph 19, further comprising detecting a hand in predefined location relating to the control boundary and initiating detection of the gesture based on the detection of the hand at the predefined location
30. The method of paragraph 19, wherein the control boundary is determined, at least in part, based on a distance between the user and the image sensor.
31. A touch-free gesture recognition system, comprising: at least one processor configured to: receive image information associated with a user from an image sensor; access information associated with a control boundary relating to a physical dimension of a device in a field of view of the user, or a physical dimension of a body of the user as perceived by the image sensor; detect in the image information a gesture performed by a user in relation to the control boundary; identify a user behavior based on the detected gesture; and generate a message or a command based on the identified user behavior.
32. The system of paragraph 31, wherein the at least one processor is further configured to detect the gesture by detecting a movement of at least one of a device, an object, or a body part relative to a body of the user.

33. The system of paragraph 32, wherein the predicted user behavior includes prediction of one or more activity the user performs simultaneously.
34. The system of paragraph 33, wherein the predicted one or more activity the user performs includes reaching for a mobile device, operate a mobile device, operate an application, controlling a multimedia device in the vehicle.
35. The system of paragraph 32, wherein the at least one processor is further configured to determine at least one of a level of attentiveness of the user or a gaze direction of the user based on the detected movement of at least one of the device, the object, or the body part relative to the body of the user.
36. The system of paragraph 32, wherein the at least one processor is further configured to improve an accuracy in detecting the gesture performed by the user or generating the message or the command, based on the detected movement of at least one of the device, the object, or the body part relative to the body of the user.
37. The system of paragraph 32, wherein the detected gesture performed by the user is associated with an interaction with a face of the user.
38. The system of paragraph 37, wherein the interaction comprises placing an object on the face of the user, or touching the face of the user.
39. The system of paragraph 31, wherein the at least one processor is further configured to: detect, in the image information, an object in a boundary associated with at least a part of a body of the user; ignore the detected object in the image information; and detect, based on the image information other than the ignored detected object, at least one of the gesture performed by the user, the user behavior, a gaze of the user, or an activity of the user.
40. The system of paragraph 39, wherein the detected object comprises a finger or a hand of the user.
41. The system of paragraph 31, wherein the at least one processor is further configured to: detect a hand of the user in a boundary associated with a part of a body of the user; detect an object in the hand of the user, wherein the object is moving with the hand toward the part of the body of the user; and identify the user behavior based on the detected hand and the detected object in the boundary associated with the part of the body of the user.
42. The system of paragraph 31, wherein the at least one processor is further configured to: detect a hand of the user in a boundary associated with a part of a body of the user; detect an object in the hand of the user; detect the hand of the user moving away from the boundary associated with the part of the body of the user after a predetermined period of time; and identify the user behavior based on the detected hand and the detected object.
43. The system of paragraph 31, wherein the at least one processor is further configured to: determine that the gesture performed by the user is an eating gesture by determining that the gesture is a repeated gesture in a lower portion of the user's face, in which the lower portion of the user's face moves up and down, left and right, or a combination thereof.
44. A touch-free gesture recognition system, comprising: at least one processor configured to: receive image information from an image sensor; detect in the image information a gesture performed by a user; detect a location of the gesture in the image information; access information associated with a control boundary, the control boundary relating to a physical dimension of a device in a field of view of the user, or a physical dimension of a body of the user as perceived by the image sensor; predict a user behavior, based on at least one of the detected gesture, the detected gesture location, or a relationship between the detected gesture location and the control boundary; and generate a message or a command based on the predicted user behavior.
45. The system of paragraph 44, wherein the at least one processor is configured to predict the user behavior using a machine learning algorithm.
46. The system of paragraph 44, wherein the at least one processor is further configured to predict an intention of the user to perform a particular gesture or activity by: detecting a movement patterns within a sequence of the received image information; and correlating, using a machine learning algorithm, the detected movement pattern to the intention of the user to perform the particular gesture.
47. The system of paragraph 44, wherein the user is located in a vehicle, and wherein the at least one processor is further configured to predict an intention of the user to perform a particular gesture by: receiving sensor information from a second sensor associated with the vehicle; detecting a pattern within a sequence of the received sensor information; and correlating, using a machine learning algorithm, the sensor information to one or more detected gesture or activity the user performs.
48. The system of paragraph 47, wherein the received sensor information is indicative of a location of a body part of the user in a three-dimensional space, or a movement vector of a body part of the user.
49. The system of paragraph 47, wherein the second sensor associated with the vehicle of the user comprises a light sensor, an infrared sensor, an ultrasonic sensor, a proximity sensor, a reflectivity sensor, a photosensor, an accelerometer, or a pressure sensor.
50. The system of paragraph 44, wherein the at least one processor is configured to predict the user behavior based on the control boundary and at least one of the detected gesture, the detected gesture location, or the relationship between the detected gesture location and the control boundary.
51. The system of paragraph 50, wherein the at least one processor is further configured to correlate, using a machine learning algorithm, the received sensor information to the intention of the user to perform at least one of the particular gesture or the activity.
52. The system of paragraph 50, wherein the received sensor information is data related to an environment in which the user is located.
53. The system of paragraph 44, wherein the at least one processor is further configured to: receive, from a second sensor, data associated with a vehicle of the user, the data associated with the vehicle of the user comprising at least one of speed, acceleration, rotation, movement, operating status, or active application associated with the vehicle; and generate a message or a command based on at least one of the data associated with the vehicle and the predicted user behavior.
54. The system of paragraph 44, wherein the at least one processor is further configured to: receive data associated with at least one of past predicted events or forecasted events, the at least one of past predicted events or forecasted events being associated with actions, gestures, or behavior of the user; and generate a message or a command based on at least the received data.

55. The system of paragraph 44, wherein the user is located in a vehicle, and the at least one processor is further configured to: receive, from a second sensor, data associated with a speed of the vehicle, an acceleration of the vehicle, a rotation of the vehicle, a movement of the vehicle, an operating status of the vehicle, or an active application associated with the vehicle; and predict the user behavior, an intention to perform a gesture, or an intention to perform an activity using the received data from the second sensor.

56. The system of paragraph 44, wherein the at least one processor is further configured to: receive data associated with at least one of past predicted events or forecasted events, the at least one of past predicted events or forecasted events being associated with actions, gestures, or behavior of the user; and predict at least one of the user behavior, an intention to perform a gesture, or an intention to perform an activity based on the received data.

57. The system of paragraph 44, wherein the at least one processor is further configured to predict the user behavior, based on detecting and classifying the gesture in relation to at least one of the body of the user, a face of the user, or an object proximate the user.

58. The system of paragraph 57, wherein the at least one processor is further configured to predict at least one of the user behavior, user activity, or level of attentiveness to the road, based on detecting and classifying the gesture in relation to at least one of the body of the user or the object proximate the user.

59. The system of paragraph 57, wherein the at least one processor is further configured to predict the user behavior, the user activity, or the level of attentiveness to the road, based on detecting a gesture performed by a user toward a mobile device or an application running on a digital device.

60. The system of paragraph 44, wherein the predicted user behavior further comprises at least one of the user performing a particular activity, the user being involved in a plurality of activities simultaneously, a level of attentiveness, a level of attentiveness to the road, a level of awareness, or an emotional response of the user.

61. The system of paragraph 60, wherein the attentiveness of the user to the road is predicted by detecting at least one of a gesture performed by the user toward a mirror in a car or a gestured performed by the user to fix the side mirrors.

62. The system of paragraph 44, wherein the at least one processor is further configured to predict a change in a gaze direction of the user before, during, and after the gesture performed by the user, based on a correlation between the detected gesture and the predicted change in gaze direction of the user.

63. The system of paragraph 44, wherein the at least one processor is further configured to: receive, from a second sensor, data associated with a vehicle of the user, the data associated with the vehicle of the user comprising at least one of speed, acceleration, rotation, movement, operating status, or active application associated with the vehicle; and change an operation mode of the vehicle based on the received data.

64. The system of paragraph 63, wherein the at least one processor is further configured to detect a level of attentiveness of the user to the road during the change in operation mode of the vehicle by: detecting at least one of a behavior or an activity of the user before the change in operation mode and during the change in operation mode.

65. The system of paragraph 64, wherein the change in operation mode of the vehicle comprises changing between a manual driving mode and an autonomous driving mode.

66. The system of paragraph 44, wherein the at least one processor is further configured to predict the user behavior using information associated with the detected gesture performed by the user, the information comprising at least one of speed, smoothness, direction, motion path, continuity, location, or size.

67. A touch-free gesture recognition system, comprising: at least one processor configured to: receive image information from an image sensor; detect in the image information at least one of a gesture or an activity performed by the user; and predict a change in gaze direction of the user before, during, and after at least one of the gesture or the activity is performed by the user, based on a correlation between at least one of the detected gesture or the detected activity, and the change in gaze direction of the user.

68. The system of paragraph 67, wherein the at least one processor is further configured to predict the change in the gaze direction of the user based on historical information associated with a previous occurrence of the gesture, the activity, or a behavior of the user, wherein the historical information indicates a previously determined direction of gaze of the user before, during, and after the associated gesture, activity, or behavior of the user.

69. The system of paragraph 67, wherein the at least one processor is further configured to predict the change in the gaze direction of the user using information associated with features of the detected gesture or the detected activity performed by the user.

70. The system of paragraph 69, wherein the information associated with features of the detected gesture or the detected activity are indicative of a speed, a smoothness, a direction, a motion path, a continuity, a location, or a size of the detected gesture or detected activity.

71. The system of paragraph 70, wherein the information associated with features of the detected gesture or the detected activity are associated with a hand of the user, a finger of the user, a body part of the user, or an object moved by the user.

72. The system of paragraph 71, wherein the at least one processor is further configured to predict the change in the gaze direction of the user based on a detection of an activity performed by the user, behavior associated with a passenger, or interaction between the user and the passenger.

73. The system of paragraph 67, wherein the user is located in a vehicle, and the at least one processor is further configured to predict the change in gaze direction of the user based on detection of at least one of a level of attentiveness of the user to the road, or an event taking place within the vehicle.

74. The system of paragraph 67, wherein the user is located in a vehicle, and the at least one processor is further configured to predict the change in gaze direction of the user based on: a detection of a level of attentiveness of the user to the road, and a detection of at least one of the gesture performed by the user, an activity performed by the user, a behavior of the user, or an event taking place within a vehicle.

75. The system of paragraph 67, wherein the at least one processor is further configured to predict a level of attentiveness of the user by: receiving gesture information associated with a gesture of the user while operating a vehicle; correlating the received information with event information about an event associated with the vehicle; correlating the gesture information and event information with a level of attentiveness of the user; and predicting the level of attentiveness of the user based on subsequent detection of the event and the gesture.

76. The system of paragraph 67, wherein the at least one processor is further configured to predict the change in the gaze direction of the user based on information associated with the gesture performed by the user, wherein the information comprises at least one of a frequency of the gesture, location of the gesture in relation to a body part of the user, or location of the gesture in relation to an object proximate the user in a vehicle.

77. The system of paragraph 67, wherein the at least one processor is further configured to correlate at least one of the gesture performed by the user, a location of the gesture, a nature of the gesture, or features associated with the gesture to a behavior of the user.

78. The system of paragraph 67, wherein: the user is a driver of a vehicle, and the at least one processor is further configured to correlate the gesture performed by the user to a response time of the user to an event associated with the vehicle.

79. The system of paragraph 78, wherein the response time of the user comprises a response time of the user to a transitioning of an operation mode of the vehicle.

80. The system of paragraph 79, wherein the transitioning of the operation mode of the vehicle comprises changing from an autonomous driving mode to a manual driving mode.

81. The system of paragraph 67, wherein: the user is a passenger of a vehicle, and the at least one processor is further configured to: correlate the gesture performed by the user to at least one of a change in a level of attentiveness of a driver of the vehicle, a change in a gaze direction of the driver, or a predicted gesture to be performed by the driver.

82. The system of paragraph 67, wherein the at least one processor is further configured to correlate, using a machine learning algorithm, the gesture performed by the user to the change in gaze direction of the user before, during, and after the gesture is performed.

83. The system of paragraph 67, wherein the at least one processor is further configured to predict, using a machine learning algorithm, the change in gaze direction of the user based on the gesture performed by the user and as a function of time.

84. The system of paragraph 67, wherein the at least one processor is further configured to predict, using a machine learning algorithm, at least one of a time or a duration of the change in gaze direction of the user based on information associated with previously detected activities of the user.

85. The system of paragraph 67, wherein the at least one processor is further configured to predict, using a machine learning algorithm, the change in gaze direction of the user based on data obtained from one or more devices, applications, or sensors associated with a vehicle that the user is driving.

86. The system of paragraph 67, wherein the at least one processor is further configured to predict, using a machine learning algorithm, a sequence or a frequency of the change in gaze direction of the user toward an object proximate the user, by detecting at least one of an activity of the user, the gesture performed by the user, or an object associated with the gesture.

87. The system of paragraph 67, wherein the at least one processor is further configured to predict, using a machine learning algorithm, a level of attentiveness of the user based on features associated with the change in gaze direction of the user.

88. The system of paragraph 87, wherein the features associated with a change in gaze direction of the user comprise at least one of a time, sequence, or frequency of the change in gaze direction of the user.

89. The system of paragraph 67, wherein the detected gesture performed by the user is associated with at least one of: a body disturbance; a movement a portion of a body of the user; a movement of the entire body of the user; or a response of the user to at least one of a touch from another person, behavior of another person, a gesture of another person, or activity of another person.

90. The system of paragraph 67, wherein the at least one processor is further configured to predict the change in gaze direction of the user in a form of a distribution function.

91. A touch-free gesture recognition system, comprising: at least one processor configured to: receive image information associated with a user from an image sensor; access information associated with a control boundary relating to a physical dimension of a device in a field of view of the user, or a physical dimension of a body of the user as perceived by the image sensor; detect in the image information a gesture performed by a user in relation to the control boundary; identify a user behavior based on the detected gesture; and generate a message or a command based on the identified user behavior.

Some embodiments may comprise a system for determining an expected interaction with a mobile device in a vehicle comprising at least one processor configured to receive, from at least one image sensor in the vehicle, first information associated with an interior area of the vehicle; detect, using the received first information, at least one body part of the driver and a mobile device; detect, based on the received first information, a gesture performed by the at least one body part; determine, based on the detected gesture, an intent of the driver to interact with the mobile device; and generate a message or command based on the determined intent. In some embodiments, the expected interaction with a mobile device may be used as an input into a machine learning algorithm or other deterministic system for determining a driver's level of control over a vehicle.

92. A system, comprising: at least one processor configured to: receive image information from an image sensor; detect in the image information at least one of a gesture or an activity performed by the user; predict a change in gaze direction of the user before, during, and after at least one of the gesture or the activity is performed by the user, based on a correlation between at least one of the detected gesture or the detected activity, and the change in gaze direction of the user;

and control an operation of a vehicle of the user based on the predicted change in gaze direction of the user.

93. A system and method to detect a driver's intention to pick up a device, such as a mobile phone, in order to operate it or look at it while driving, comprising: at least one processor configured to: receive image information from an image sensor; detect in the image information a gesture performed by a user; determine a driver intention to pick up a device (such as a mobile phone) using information associated with the detected gesture, and generate a message or a command or an alert based on the determination.

94. The system of paragraph 93, wherein the at least one processor is further configured to track one or more body part or change in the location of one or more body parts of the driver to determine a driver's intention to pick up a device.

95. The system of paragraph 93, wherein the at least one processor is further configured to track the posture or change in the body posture of the driver to determine a driver's intention to pick up a device.

96. The system of paragraph 93, wherein the at least one processor is further configured to detect the location of the mobile phone in the car and use the information associated with the detected location to determine a driver's intention to pick up a device.

97. The system of paragraph 93, wherein the at least one processor is configured to determine a driver's intention to pick up a device using a machine learning algorithm.

98. The system of paragraph 93, wherein the at least one processor is configured to extract motion features associated with the detected gesture, and determine a driver's intention to pick up a device using an extract motion features.

99. The system of paragraph 93, wherein the detected gesture is a gesture the driver performs with a hand.

100. The system of paragraph 99, wherein the detected gesture is a gesture the driver performs with the right hand.

101. The system of paragraph 99, wherein the detected gesture is a gesture toward a mobile device.

102. The system of paragraph 93, wherein the at least one processor is configured to determine a driver intention to pick up a device by predicting a gesture toward a mobile device based on information extracted from the image that is correlated to a gesture of picking up the mobile phone, therefore predict a driver intention to pick up a device.

103. The system of paragraph 102, wherein information is associated with the part of the gesture toward the mobile device.

104. The system of paragraph 103, wherein the information that is associated with the part of the gesture toward the mobile device is associated with the 'beginning' of a gesture toward the mobile device.

105. The system of paragraph 93, wherein the at least one processor is configured to determine a driver's intention to pick up a device using information extracted from previous gestures/attempts of the driver to pick a mobile phone while driving.

106. The system of paragraph 97, wherein the at least one processor is further configured to 'learn' the gestures that a specific driver performs in order to pick up a mobile phone while driving.

107. The system of paragraph 93, wherein the at least one processor is configured to determine a driver's intention to pick up a device using information associated with one or more events took place in the mobile device.

108. The system of paragraph 93, wherein the one or more events took place in the mobile device are associated with at least of: notification, incoming message, incoming call/video call, WhatsApp message, screen turns on, a sound initiated by the mobile phone, an application was launched, ended, a change in content (one song/video ends and one begins), request/instruction from the one the driver is communicated with.

109. The system of paragraph 93, wherein the at least one processor is further configured to determine and/or communicate with the driver the current level of danger of pick-up and look at/operate the mobile phone. The system of claim 1, wherein the at least one processor is further configured to determine and communicate with the driver the timing that is safer to pick-up the phone.

110. The system of paragraph 109, wherein the determination is using information associated with at least one of: the environmental condition, the driver condition, the driving conditions, the driver attentiveness to the road, the driver alertness, the vehicles in vicinity of the driver's vehicle, behavior of the driver, behavior of other passengers, interaction of the driver with other passengers, the driver actions before pick-up the mobile phone, one or more application running (such as navigation system providing instructions), driver physical and/or psychological state.

111. A system and method to detect that the driver operate a mobile phone while driving, comprising: at least one processor configured to: receive image information from an image sensor; detect in the image information the driver of the vehicle; determine, using information associated with the detected driver, that the driver operates the mobile phone while driving, and generate a message or a command based on the determination.

112. The system of paragraph 111, wherein the at least one processor is further configured to track one or more body part or change in the location of one or more body parts of the driver to determine that the driver operates the mobile phone.

113. The system of paragraph 111, wherein the at least one processor is further configured to track the posture or change in the body posture of the driver to determine that the driver operates the mobile phone.

114. The system of paragraph 111, wherein the at least one processor is further configured to detect a mobile phone in the car and use the information associated with the detection to determine that the driver operates the mobile phone.

115. The system of paragraph 114, wherein the at least one processor is further configured to detect the location of the mobile phone in the car and use the information associated with the detected location to determine that the driver operates the mobile phone.

116. The system of paragraph 111, wherein the at least one processor is further configured to detect a gesture performed by the driver, and using the information associated with the detection to determine that the driver operates the mobile phone.

117. The system of paragraph 114, wherein the at least one processor is further configured to detect a gesture performed by the driver toward the detected mobile phone, and using the information associated with the detection to determine that the driver operates the mobile phone.

118. The system of paragraph 111, wherein the at least one processor is further configured to: detect a mobile phone; detect an object that touches the mobile phone; and detect the hand of the driver holding the detected object to determine, that the driver operates the mobile phone.

119. The system of paragraph 111, wherein the at least one processor is further configured to: detect a mobile phone; detect that a finger of the driver is touching the mobile phone; and to determine, that the driver operates the mobile phone.

120. The system of paragraph 111, wherein the at least one processor is further configured to: detect the hand of the driver holding the mobile phone to determine, that the driver operates the mobile phone.

121. The system of paragraph 111, wherein the at least one processor is further configured to block the operation of the mobile phone based on the determination.

122. The system of paragraph 111, wherein the at least one processor is further configured to determine the driver intention to operation of the mobile phone, and block the operation of the mobile phone based on the determination.

123. The system of paragraph 122, wherein the at least one processor is further configured to predicting a gesture toward a mobile device based on information extracted from the image to determine the driver intention to operation of the mobile phone.

124. The system of paragraph 111, wherein the at least one processor is configured to: detect one or more body part of the driver; extract motion features associated with detect one or more body; and determine, that the driver operates the mobile phone using an extract motion features.

125. The system of paragraph 122, wherein the at least one processor is further configured to: detect one or more body part of the driver; extract motion features associated with detect one or more body; to predicting the driver intention to operation of the mobile phone.

126. The system of paragraph 111, wherein the at least one processor is configured to determine that the driver operates the mobile phone using a machine learning algorithm.

127. The system of paragraph 111, wherein the at least one processor is configured to determine a driver's intention to operate a mobile phone using information extracted from previous gestures/attempts of the driver to operate a mobile phone the mobile phone while driving.

128. The system of paragraph 111, wherein the at least one processor is further configured to determine and/or communicate with the driver the current level of danger of operate the mobile phone.

129. The system of paragraph 111, wherein the at least one processor is further configured to determine and communicate with the driver the timing that is safer to operate the mobile phone.

130. The system of paragraph 111, wherein the determination is using information associated with at least one of: the environmental condition, the driver condition, the driving conditions, the driver attentiveness to the road, the driver alertness, the vehicles in vicinity of the driver's vehicle, behavior of the driver, behavior of other passengers, interaction of the driver with other passengers, the driver actions before pick-up the mobile phone, one or more application running (such as navigation system providing instructions), driver physical and/or psychological state.

131. The system of paragraph 111, wherein the at least one processor is further configured to determine the driver intention to operation of the mobile phone, and block the operation of the mobile phone based on the determination.

132. A system comprising: processing device; and a memory coupled to the processing device and storing instructions that, when executed by the processing device, cause the system to perform operations comprising: receiving one or more first inputs; processing the one or more first inputs to identify a gaze of a driver; correlate the identified gaze with a predefined map wherein for each gaze direction a value which is associated with driver attentiveness is set, modified data in the memory based on the correlation; determining the state of attentiveness of a driver based on the data stored in the memory; and initiating one or more actions based on the state of attentiveness of a driver.

133. A system comprising: processing device; and a memory coupled to the processing device and storing instructions that, when executed by the processing device, cause the system to perform operations comprising: receiving one or more first inputs; processing the one or more first inputs to identify a gaze of a driver; correlate the identified gaze with a predefined map wherein for each gaze direction a value which is associated with driver attentiveness is set, modified data in the memory based on the correlation; receiving one or more second inputs; determining the state of attentiveness of a driver based on the data stored in the memory and the one or more second input; and initiating one or more actions based on the state of attentiveness of a driver.

134. The system of paragraph 133, wherein the second inputs are at least one or more inputs indicating information related to the vehicle.

135. The system of paragraph 134, wherein the one or more inputs indicating information related to the vehicle are associated with at least one of: vehicle direction, speed, acceleration, deceleration, the state of the vehicle steering wheel, state of blinkers.

136. The system of paragraph 134, wherein the one or more inputs indicating information related to the vehicle are in relation to its vicinity including other cars, pedestrians or road structure.

137. A system comprising: processing device; and a memory coupled to the processing device and storing instructions that, when executed by the processing device, cause the system to perform operations comprising: receiving one or more first inputs; processing the one or more first inputs to identify a gaze of a driver; correlate the identified gaze with a predefined map wherein for each gaze direction a value which is associated with driver attentiveness is set, to determine, based on the correlation and one or more previously determined states of attentiveness associated with the driver of the vehicle, a state of attentiveness of a driver of the vehicle; and initiating one or more actions based on the state of attentiveness of a driver.

138. A system and method to detect a gaze direction of a driver while driving a vehicle, comprising: at least one processor configured to: receive image information from an image sensor; detect in the image information the driver of the vehicle; detect in the image information a gaze direction of driver of the vehicle toward a first direction; predict, using information associated with the detected gaze direction of driver, an amount of time it will take for the driver to shift the gaze direction toward a second direction; and generate a message or a command based on the predicted amount of time.

139. The system of paragraph 138, wherein the at least one processor predicts the amount of time using information associated with the first direction and the second direction.

140. The system of paragraph 138, wherein the at least one processor predicts the amount of time using information associated with at least one of a posture of the driver, a location of the driver in the car, a seat location of the driver, or a seat position of the driver.

141. The system of paragraph 138, wherein the at least one processor is further configured to determine a level of attentiveness of the driver while driving on a road, and predict the amount of time it will take for the driver to shift the gaze direction toward the second direction using the determined level of attentiveness of the driver to the road.

142. The system of paragraph 138, wherein the at least one processor predicts the amount of time using information associated with a physiological parameter associated with the driver including at least one of a fatigue level, a heart rate, a blood alcohol level, or a parameter associated with a sickness of the driver.

143. The system of paragraph 138, wherein the at least one processor predicts the amount of time using information associated with a psychological parameter associated with the driver, including at least one of a fatigue level, an emotional state, a level of alertness, or a level of attentiveness.

144. The system of paragraph 138, wherein the at least one processor predicts the amount of time using information associated with a driving condition.

145. The system of paragraph 144, wherein the driving condition is an amount of traffic proximate the vehicle, and the at least one processor is further configured to determine the amount of traffic.

146. The system of paragraph 145, wherein the at least one processor is further configured to determine the amount of traffic based on information received from an Advanced Driver Assistance System.

147. The system of paragraph 141, wherein the at least one processor is further configured to: detect at least one of: an activity of the driver while driving, a behavior of the driver, an action of the driver, a gesture performed by the driver, an activity taking place in the vehicle by one or more passengers; and determine the level of driver attentiveness using the detection.

148. The system of paragraph 141, wherein the at least one processor is further configured to: detect one or more of an interaction of the driver with a mobile phone, an interaction of the driver with a digital device, an interaction of the driver with a system in the vehicle, an action of the driver looking for an object in the vehicle, or the driver looking at a passenger in the vehicle; and determine the level of driver attentiveness using the detection.

149. The system of paragraph 138, wherein the at least one processor predicts the amount of time using information associated with historical information including recordings of one or more previous driving sessions.

150. The system of paragraph 149, wherein the driver is driving the vehicle in a current driving session, and the at least one processor predicts the amount of time using historical information including one or more recordings of previous driving sessions involving a road condition or a vehicle speed similar to the current driving session.

151. The system of paragraph 150, wherein the road condition include a type of road, one or more of a width of the road, a number of lanes of the road, a lighting condition of the road, a lighting condition of one or more other vehicles on the road, a curvature of the road, a weather condition, or a visibility level.

152. The system of paragraph 141, wherein the at least one processor is further configured to: detect an activity of a person outside the vehicle; and determine the level of driver attentiveness using information associated with the detection.

153. A system and method, and computer readable medium storing instructions to perform one or more operations for improving detection of a gaze direction of a driver while driving a vehicle, involving at least one processor configured to: receive image information from an image sensor; detect in the image information the driver of the vehicle; detect in the image information the gaze direction of the driver of the vehicle; determine, using information associated with the received image information that the image sensor is out of calibration; and generate a message or a command based on the determination indicating that the detected gaze direction is not correct.

154. The system of paragraph 153, wherein the image sensor is part of a device connected to the vehicle.

155. The system of paragraph 154, wherein the image sensor being out of calibration is due to a change in orientation of the device in relation to the vehicle.

156. The system of paragraph 153, wherein the at least one processor is further configured to determine the image sensor is out of calibration before the driver is detected.

157. The system of paragraph 153, wherein the at least one processor is further configured to determine the image sensor is out of calibration before the driver enters the vehicle.

158. The system of paragraph 153, wherein the at least one processor is further configured to determine an orientation of the image sensor in relation to the vehicle, and calibrate the detected gaze direction of the driver in relation to the road using the determined orientation.

159. The system of paragraph 153, wherein the at least one processor is further configured to send the message to an operator or other system, the message indicating a requirement to calibrate the image sensor.

160. The system of paragraph 153, wherein the at least one processor is further configured to send the message to an operator or telematic system, the message indicating errors in the driver's gaze direction due to the image sensor being out of calibration or due to a change in an orientation of the device relative to the vehicle.

161. The system of paragraph 160, wherein the at least one processor is further configured to: detect that the image-sensor has been calibrated; and send a confirmation message to an operator or telematic system, the confirmation message indicating that the driver's gaze direction is accurate once again.

162. The system of paragraph 153, wherein the at least one processor is further configured to: detect one or more cues in the image information; and determine that the image sensor is out of calibration based on the one or more cues in the image information.

163. The system of paragraph 162, wherein cues include one or more of a physical structure of the vehicle, an object in the vehicle, a window of the vehicle, a seat of the vehicle, or any other object associated with the vehicle.
164. The system of paragraph 162, wherein at least one of the cues is associated with the driver.
165. The system of paragraph 164, wherein at least one of the cues relates to a visual facial feature of the driver.
166. The system of paragraph 162, wherein at least one of the cues is associated with a detected orientation of the driver.
167. The system of paragraph 153, wherein the at least one processor is configured to determine the amount of time using a machine learning algorithm based on information associated with at least one of the driver, the vehicle, other drivers, or other vehicles, consistent with techniques disclosed herein.

Additional exemplary embodiments may involve determining an authorization of an individual to operate a device in the vehicle. For example, disclosed embodiments may include a system for determining an unauthorized use of a device in a vehicle, comprising at least one processor configured to: receive, from at least one image sensor in the vehicle, first information associated with an interior area of the vehicle; extract, from the received first information, at least one feature associated with at least one body part of an individual; identify, based on the at least one extracted feature, an interaction between the individual and the device or an attempt of the individual to operate the device; determine, based on the identification, an authorization of the individual to perform the interaction or the attempted operation; and generate at least one of a message, command, or alert based on the determination.

In some embodiments, the interior area of the vehicle may comprise the entire interior volume of the vehicle or a portion thereof such as a particular location within the vehicle, a particular seat in the vehicle such as the driver's seat or a front passenger's seat, a second row of seating, a third or fourth row of seating, and so forth. In some embodiments, the interior area may include a cargo or storage location including a trunk, glove box, or other storage location within the vehicle.

In the disclosed embodiments, the system may include one or more components embedded in the vehicle, such as fixed sensor devices within the vehicle, or other controls, user interfaces, or devices that are part of the vehicle systems. In some embodiments, components of the system may include one or more components of a device located within the vehicle, such as a processor and/or camera, microphone, or other components of a mobile communication device located within the vehicle.

Additionally, the disclosed embodiments are not meant to be limited to use within a vehicle. In some embodiments, the disclosed systems and techniques may be used in other environments in which information regarding a user's level of control, distraction, attentiveness, or perceived response time is desirable. Such environments could include, for example, a video game, such as an augmented reality game, virtual reality game, or other type of video game, a control station for machinery or other mechanical or electrical equipment requiring manual input, control, and/or supervision.

In some embodiments, an "interaction" between the individual and the device may comprise an operation of the device by the individual. In some embodiments, an interaction may comprise other gestures or activities such as holding the device, manipulating the device, touching the device, viewing the device, and other types of interactions disclosed herein. In some embodiments, an attempt of the individual to operate the device may comprise an identification of behavior indicative of the individual trying to interact with the device. In some embodiments, an attempted operation may include activities the individual may engage in on the device after they have picked up the device, such as going to answer a call, view a message, or open a multimedia program like to change a song.

1. In some embodiments, the vehicle may be an object within the game. In such embodiments, disclosed systems may be implemented in a game, whereas instead of collecting information inside a vehicle, information may be collected about the gamer in real life. For example, the system may collect information regarding the gamer's gaze, gestures, mental, attentiveness, and other information related to control, attentiveness, and response time, from the gamer's person in real life. In some embodiments, a mobile device may comprise a virtual object within the game such as an item on a screen or an object within the game. In such embodiments, the system may extract information about the player's attentiveness to certain events in the game and provide alerts to the gamer when inappropriate or required to address certain items in the game.
2. The system of paragraph 1, wherein the determination is based on at least one predefined authorization criteria associated with the interaction or operation of the device.
3. The system of paragraph 1, wherein the at least one processor is further configured to not enable a subset or all of the possible interaction or operations available to the individual. In some embodiments, the at least one processor of paragraph 1 may be additionally or alternatively configured to block and/or disable some or all of the possible functions of the device, based on the generated message, command, or alert.
4. The system of paragraph 1, wherein the at least one processor is further configured to block or disable some or all of the possible functions of the device, based on the generated message, command, or alert.
5. The system of paragraph 1, wherein the individual is the driver or a passenger of the vehicle.
6. The system of paragraph 1, wherein the authorization relates differently to a driver and to a passenger.
7. The system of paragraph 1, wherein the authorization differs when the individual is a driver of the vehicle or a passenger of the vehicle.
8. The system of paragraph 1, wherein the authorization is associated with a specific individual.
9. The system of paragraph 1, wherein the authorization is determined based in part on a personal identity of the individual.
10. The system of paragraph 1, wherein the at least one processor is further configured to track the at least one body part or determine a change in the location of one or more body parts of the driver to identify the interaction or the attempted interaction.
11. The system of paragraph 1, wherein the at least one processor is further configured to identify the interaction or the attempted operation, based at least in part on: detecting a gesture of the at least one body part; and associating the detected gesture with the interaction or the attempted operation.

12. The system of paragraph 11, wherein the at least one processor is further configured to identify the interaction or the attempted operation, based in part on: determining, using the first information received from the at least one image sensor, at least one of: a region of the interior area associated with the detected gesture, or an approach direction of the gesture relative to the device.

13. The system of paragraph 12, wherein the at least one processor is further configured to associate the gesture with the individual, by associating the determined region or the determined approach direction, with a location of the individual within the interior area.

14. The system of paragraph 12, wherein the at least one processor is further configured to associate the gesture with a location in the vehicle associated with at least one of: a driver location, a passenger location, or a back seat passenger location.

15. The system of paragraph 1, wherein the at least one processor is further configured to identify the individual that interact or operate the device as a driver or as a passenger, by: detecting, using the first information, a gesture of the at least one body part; determining that the detected gesture is associated with an interaction or the attempted operation of the device; and determining that the individual performed the gesture.

16. The system of paragraph 1, wherein the at least one processor is further configured to identify the individual by: detecting, using the first information, a gesture of the at least one body part; determining that the detected gesture is associated with the interaction or the attempted operation of the device; and determining that the individual performed the gesture.

17. The system of paragraph 15, wherein the at least one processor is further configured to determine the individual that perform the gesture associated with interaction or operation of the device, based at least in part on extracting features associated with the gesture, wherein the extracted features are at least one or more of: motion features, location of one or more body part, direction of the gesture, origin of the gesture, features related to the body part, identify the body part that performs the gesture as body part of a specific individual.

18. The system of paragraph 15, wherein the at least one processor is further configured to determine that the individual performed the gesture, based in part on: extracting features associated with the gesture, wherein the extracted features are at least one or more of: motion features, a location of one or more body part, a direction of the gesture, an origin of the gesture, features related to the body part, or an identification of a body part that performed the gesture as being the at least one body part of the individual.

19. The system of paragraph 15, wherein the at least one processor is further configured to determine the individual that interact or operates the device, based at least in part on: detecting the location of at least one of the driver's hands, detecting a hand or finger as the body part interaction with the device, and extracting features associated with the detected hand or finger.

20. The system of paragraph 15, wherein the extracting features associated with the detected hand or finger include: motion features associated with the detected hand or finger, the orientation of the hand or finger, identify the body part as right hand or left hand.

21. The system of paragraph 15, wherein the at least one processor is further configured to determine whether the individual is a driver of the vehicle or a passenger of the vehicle, based in part on: determining that the at least one body part is a hand or a finger of a hand; detecting a location of at least one of the driver's hands; determining that the at least one body part is a hand or a finger; and identifying, using the extracted feature, the at least one body part as at least part of the driver's hands, wherein the extracted feature includes at least one of a motion feature associated with the hand or the finger, or an orientation of the hand or the finger.

22. The system of paragraph 1, wherein the device is a mobile device or an embedded device in the vehicle.

23. The system of paragraph 1, wherein the at least one processor is further configured to: receive second information; and determine whether the individual is authorized based in part on the second information.

24. The system of paragraph 23, wherein the second information is associated with the interior of the vehicle.

25. The system of paragraph 23, wherein the second information is associated with a second sensor comprising at least one of: a microphone, a light sensor, an infrared sensor, an ultrasonic sensor, a proximity sensor, a reflectivity sensor, a photosensor, an accelerometer, or a pressure sensor.

26. The system of paragraph 25, wherein the second sensor is a microphone, and the second information includes a voice or a sound pattern associated with one or more individuals in the vehicle.

27. The system of paragraph 23, wherein the second information is data associated with the vehicle comprising at least one of a speed, acceleration, rotation, movement, operating status, active application associated with the vehicle, road conditions, surrounding vehicles, or proximate events, and wherein the at least one processor is configured to determine the authorization based at least in part on predefined authorization criteria related to the data associated with the vehicle.

28. The system of paragraph 23, wherein the second information indicates that the vehicle is being driven.

29. The system of paragraph 1, wherein the authorization relates to the required attentiveness of the driver to the road.

30. The system of paragraph 1, wherein the individual is a driver of the vehicle, and the authorization is associated with a required level of attentiveness of the driver to driving the vehicle.

31. The system of paragraph 1, wherein the at least one processor is further configured to determine the interaction between the individual and the device or the attempt of the individual to operate the device using a machine learning algorithm using at least one of: the first information; second information associated with the vehicle or the interior of the vehicle; or input data associated with at least one of: features related to the motion of the body part, features related to the faces of one or more individuals, gaze related features of one or more individuals a prior interaction between the individual and the device or a prior attempt of the individual to operate the device, a gesture of the individual, a level of attention of the individual, a level of control of the individual over the vehicle or the device, a driving event, and road conditions, one or more surrounding vehicles, or proximate events, a behavior of the individual, behavior of other individuals in the vehicle, an interaction of the individual with other individuals in the vehicle, one or actions of the individual prior to the interaction or the attempted operation of the device, one or more applications running in the vehicle, a physiological data of the individual, a psychological data of the individual; and historical data associated with the individual or a plurality of other individuals.

32. The system of paragraph 31, wherein the at least one processor is further configured to determine, using the machine learning algorithm, a correlation between the at least one extracted feature and the identified interaction or the attempted operation, to increase an accuracy of the machine learning algorithm.

33. The system of paragraph 1, wherein the at least one processor is further configured to use the extracted feature to track the at least one body part or determine a change in a location of the at least one body part of the individual to identify the interaction between the individual and the device or the attempt of the individual to operate the device.

34. The system of paragraph 1, wherein the at least one processor is further configured to use the extracted feature to track a body posture or change in the body posture of the individual to identify the interaction between the individual and the device or the attempt of the individual to operate the device.

35. The system of paragraph 1, wherein the at least one processor is further configured to identify the device in the received first information, or in second information associated with the vehicle, the interior of the vehicle, or the device.

36. The system of paragraph 1, wherein the at least one processor is further configured to identify the location of device in the received first or second information.

37. The system of paragraph 1, wherein the at least one processor is further configured to identify a location of the device in the received first or in second information associated with the vehicle or the interior of the vehicle.

38. The system of paragraph 1, wherein the at least one processor is further configured to: detect an object that touches the device in the received first information; determine, using the first information, that the at least one body part is holding the detected object; identify the interaction between the individual and the device or an attempt of the individual to operate the device, based in part on the determination that the at least one body part is holding the detected object.

39. The system of paragraph 1, wherein the extracted feature is associated with at least one of: a gaze direction, a change in gaze direction, a physiological data of the individual, a psychological data of the individual, one or more motion features of the at least one body part, a size of the at least one body part, or an identity of the individual.

40. The system of paragraph 1, wherein the at least one generated message, command, or alert blocks at least one function of the device, the at least one function being associated with the determined authorization.

41. The system of paragraph 1, wherein the at least one generated message, command, or alert causes an output device to communicate to the individual a warning associated with a level of danger of the interaction or the attempted operation.

42. The system of paragraph 41, wherein the warning includes an indication of a safe timing associated with the interaction or the attempted operation of the device.

43. The system of paragraph 42, wherein the at least one generated message, command, or alert causes an output device to communicate to the individual one or more options for interacting with the device or operating the device, the one or more options being associated with the determined authorization.

Additional exemplary embodiments are described by the following numbered paragraphs:

1. Disclosed embodiments may include a system comprising at least one processing device; and a memory coupled to the at least one processing device and storing instructions that, when executed by the processing device, cause the system to perform operations comprising: receiving, from at least one image sensor in the vehicle, first information associated with at least one eye of a driver; receiving, second information associated with the exterior of the vehicle, wherein the second information is further associated with at least one driving event or at least one road condition; processing the received first information; correlating the processed information with at least one driving event or at least one road condition during the time period; determining, based on the correlation and a location of the at least one driving event or the at least one road condition, the state of attentiveness of a driver based on data stored in the memory; and generating at least one of a message, command, or alert based on the determined state of attentiveness.

2. In the system of paragraph 1, the at least one processing device may be further configured to: process the received first information to identify a gaze of the driver; determine a gaze dynamic of the driver during the time period using the identified gaze; correlate the determined gaze dynamic with the at least one driving event or at least one road condition; and determine, based on the correlation, the state of attentiveness of a driver using the correlation.

3. The system of paragraph 2, wherein the at least one processing device is further configured to: extract features associated with the identified gaze; and determine the gaze dynamic of the driver using the extracted features.

4. The system of paragraph 3, wherein the extracted features are associated with a change in the identified gaze.

5. The system of paragraph 1, wherein the at least one processor is further configured to: process the received first information to identify a gaze of the driver; determine a gaze dynamic of the driver using the identified gaze; receive second information, wherein the second information is associated with at least one of: an interior of the vehicle, a state of the vehicle, a driver condition, a driving condition, at least one driving action, or at least one road condition; correlate the determined gaze dynamic with the received second information; and determine the state of attentiveness of the driver using the correlation.

6. The system of paragraph 1, wherein the at least one processor is further configured to: process the received first information to identify a gaze of the driver; determine a gaze dynamic of the driver using the identified gaze; associate a driving event with the time period; identify, in the field of view of the user, a plurality of locations associated with the at least one driving event or driving condition; correlate the determined gaze dynamic with at least one of the identified locations;

and determine the state of attentiveness of the driver associated with the correlation.

7. The system of paragraph 6, wherein the plurality of locations are associated with two or more states of attentiveness.
8. The system of paragraph 6, wherein the gaze dynamic is further associated with features associated with the driver gaze.
9. The system of paragraph 8, wherein the features of driver gaze may be at least one of: direction of gaze, time in each location or zone, speed of gaze direction change, time of changing gaze direction from first location to a second location.
10. The system of paragraph 6, wherein the at least one processor is further configured to: analyze a temporal proximity between the identified gaze or the determined gaze dynamic and the identified locations; and determine the state of attentiveness of the driver associated with the analysis.
11. The system of paragraph 6, wherein the at least one processor is configured to determine the state of attentiveness of the driver using: states of attentiveness associated with the identified locations; and an amount of time or frequency that the identified gaze or the determined gaze dynamic is associated with the identified locations.
12. In the system of paragraph 10, at least one of the identified locations is associated with a left mirror, a right mirror, or a rearview mirror.
13. In the system of paragraph 6, states of attentiveness associated with the identified locations are related to parameters associated with an amount of time or frequency.
14. The system of paragraph 10, wherein the at least one processor is further configured to determine states of attentiveness associated with the identified locations using a machine learning algorithm based on historical data of the driver or one or more other drivers.
15. The system of paragraph 6, wherein the identified locations comprise a sequence of the identified locations.
16. The system of paragraph 15, wherein at least one of the identified locations in the sequence is a location associated with a mobile device in the vehicle.
17. The system of paragraph 1, wherein the at least one processor is further configured to: associate the driving event with a time stamp; identify, in the field of view of the user, a plurality of zones associated with the driving event, the plurality of zones being associated with two or more states of attentiveness; correlate the determined gaze dynamic with at least one of the identified zones; and determine, using the states of attentiveness associated with the correlated zones, the state of attentiveness of the driver.
18. The system of paragraph 2, wherein the gaze dynamic is associated with one or more driving conditions, the driving conditions being associated with one or more of a city road area, a highway road area, high traffic density, a traffic jam, driving near a motorcycle, driving near a pedestrian, driving near a bicycle, driving near a stopped vehicle, driving near a truck, or driving near a bus.
19. The system of paragraph 2, wherein the gaze dynamic is associated with a state of the vehicle, the state of the vehicle including one or more of a speed, a turning status, a braking status, or an acceleration status.
20. The system of paragraph 2, wherein the gaze dynamic is associated with one or more characteristics of other vehicles in a vicinity of the driver's vehicle, the characteristics including one or more of a density of the other vehicles, a speed of the other vehicles, a change in speed of the other vehicles, a travel direction of the other vehicles, or a change in travel direction of the other vehicles.
21. The system of paragraph 2, wherein the gaze dynamic is associated with the road condition of a road on which the vehicle is moving, the road condition including one or more of a width of the road, a number of lanes of the road, a lighting condition of the road, a lighting condition of one or more other vehicles on the road, a curvature of the road, a weather condition, or a visibility level.
22. The system of paragraph 1, wherein the data stored in the memory is associated with a hyperparameter or training data associated with a machine learning algorithm.
23. A non-transitory computer readable medium having stored therein instructions, which, when executed, cause a processor to perform operations, the operations comprising: receiving, from the at least one image sensor in the vehicle, first information associated with at least one eye of a driver; receiving second information associated with an exterior of the vehicle; processing the received first information; correlating the processed information with the second information and data stored in the memory during a time period; determining, based on the correlation, the state of attentiveness of a driver; generating at least one of a message, command, or alert based on the determined state of attentiveness.
24. The non-transitory computer readable medium of paragraph 23, wherein the processor is further configured to correlate the processed information with the second information and data stored in the memory while the first information and second information are synchronized in time.

In some embodiments, the system may correlate first information and second information to determine a state of an individual such as a state of a driver. For example, first information associated with a gaze, a gaze dynamic, a gesture, or other information associated with a driver, may be synchronized in time with second information, for determining a state of attentiveness of the driver. In some embodiments, synchronizing first and second information may involve calculating a difference in time between one or more timestamps of the data sets to associate the data of the different data sets with one another.

25. A system comprising: at least one processing device; and a memory coupled to the at least one processing device and storing instructions that, when executed by the processing device, cause the system to perform operations comprising: receiving, from at least one image sensor in the vehicle, first information associated with at least one eye of a driver; receiving, second information associated with the exterior of the vehicle, wherein the second information is further associated with at least one driving event or at least one road condition; processing the received first information; correlating the processed information with at least one driving event or at least one road condition during the time period; determining, based on the correlation and a location of the at least one driving event or the at least one road condition, the state of attentiveness of a driver based on data stored in the memory; and generating at least one of a message, command, or alert based on the determined state of attentiveness.

26. The system of paragraph 25, wherein the at least one processor is further configured to identify one or more locations in the correlate the determined gaze dynamic with a sequence of a plurality of the identified locations associated with the driver's gaze.

27. The system of paragraph 25, wherein the at least one processor is further configured to determine the gaze dynamic by extracting features associated with the change of the driver gaze.

28. The system of paragraph 27, wherein the driver gaze comprises at least one of: direction of gaze, time in each location or zone, speed of gaze direction change, time of changing gaze direction from first location to a second location.

29. A system comprising: at least one processing device; and a memory coupled to the at least one processing device and storing instructions that, when executed by the processing device, cause the system to perform operations comprising: receiving, from at least one image sensor in the vehicle, first information associated with at least one eye of a driver; processing the received first information to identify a gaze of the driver; correlating the identified gaze with a zone in a predetermined map, the map comprising a plurality of zones in a field of view of the driver and one or more states of attentiveness associated with the plurality of zones; determining a state or level of attentiveness of the driver based on the correlation; and generating at least one of a message, command, or alert based on the determined state of attentiveness of the driver.

In some embodiments, the predetermined map may comprise a uniform or nonuniform grid of cells or zones, where the zones are associated with different parts of the driver's field of view, and are associated with one or more states of attentiveness of the driver's gaze. Such embodiments may comprise a determination of the driver's state of attentiveness using a correlation between gaze and a map zone that may not involve or require classification of inputted information or other machine learning algorithm processing.

30. The system of paragraph 29, wherein the at least one processor is further configured to determine the state or level of attentiveness of the driver by: receiving second information associated with the exterior of the vehicle, wherein the second information is further associated with at least one driving event or at least one road condition; correlating the processed first information with at the least one driving event or the at least one road condition during the time period; and determining the state of attentiveness of a driver based on the correlations.

As an example, second information may include a speed of the vehicle. If the vehicle is moving at very fast speed down a highway road, the map may be modified based on the vehicle speed so that zones peripheral to or outside the windshield are associated with states of non-attentiveness, or such zones may be associated with a very low time threshold before assigning a state of non-attentiveness. In such embodiments, if the driver's gaze or gaze dynamic shifts from the cells/zones in the windshield directly in front of the driver, to the outer peripheral zones while the vehicle is moving at a fast speed, the system may determine that the driver is non-attentive after a very brief time period of sustained gaze away from the road ahead.

31. The system of paragraph 30, wherein the at least one processor is further configured to modify the map based on the second information.

32. The system of paragraph 30, wherein the at least one processor is further configured to modify the states of attentiveness associated with the plurality of zones based on the second information.

33. The system of paragraph 29, wherein the processor is further configured to modify the map based on information about an interior of the vehicle.

34. The system of paragraph 29, wherein the map comprises a plurality of cells, and wherein shapes and sizes of the plurality of cells is configured to change.

35. The system of paragraph 29, wherein the map comprises a plurality of cells, wherein shapes or sizes of the plurality of cells are configured to remain constant, and wherein a state of attentiveness associated with each of the plurality of cells is configured to change.

36. The system of paragraph 29, wherein the map further comprises a plurality of zones in a field of view of the driver in a plurality of different positions.

37. The system of paragraph 29, wherein the one or more states of attentiveness associated with the plurality of zones are predetermined.

38. The system of paragraph 29, wherein the one or more states of attentiveness associated with the plurality of zones are configured to change with time.

39. The system of paragraph 29, wherein the processor is further configured to generate at least one of the message, command, or alert when the driver is distracted.

40. The system of paragraph 29, wherein the processor is further configured to continuously or periodically generate at least one of the message, command, or alert based on a predefined schedule or criteria.

41. The system of paragraph 32, wherein the states of attentiveness associated with the plurality of zones are predetermined.

42. The system of paragraph 32, wherein the one or more states of attentiveness associated with the plurality of zones are configured to change with time.

Embodiments of the present disclosure may also include methods and computer-executable instructions stored in one or more non-transitory computer readable media, consistent with the numbered paragraphs above and the embodiments disclosed herein.

What is claimed is:

1. A system comprising:

a processing device; and a memory coupled to the processing device and storing instructions that, when executed by the processing device, cause the system to perform operations comprising:

receiving one or more first inputs, wherein the one or more first inputs comprise vehicle data associated with a vehicle;

processing the one or more first inputs to compute one or more directional adjustments;

receiving one or more second inputs originating from an image sensor positioned within the vehicle, wherein the one or more second inputs comprise driver data associated with a driver of the vehicle;

processing the one or more second inputs to determine a gaze direction of at least one eye of the driver of the vehicle;

based on (a) the determined gaze direction of the at least one eye of the driver and (b) the one or more directional adjustments as computed by processing the one or more first inputs, determining one or more aspects of distractedness of the driver; and initiating one or more operations based on the determined one or more aspects of distractedness.

2. The system of claim 1, wherein the vehicle data from the one or more first inputs comprises information corresponding to one or more dimensions of the vehicle.

3. The system of claim 1, wherein the vehicle data from the one or more first inputs comprise information corresponding to one or more parameters associated with one or more components of the vehicle.

4. The system of claim 1, wherein the vehicle data from the one or more first inputs comprise information corresponding to one or more events associated with the vehicle.

5. The system of claim 1, wherein the one or more second inputs are used to determine a gaze dynamic comprising a sequence of gaze instances, the sequence of gaze instances including a combination of gaze locations and timing of the driver.

6. The system of claim 1, wherein initiating one or more operations comprises filtering one or more events.

7. The system of claim 1, wherein determining one or more aspects of distractedness of the driver comprises determining one or more aspects of distractedness of the driver via a neural network.

8. The system of claim 1, wherein the one or more directional adjustments comprise a region corresponding to an area of an image that relates to a road on which the vehicle is traveling.

9. The system of claim 1, wherein the vehicle is operated by the driver and is a same vehicle as the vehicle for which the one or more first inputs comprising the vehicle data is received.

10. A method comprising:

receiving one or more first inputs;

processing the one or more first inputs to compute one or more directional adjustments, wherein the one or more first inputs comprise vehicle data associated with a vehicle;

receiving one or more second inputs originating from an image sensor positioned within the vehicle, wherein the one or more second inputs comprise driver data associated with a driver of the vehicle;

processing the one or more second inputs to determine a gaze direction of at least one eye of the driver of the vehicle;

based on (a) the determined gaze direction of the at least one eye of the driver and (b) the computed directional adjustment, determining one or more aspects of distractedness of the driver; and initiating one or more operations based on the determined one or more aspects of distractedness.

11. The method of claim 10, wherein the vehicle data from the one or more first inputs comprises information corresponding to one or more dimensions of the vehicle.

12. The method of claim 10, wherein the vehicle data from one or more first inputs comprise information corresponding to one or more parameters associated with one or more components of the vehicle.

13. The method of claim 10, wherein the vehicle data from the one or more first inputs comprise information corresponding to one or more events associated with the vehicle.

14. The method of claim 10, wherein the one or more second inputs comprise a sequence of gaze instances.

15. The method of claim 10, wherein initiating one or more operations comprises filtering one or more events.

16. The method of claim 10, wherein determining one or more aspects of distractedness of the driver comprises determining one or more aspects of distractedness of the driver via a neural network.

17. The method of claim 10, wherein the one or more directional adjustments comprise a region corresponding to an area of an image that relates to a road on which the vehicle is traveling.

18. The method of claim 10, wherein the one or more second inputs are used to determine one or more glances of the driver, the one or more glances of the driver including an on road glance and an off road glance, and wherein the one or more aspects of distractedness of the driver is based on the one or more glances.

19. A non-transitory computer readable medium having instructions stored thereon that, when executed by a processing device, cause the processing device to perform operations comprising:

receiving one or more first inputs, wherein the one or more first inputs comprise vehicle data associated with a vehicle;

processing the one or more first inputs to compute one or more directional adjustments, the one or more directional adjustments comprise a region corresponding to an area of an image that relates to a road on which the vehicle is traveling;

receiving one or more second inputs originating from an image sensor positioned within the vehicle, wherein the one or more second inputs comprise driver data associated with a driver of the vehicle;

processing the one or more second inputs to determine a gaze direction of at least one eye of the driver of the vehicle;

based on (a) the determined gaze direction of the at least one eye of the driver and (b) the computed directional adjustment, determining, via a neural network, one or more aspects of distractedness of the driver; and initiating one or more operations based on the determined one or more aspects of distractedness.

20. The non-transitory computer readable medium of claim 19, wherein both the gaze direction and dimensions of components of the vehicle are taken into account for determining the one or more aspects of distractedness.

* * * * *